United States Patent
Burns et al.

(10) Patent No.: US 9,346,169 B2
(45) Date of Patent: *May 24, 2016

(54) APPARATUS AND METHOD FOR UNIVERSAL, FLEXIBLE PILLOW BAG PATTERN CREATION

(71) Applicant: Frito-Lay North America, Inc., Plano, TX (US)

(72) Inventors: Cory Burns, Dallas, TX (US); Kevin L. Cote, Allen, TX (US); John Robert Eberle, Plano, TX (US); Gregory William Hoell, Richardson, TX (US); Nathan R Huntoon, Frisco, TX (US); Timothy Jackson, McKinney, TX (US)

(73) Assignee: FRITO-LAY NORTH AMERICA, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,200

(22) Filed: Oct. 3, 2014

(65) Prior Publication Data
US 2016/0096273 A1    Apr. 7, 2016

(51) Int. Cl.
| G06F 19/00 | (2011.01) |
| B25J 9/16 | (2006.01) |
| G05B 19/401 | (2006.01) |
| B25J 15/06 | (2006.01) |

(52) U.S. Cl.
CPC .............. *B25J 9/1697* (2013.01); *B25J 9/1687* (2013.01); *B25J 15/0616* (2013.01); *G05B 19/401* (2013.01); *G05B 2219/40033* (2013.01); *G05B 2219/40053* (2013.01); *G05B 2219/40542* (2013.01)

(58) Field of Classification Search
CPC .... B25J 9/1697; B25J 9/1687; B25J 15/0616; G05B 19/401; G05B 2219/40053; G05B 2219/40542; B05B 2219/40033
USPC ................ 700/245, 257, 258, 259; 318/568.1
See application file for complete search history.

(56) References Cited

U.S. PATENT DOCUMENTS

| 4,051,565 A | 10/1977 | Berge |
| 5,044,143 A | 9/1991 | Ako |
| 5,251,422 A | 10/1993 | Goodman et al. |
| 5,279,099 A | 1/1994 | Goodman et al. |
| 5,284,003 A | 2/1994 | Goodman et al. |

(Continued)

FOREIGN PATENT DOCUMENTS

| EP | 2476491 A1 | 7/2012 |
| WO | 2004097335 A1 | 11/2004 |

(Continued)

OTHER PUBLICATIONS

International Search Report and Written Opinion for Application No. PCT/US2015/053810 mailed Jan. 29, 2016, 23 pages.

*Primary Examiner* — McDieunel Marc
(74) *Attorney, Agent, or Firm* — Brandon V. Zuniga; Colin P. Cahoon; Carstens & Cahoon, LLP

(57) ABSTRACT

An apparatus and method for measuring a dimension of a non-rigid object and using the dimension to pick and place the object. A first input device conveys a non-rigid object into contact with a feed forward unit, which contact causes a displacement of the feed forward unit. The displacement measures a dimension of the object. The measured dimension is transmitted via at least one line of communication.

39 Claims, 28 Drawing Sheets

(56) References Cited

U.S. PATENT DOCUMENTS

| | | |
|---|---|---|
| 5,537,946 A | 7/1996 | Sadeh |
| 5,786,530 A | 7/1998 | Fenlon |
| 5,802,803 A | 9/1998 | Kitagawa |
| 5,969,339 A | 10/1999 | McMurray |
| 6,041,646 A | 3/2000 | Fenlon |
| 6,105,419 A | 8/2000 | Michels et al. |
| 6,447,236 B1 | 9/2002 | Grams et al. |
| 6,457,642 B1 * | 10/2002 | Good ............... G02B 26/106 |
| | | 235/462.01 |
| 6,474,141 B1 | 11/2002 | Takaoka et al. |
| 6,579,053 B1 | 6/2003 | Grams et al. |
| 6,866,471 B2 | 3/2005 | Grams et al. |
| 6,941,796 B2 | 9/2005 | Bennett |
| 6,988,350 B2 | 1/2006 | Bennett |
| 7,614,282 B2 | 11/2009 | Eliasson |
| 7,900,502 B2 | 3/2011 | Yokota et al. |
| 8,022,329 B2 | 9/2011 | Stemmle et al. |
| 8,143,548 B2 | 3/2012 | Stemmle |
| 8,164,350 B2 | 4/2012 | Busse-Grawitz |
| 8,294,809 B2 | 10/2012 | Stettner |
| 8,386,069 B2 | 2/2013 | Hartmann |
| 8,939,274 B1 * | 1/2015 | Ross, Jr. ............... B65H 31/00 |
| | | 198/418.9 |
| 2002/0014055 A1 | 2/2002 | Iwasa |
| 2002/0106273 A1 | 8/2002 | Huang |
| 2008/0000756 A1 | 1/2008 | Behnke et al. |
| 2008/0115566 A1 | 5/2008 | Van Rootselaar |
| 2009/0288281 A1 | 11/2009 | Ruden |
| 2010/0135760 A1 * | 6/2010 | Hjornet ............... B25J 15/0616 |
| | | 414/744.8 |
| 2010/0277319 A1 | 11/2010 | Goidas |
| 2011/0005174 A1 | 1/2011 | Prahm |
| 2012/0087768 A1 * | 4/2012 | Barry ............... B61D 3/20 |
| | | 414/467 |
| 2013/0126310 A1 | 5/2013 | Neuhaeuser |
| 2013/0141737 A1 | 6/2013 | Yang |
| 2013/0152511 A1 * | 6/2013 | Derby ............... B65B 5/105 |
| | | 53/452 |
| 2014/0121836 A1 | 5/2014 | Ban |
| 2015/0164746 A1 * | 6/2015 | Costello ............... A61B 5/07 |
| | | 264/112 |
| 2016/0096273 | * | 4/2016 | Burns ............... B25J 9/1697 |
| | | 700/259 |
| 2016/0096274 | * | 4/2016 | Baylor ............... B25J 9/1697 |
| | | 700/259 |
| 2016/0096643 | * | 4/2016 | Baylor ............... B65B 35/38 |
| | | 53/443 |
| 2016/0096694 | * | 4/2016 | Baylor ............... B65G 57/10 |
| | | 414/774 |

FOREIGN PATENT DOCUMENTS

| | | |
|---|---|---|
| WO | 2005005949 A1 | 1/2005 |
| WO | 2013116801 A1 | 8/2013 |

* cited by examiner

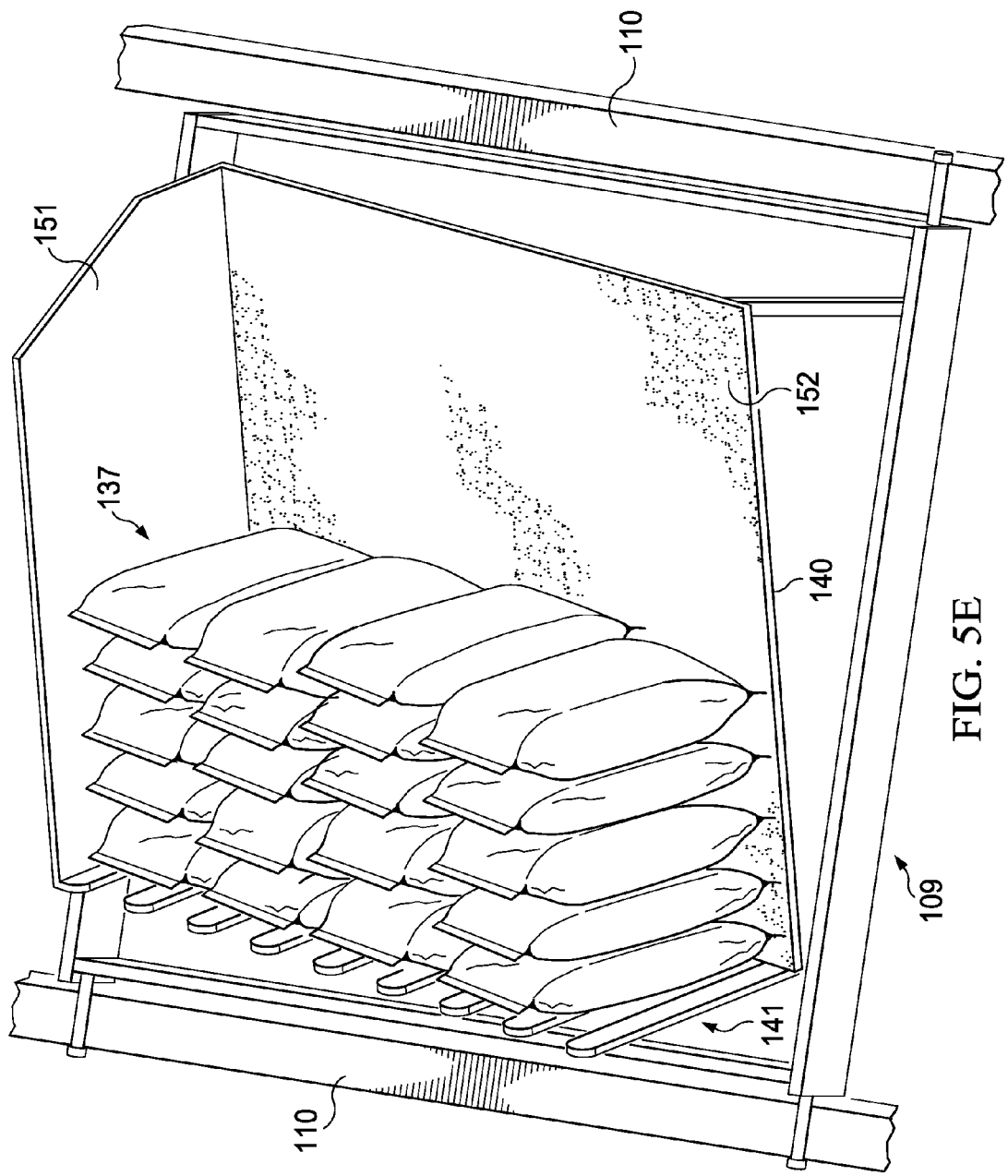

APPARATUS AND METHOD FOR UNIVERSAL, FLEXIBLE PILLOW BAG PATTERN CREATION

BACKGROUND OF THE INVENTION

1. Technical Field

The present invention generally relates to a flexible system for creating patterns of pillow bags. For example, the system relates to an apparatus and method for creating pillow bag patterns of various counts, product types, products sizes, product arrangements, and product orientations. In some embodiments, the apparatus and method for creating pillow bag patterns packs these patterns into various containers, for example, caddies, cases, trades, sacks, universal surfaces.

Additionally, the present invention generally relates to measuring a thickness of a moving pillow bag and using the measurement to pick and place the pillow bag. For example, the invention relates to an apparatus and method for measuring a thickness of a moving pillow bag and using the measurement to pick and place the pillow bag.

The present invention also generally relates to determining the position and orientation of a pillow bag and using the position and orientation of the pillow bag to pick and place the pillow bag.

In some embodiments, the pillow bag is easily damaged or difficult to accurately and precisely pick and place. In one embodiment a system for moving the pillow bag comprises a conveyor belt and a robot that is positioned to pick the bag from the conveyor belt and place the pillow bag in an array. For example, in one embodiment the position, orientation and measured thickness of the pillow bag is used to position the robot so that damage to the pillow bag and other pillow bags is avoided while a robot picks and places the pillow bag to form a desired pattern.

In some embodiments, the invention generally relates to a compound angled universal surface for receiving placed pillow bags and maintaining the pillow bags in a desired position and orientation while a pattern is formed, while the pillow bags are transported, while the pillow bags are transferred to an ultimate package or some combination thereof. For example, in one embodiment the surface is universal in the sense that the walls of the universal surface do not need to be adjusted to support pillow bags in a desired position and orientation (e.g. an upright position). For example, a top surface of the universal surface, upon which a pattern is placed, is at a compound angle so that one corner is lower than all the other corners. One result of the compound angle is that gravity tends to pull bags towards the lowest corner. Accordingly, in some embodiments the walls of the universal surface do not need to be adjusted to support pillow bags in upright position. Although some embodiments of the universal surface comprise a compound angle and a lowest corner, in other embodiments, the universal surface comprises a single angle and a lowest edge. For example, in embodiments with a lowest edge gravity tends to pull bags toward the lowest edge. Accordingly, the pillow bags tend to be held in place by gravity without, for example, needing to be constrained on all sides by walls.

The present invention also generally relates to a method and apparatus for a universal surface that is decoupled from a conveyor for the universal surface. For example, in some embodiments this decoupling allows the universal surface to travel along various paths to the pattern creation cells where the universal surface is filled with pillow bags by a robot or travel various paths to pattern transfer stations where completed patterns can be transferred to packaging.

The present invention also generally relates to an apparatus and method for transferring products from a universal surface to an ultimate package (e.g., box, case, sack, tray, carton, etc.). In one embodiment, a robot with an end effector transfers product from the universal surface to the ultimate package and the end effector comprises a vacuum nozzle and a finger wall which, for example, along with other crowder walls, can act like a shoehorn. In some embodiments, the universal surface comprises a mating or matching finger wall. In some embodiments, the end effector finger wall passes through the corresponding finger wall of the universal surface when the end effector picks product for placement in an ultimate package (e.g., cardboard box). In some embodiments, product is transferred to the universal surface from an alternate package by tipping the universal surface upside down.

The present invention also generally relates to an apparatus or method for a quality control system for conveying pillow bags, picking pillow bags, placing pillow bags, transferring pillow bags, or some combination thereof. In one embodiment, a pillow bag is rejected if it fails to meet at least one condition. In one embodiment, an input device can be stopped if any robot has been unable to complete its task of picking and placing the pillow bag before the pillow bag or a universal surface is conveyed outside the robot's area of influence.

2. Background

In many manufacturing, handling and transportation processes, pillow bags (e.g. bags of potato chips or cookies) need to be placed in specific patterns for placement in a sack, tray, box, wrap or other packaging. In many cases, the pillow bags have variable positions, orientations, or dimensions, such as thickness. For example, the position of a pillow bag on a conveyor belt constantly changes as the conveyor belt moves. In addition, the position of the pillow with respect to the conveyor belt can change. For example, the pillow bag may be closer to one edge of a conveyor belt than another. Another potential variable is the orientation of the pillow bag on the conveyor belt. The pillow bag can be tilted in one direction or another, be facing up, be facing down, or be rotated. Furthermore, the pillow bag can have variable bag dimensions in at least four situations. First, given a batch of bags from a single product manufacturing run, there are often variations in the size of the product. Second, bags in batches of a product run on different days can vary in size. Third, bag dimensions can vary for bags of different kinds of product or bags of product intentionally made in different sizes. Fourth, it might be desirable for bags with intentionally different sizes to be packaged together.

If pillow bags are placed as close to each other as possible to conserve space and reduce costs for packaging or storage, the placement of one pillow bag often depends on the placement of previous pillow bags. For example, after a first pillow bag is placed face-down in a package next to a wall, the second pillow bag can only be accurately placed next to the first pillow bag if the position of the first pillow bag is known. If the width and/or length of the first pillow bag are known, it can be used to place the second pillow bag as close as possible to a wall of the package while still leaving room for the first pillow bag. Such an arrangement can be desirable to save space.

In other applications, it can be desirable to form a particular pattern with pillow bags with varying positions, orientations, and dimensions. For example, these patterns can form an attractive or useful arrangement for displaying the pillow bags to consumers. However, the process of determining the position, orientation, and dimensions of pillow bags and then accurately and precisely placing them in a high quality pattern can be challenging. For example, the pillow bags are often filled with air and can change shape or incur damage upon contact with a measuring device or a pick and place robot. Furthermore, the pillow bags are often moving on a conveyor belt and this can further complicate the task of measuring, picking and placing the bags. Nonetheless, being able to determine the position, orientation, and dimensions of a moving, non-rigid pillow bag can be critical for some applications.

To understand why determining the position, orientation, and thickness of a pillow bag is important, it is useful to review a traditional process for putting pillow bags in a box as described with reference to FIG. 2A. In a first step 200, a batch of bags is produced with an assumed thickness. Second, in a picking step 202, a robot picks a bag using the assumed thickness from step 200. Third, in a placing step 204, after the robot picks the bag, it places the bag flat in a box. In placing the bag, the robot again uses the assumed thickness. For example, the assumed thickness is used to estimate how far the robot needs to stay from the box while placing the bag. If the robot gets to close to the box, the bag can be popped between the robot and the box. Fourth, in a repeating step 206, the steps of picking 202 and placing 204 are repeated until the box is full of bags.

As shown in FIG. 2A, traditional manufacturing, handling, and transportation processes have used assumptions regarding a pillow bag's thickness to pick and place the bag in a box. Thus, while the thickness of potato chip bags can vary due to the amount of air in the bags, in a traditional manufacturing and handling process, all the bags are assumed to have the same thickness for the purposes of placing the bags in a pattern. Accordingly, a pick and place robot is positioned based on the assumption that each bag has a given thickness. If the thickness of a particular bag varies significantly from the assumed thickness, it can result in damaged product or poor pattern creation. For example, if a bag is thicker than expected, the robot can get too close and pop the bag. Alternatively, if a bag is thinner than expected, the robot can remain too far away and miss the bag altogether. In some cases, when a bag has dimensions that vary from assumed dimensions, a robot can pick the bag insecurely. Then, as the robot moves with the bag, forces acting on the bag cause the robot to lose its hold or suction on the bag and hence drop the bag.

Ultimately, imprecision and inaccuracy related to pillow bag position, orientation, or thickness can result in misplaced and damaged bags, and introduce inefficiencies into the bag manufacturing, handling and transportation process. For example, because assumptions are used and actual product thicknesses can vary, tolerance must be built into a manufacturing, handling, and transportation system. This tolerance can take the form of leaving extra space on a conveyor belt or between bags in a package. However, this extra space can be wasted on the majority of bags which do not actually require extra space. Likewise, packages and equipment must be larger, resulting, for example, in greater expense, greater use of energy, and greater use of natural resources.

Down time to address dropped, damaged, or misplaced pillow bags is another inefficiency that can occur in a product manufacturing, handling and transportation process as a result of assumptions or inaccurate information regarding the dimensions of a product.

Another problem with existing pattern creation systems is their inability to efficiently and effectively form patterns, especially more complicated patterns.

What is needed is a new and innovative system capable of forming more complicated patterns in an effective and efficient way while limiting the amount of bags lost due to damage as a result of incorrect assumptions regarding bag dimensions.

Additionally, there has been no reliable method of determining the position, orientation, and dimensions of a moving pillow bag and using that information to pick and place the pillow bag to form a high quality pattern, while simultaneously avoiding damage to the pillow bag. Some traditional methods for picking and placing a pillow bag make assumptions as to the pillow bag's dimensions, but result in damage to the product or poor pattern creation or have a negative impact on production rate if the actual dimensions vary significantly from assumptions. Accordingly, a system capable of measuring the dimensions of a moving, non-rigid pillow bag is desirable for the additional accuracy, precision, reliability, efficiency and cost-effectiveness it can provide. Such a system is also desirable because it could increase quality by reducing waste. For example, the system could avoid loss or damage to bags that can occur when a robot picks from an inaccurate height.

What is needed is a new and innovative system capable of determining the position, orientation, and dimensions of a moving pillow bag and using that information to pick and place the pillow bag to form a high quality pattern, while simultaneously avoiding damage to the pillow bag. For example, a need exists for a system that measures the thickness of a pillow bag on a running conveyor and feeds this thickness measurement to a pick and place system. Additionally a need exists for the pick and place system to make a dynamic pick and dynamic place using the measurement to adjust both the pick and place locations for the pillow bag. Accordingly, poor quality patterns, inefficiency, damaged product, dropped product, and wasted product can be avoided while the accuracy, precision, reliability, efficiency, and cost-effectiveness of the pick and place system is simultaneously increased. In some embodiments, resources can be conserved and the environmental friendliness of the process can be increased.

Another problem that exists with conventional processes for picking and placing pillow bags is that if, for example, pillow bags were placed in a pattern on a tray, they would tend to move around. It would be advantageous to have an apparatus and method for maintaining the position and orientation of pillow bags once they have been placed in a pattern. It would also be advantageous if the apparatus (e.g., a tray) and method did not require adjustment for different shapes or sizes of pillow bag patterns. For example, it would be beneficial if the walls of the apparatus did not need to be positioned next to the pillow bags to maintain the pillow bags in a particular position or in an up-right orientation. It would also be advantageous if the apparatus and method could prevent the pillow bags from sliding or falling over. It would be further advantageous if the apparatus and method provided for uncoupling the apparatus (e.g. tray) from a conveyor so that the apparatus had freedom to travel along various paths, rather than a single path determined by a single conveyor.

Problems would also exist with respect to conventional methods for transferring objects if they were applied to pillow bags, for example, to transfer a pillow bag from a tray to final package. In some cases, transferring patterns would be slow or inefficient, for example, if the patterns were transferred manually or because a robot performing the motions required for a transfer can only move so quickly. In other cases, transferring patterns could result in disruption to the pattern or damage to pillow bags. It would be beneficial to have an apparatus and method for more efficiently and effectively transferring a pillow bag pattern from one surface to another surface, for example, from a tray to a package. It would also be desirable if the method and apparatus used components that reduced the amount of motion required to perform a pattern transfer and thereby increased the speed and efficiency of the transfer. For example, it would be advantageous, if the method and apparatus used components that were slotted so that the components could pass through each other when a pattern was transferred instead of having to move around each other. It would also be advantageous if the method and apparatus were compatible with transferring a pillow bag pattern from a surface with a compound angle. For example, for a process in which a pattern of pillow bags are pushed from a first surface to a second surface, if the first surface is slanted, but the second surface is flat, transferring pillow bags from the first surface to the second surface can be complicated and result in unacceptable disruptions to the pattern as it is transferred. It would also be advantageous if the method and apparatus were compatible with transferring a pillow bag pattern from a surface with a high coefficient of friction, which, for example, can help to keep the pillow bags from sliding. It would also be advantageous if such a method and apparatus could transfer the pattern using suction to lift the pillow bags off the high-friction surface rather than trying to push or slide the pillow bags off the surface. It would also be advantageous to be able to transfer pillow bags from the surface by flipping the surface over and using gravity, centripetal force, supports, or some combination thereof to prevent a pillow bag pattern from being disturbed to an unacceptable degree.

Another problem that exists for picking and placing pillow bags is that pillow bags that don't meet desired quality criteria can be included in a pattern or a pattern itself may not meet certain quality criteria. For example, a bag may have a smudged or off-center label, or a pattern may be incomplete because the tray bearing the pattern moved past a robot before the robot had time to place its pillow bag on the tray. As another example, some quality control systems that use weight to verify whether a specified quantity of pillow bags is present in a pattern do not work well when the pattern can comprise various types of products with various weights. Accordingly, it would be advantageous to have an apparatus and method for verifying the quality of pillow bags and patterns, including, for example, patterns that comprise products of variable number and type. It would also be desirable if such a method and apparatus could reject pillow bags if they fail to meet quality control criteria. It would also be advantageous if such a method and apparatus could provide for stopping a conveyor if a robot has not been able to pick and place or transfer a pillow bag.

It would also be beneficial if a system capable of determining the position, orientation and dimensions of a moving pillow bag could transmit information about the position, orientation and dimensions of the pillow bag to other systems. For example, it would be useful if one pattern creation cell with information about the position and dimensions of pillow bags could transmit this information to other pattern creation cells. As a result, a pattern created by one pattern creation cell could be added to or modified by another pattern creation cell. For example, one pattern creation cell could place bags in a first row on a tray, while a second pattern creation cell could place bags in a second row that is adjacent to the first row. Pattern creation cells could also be used together to create more complicated patterns. This would provide flexibility with respect to designing patterns and the efficiency and cost-savings with respect to reducing or eliminating misplaced and damaged product.

It would also be beneficial if a method and apparatus for picking and placing pillow bags were able to send information to a downstream device, for example a pattern transfer device. It would also be advantageous if the pattern transfer device could be used to transfer a pattern of pillow bags from one surface to another, and the pattern could comprise at least one column of bags. In transferring such a pattern, it would also be desirable if information on the length of the at least one column of bags could be used to improve pattern transfer performance.

SUMMARY OF THE INVENTION

The present invention generally provides for an apparatus and method for measuring a thickness of a moving pillow bag and using the measurement to pick and place the pillow bag. The pillow bag can be a non-rigid product, for example, a bag of chips, and the pillow bag can comprise variable dimensions and exhibit various conditions and orientations. For example, the amount of air in the bag can vary, and this in turn, can change the thickness of the bag.

A robot can be used to pick and place the pillow bag, and the robot can be positioned using the measured thickness. In some embodiments, the robot is capable of picking and placing pillow bags with the use of an end effector. In some embodiments, the robot is a delta robot. In some embodiments, the robot forms a component of a pattern creation cell. For example, the pattern creation cell can be used to measure the thickness, position, and orientation of a moving pillow bag and pick and place the bag in an array according to a desired pattern.

In one embodiment, the pattern creation cell can also transmit information regarding the thickness, position, and orientation of pillow bags in an array of pillow bags. For example, this information can be transmitted from one pattern creation cell to another or to a programmable automation controller ("PAC"), programmable logic controller, ("PLC") or computer (e.g., personal computer ("PC")), which can then transmit the information to other pattern creation cells. The pattern creation cells can also be used together or in combination to form patterns that are more complex or complicated than the patterns created by individual pattern creation cells.

In a first aspect, the invention provides an apparatus for use in picking and placing a non-rigid object, said apparatus comprising a first input device and a feed forward unit, wherein the first input device conveys a non-rigid object into contact with the feed forward unit, which contact causes a displacement of the feed forward unit, wherein the displacement is used to measure directly or indirectly a measured dimension of the non-rigid object, and wherein the measured dimension is transmitted via a line of communication and used to pick and place the non-rigid object. For example, in one embodiment the invention comprises an apparatus that can measure a thickness of a moving pillow bag and use it to pick and place the pillow bag.

In a second aspect, the invention provides a method for measuring a dimension of a non-rigid object and using the dimension in picking and placing the object, said method comprising the steps: measuring a dimension of a moving non-rigid object to provide a measured dimension; using the measured dimension to pick the non-rigid object; and using the measured dimension to place the non-rigid object. In one embodiment, the measuring step comprises: using a first input device to convey the non-rigid object into contact with a feed forward unit, wherein the contact causes a change in position of the feed forward unit to accommodate the measured dimension of the non-rigid object; and using a distance sensor to detect directly or indirectly the change in position or displacement of the feed forward unit. In another embodiment, the invention provides a method for measuring a thickness of a moving pillow bag, using the measurement of the thickness to pick the pillow bag, and using the measurement of the thickness to place the pillow bag in an array of pillow bags according to a desired pattern.

In a third aspect, the invention provides an apparatus for use in picking and placing a non-rigid object, said apparatus comprising a first input device and a feed forward unit, wherein the first input device conveys a non-rigid object into contact with the feed forward unit, which contact conditions the object to form a conditioned object. A distance sensor is positioned over a gap in the feed forward unit to measure a distance to a surface of the conditioned object and the distance to the surface of the object measures a measured dimension of the conditioned object. The measured dimension is transmitted via at least one line of communication and used to pick and place the non-rigid object. For example, in one embodiment the invention comprises an apparatus that can measure a thickness of a moving pillow bag and use it to pick and place the pillow bag.

In a fourth aspect, the invention provides a method for measuring a dimension of a non-rigid object and using the dimension in picking and placing the object, said method comprising the steps: measuring a dimension of a moving non-rigid object to provide a measured dimension; using the measured dimension to pick the object; and using the measured dimension to place the object in an array of objects. In one embodiment, the measuring step comprises: using a first input device to convey the object into contact with a feed forward unit, wherein the contact conditions the object to form a conditioned object; and using a distance sensor to detect directly or indirectly a distance across two opposite surface of the conditioned object. In another embodiment, the invention provides a method for measuring a thickness of a moving pillow bag, using the measurement of the thickness to pick the pillow bag, and using the measurement of the thickness to place the pillow bag in an array of pillow bags according to a desired pattern.

In a fifth aspect, the invention provides an apparatus for transferring a pattern from a universal surface to an ultimate package, said apparatus comprising: an end effector for a pattern transfer robot; wherein the universal surface comprises a finger wall, said finger wall comprising a series of finger wall slats spaced apart a distance to form openings between the finger wall slats, wherein the end effector comprises a crowder plate, said crowder plate comprising a series of crowder plate slats spaced apart a distance to form openings between the crowder plate slats, and wherein a portion of the crowder plate slats are sized to pass between a portion of mating finger wall slats.

In a sixth aspect, the invention provides a method for transferring a pattern of non-rigid objects from a universal surface to an ultimate package, said method comprising the steps of: providing a pattern on a universal surface; conveying the pattern to a transfer station; picking the pattern with an end effector at the transfer station; and placing the pattern into an ultimate package, said ultimate package comprising at least one layer of non-rigid objects to form at least one universal element.

In a seventh aspect, the invention provides an apparatus for maintaining a pattern of non-rigid objects in a desired position and orientation, said apparatus comprising: a first surface; a second surface; a third surface; a lowest corner; and a bottom, wherein the first surface, second surface, and third surface are mutually orthogonal and meet at a point to form the lowest corner, wherein the second and third surfaces are supported by, attached to and extend at least somewhat vertically from the apparatus, wherein the first surface is oriented at a compound angle to a plane running through the bottom and thereby provides the lowest corner.

In an eighth aspect, the invention provides a method for loading non-rigid objects on a compound-angled universal surface to form a pattern, said method comprising the steps of: picking non-rigid objects; and placing the objects in a first pattern on a compound-angled universal surface so that the objects are supported by three mutually orthogonal surfaces of the universal surface.

In a ninth aspect, the invention provides a method for loading a pattern of non-rigid objects on a universal surface that is decoupled from a universal surface conveyor, said method comprising the steps: supplying the universal surface to a pattern creation line on a first universal surface conveyor, wherein the universal surface is decoupled from the first universal surface conveyor; conveying the universal surface to a first decision point where the universal surface can be directed to at least a second universal surface conveyor; conveying the universal surface to at least one pattern creation cell to form a finished pattern; and conveying the universal surface with the finished pattern to at least one pattern transfer station for transferring the finished pattern to an ultimate package; wherein the pattern creation line comprises the first decision point, the at least one pattern creation cell, the at least one pattern transfer station, the first universal surface conveyor, and the at least a second universal surface conveyor.

In a tenth aspect, the invention provides a method for using multiple lanes to load a pattern of non-rigid objects on a universal surface that is decoupled from a universal surface conveyor, said method comprising the steps: loading a pattern of objects onto the universal surface; conveying a universal surface on a work in-progress lane comprising a first universal surface conveyor, wherein the universal surface is decoupled from the first universal surface conveyor; conveying the universal surface to an express lane comprising a second universal surface conveyor after the universal surface has been loaded with a finished pattern, wherein the universal surface is decoupled from the second universal surface conveyor, and wherein, as compared to the work-in-progress lane, the express lane provides a more direct route to a destination of the universal surface.

In an eleventh aspect, the invention provides an apparatus for maintaining a pattern of non-rigid objects in a desired position and orientation, said apparatus comprising: a first surface; a second surface; a third surface; a lowest edge; and a bottom, wherein the first surface, second surface, and third surface are mutually orthogonal and meet at a point to form a corner, wherein the first surface and second surface meet to form a lowest edge, wherein the second and third surfaces are supported by, attached to and extend at least somewhat vertically from the apparatus, wherein the first surface is oriented at an angle to a plane running through the bottom and thereby provides the lowest edge.

In a twelfth aspect, the invention provides a method for loading non-rigid objects on a universal surface to form a pattern, said method comprising the steps: picking non-rigid objects; and placing the objects in a first pattern on an angled universal surface so that the objects are supported by at least two of three mutually orthogonal surfaces of the universal surface.

The inventors have developed a new and innovative system capable of forming complicated patterns of non-rigid objects in an effective and efficient way while limiting the amount of bags lost due to damage as a result of incorrect assumptions regarding bag dimensions.

The inventors have also developed a new and innovative system capable of determining the position, orientation, and dimensions of a moving pillow bag and using that information to pick and place the pillow bag to form a high quality pattern, while simultaneously avoiding damage to the pillow bag and negative impacts on production rate. For example, in one embodiment, the invention is an apparatus that determines the position, orientation, and thickness of a non-rigid product (for example, bags) on a running conveyor and can feed this thickness measurement to a pick and place system. In an additional embodiment, the pick and place system makes a dynamic pick and dynamic place using the position, orientation, and thickness of a pillow bag to adjust both the pick and place locations for the pillow bag. Accordingly, in one embodiment the system avoids loss or damage to bags that can occur when a robot picks from an inaccurate height. In another embodiment, poor quality patterns, inefficiency, damaged product, wasted product, and negative impacts on production rate can be avoided while the accuracy, precision, reliability and efficiency of the pick and place system is simultaneously increased.

The system is also desirable because it increases quality by reducing waste in the form of lost or damaged bags that could have occurred as a result of robots picking from an inaccurate position (e.g. height) or orientation. Resources, for example, natural resources or energy, are conserved and the environmental friendliness of the process is increased. The system creates tighter patterns of pillow bags than a traditional manufacturing, handling, or transportation system. Further, the downtime of the system is reduced relative to a traditional system.

In one embodiment, the invention is an apparatus and method for maintaining the position and orientation of pillow bags once they have been placed in a pattern. In one embodiment, the apparatus and method do not require adjustment for different shapes or sizes of pillow bag patterns because, for example the apparatus comprises a compound angled universal surface. In one such apparatus and method, the walls of the apparatus do not need to be positioned next to the pillow bags to maintain the pillow bags in a particular position or in an up-right orientation. Another advantage of one such apparatus and method is that it prevents the pillow bags from sliding or falling over. In addition, one such apparatus and method provides for uncoupling the apparatus (e.g. a tray) from a conveyor so that the apparatus had freedom to travel along various paths, rather than a single path determined by a single conveyor.

In one embodiment, the invention mitigates problems that exist with respect to conventional methods for transferring pillow bags, for example, from a tray to final package. In one embodiment, such an apparatus and method more efficiently and effectively transfers a pillow bag pattern from one surface to another surface, for example, from a tray to a package. Additionally, one such apparatus and method use components that reduce the amount of motion required to perform a pattern transfer and thereby increase the speed and efficiency of the transfer. For example, the method and apparatus use components that are slotted so that the components can pass through each other when a pattern is transferred instead of having to move around each other. Another such method and apparatus is compatible with transferring a pillow bag pattern from a surface with a compound angle and can also be used to transfer a pillow bag pattern from a surface with a high coefficient of friction, because, for example, the apparatus and method uses suction to lift the pillow bags off the high-friction, compound angled surface rather than trying to push or slide the pillow bags off the surface. Another such apparatus and method transfers pillow bags from a surface by flipping the surface over and using gravity, centripetal force, supports, or some combination thereof to prevent a pillow bag pattern from being disturbed to an unacceptable degree.

In another embodiment, the invention is an apparatus and method for verifying the quality of pillow bags and patterns, including, for example, patterns that comprise products of variable number and type. One such a method and apparatus rejects pillow bags if they fail to meet quality control criteria. One such a method and apparatus also provides for stopping a conveyor if a robot has not been able to pick and place or transfer a pillow bag.

In another embodiment, the invention is a system that determines the position, orientation, and dimensions of a moving pillow bag and transmits information about the position, orientation, and dimensions of the pillow bag to other systems. For example, in one embodiment, a pattern creation cell with information about the position and dimensions of pillow bags transmits this information to other pattern creation cells. In one embodiment, a pattern created by one pattern creation cell can be added to or modified by another pattern creation cell. For example, in one embodiment, a first pattern creation cell places at least one pillow bag in a first row on a tray, while a second pattern creation cell places at least one pillow bag in a second row that is adjacent to the first row. In one embodiment, pattern creation cells are used in combination to create more complicated patterns. This is desirable for the flexibility it provides with respect to designing patterns and the efficiency and cost-savings it provides with respect to reducing or eliminating misplaced and damaged product.

In another embodiment, the invention is a method and apparatus for picking and placing a pillow bag that sends information regarding the pillow bag to a downstream device, for example a pattern transfer device. In one embodiment, the pattern transfer device transfers a pattern of pillow bags from one surface to another. In one embodiment, the invention is an apparatus and method for transferring a pattern that comprises at least one column of bags and the embodiment uses information on the length of the at least one column to transfer the pattern. One such embodiment transfers patterns more effectively, efficiently, and accurately than the patterns would be transferred if the information on column lengths were not used.

Although the invention is described in terms of measuring a thickness of a pillow bag, in some embodiments, the invention is used to measure at least one measured dimension of the pillow bag, said dimension being a height, thickness, width, length, radius, diameter, a distance across two opposite surfaces of the pillow bag, or some combination thereof. Likewise, although the invention is described in terms of a pillow bag, in some embodiments the object measured comprises, for example, an object, a non-rigid object, an irregularly shaped object, an object that deforms when pressure is applied and returns approximately to its original shape when the pressure is removed, a bag, a fluid-filled bag, an air-filled bag, a package, a package produced by a form-fill-and-seal machine, flexible packaging, or a parcel.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 5E shows an embodiment of the invention depicting four columns of pillow bags in an array of pillow bags on a universal surface that has been coated to increase friction between the pillow bags and the surface.

DETAILED DESCRIPTION OF THE INVENTION

Figure 1:
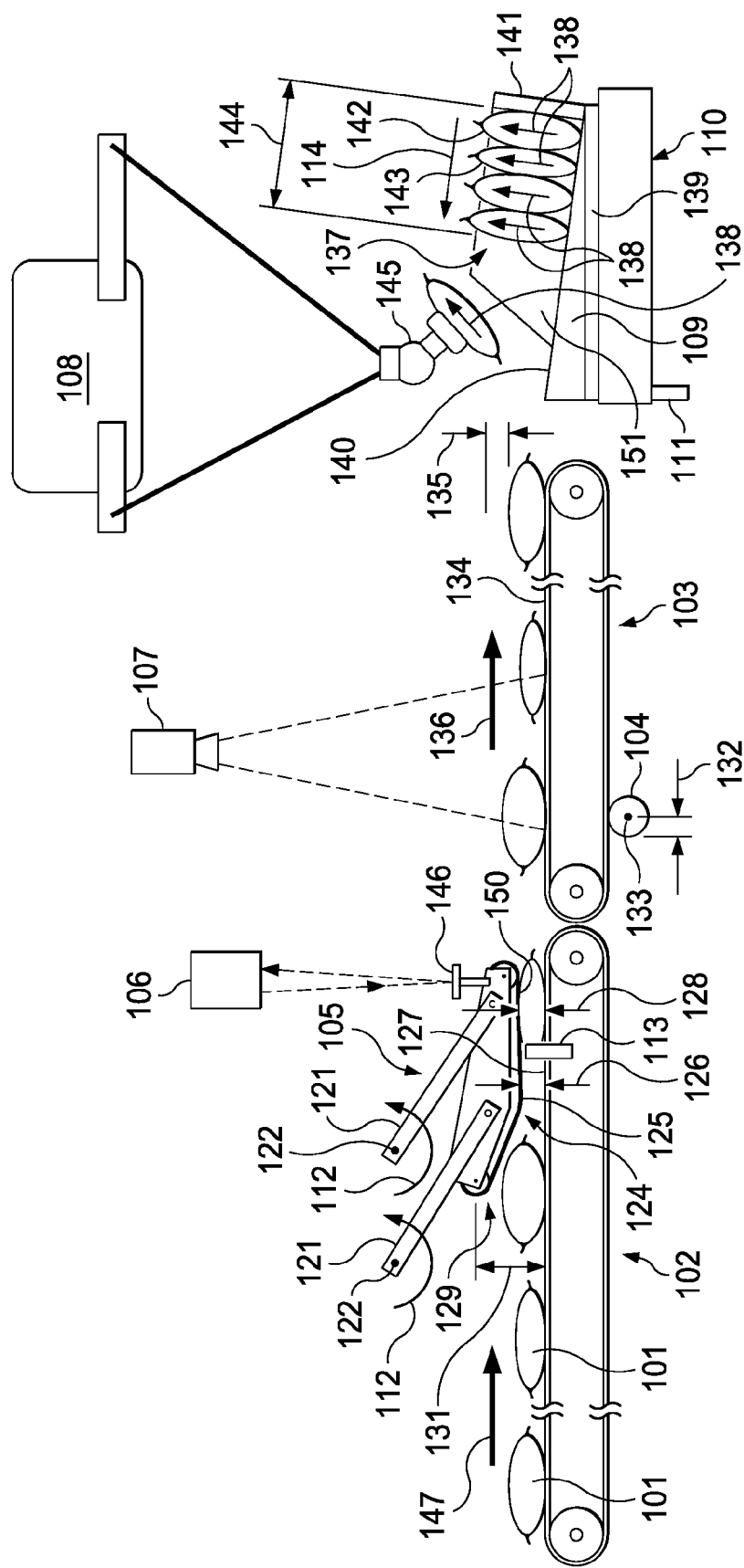
FIG. 1 is a schematic depicting an apparatus that is one embodiment of the present invention.

One embodiment of a system according to the invention will now be described with reference to FIG. 1. First, a pillow bag 101 is positioned under a feed forward unit 105 by first input device 102. The pillow bag is non-rigid and has a thickness that can vary from one bag to another. The first input device is a device that moves, conveys or propels the pillow bag. For example, in some embodiments, the first input device comprises a conveyor belt, rollers, or chains. In FIG. 1, the first input device 102 conveys the pillow bag 101 in a first conveyance direction 147.

Second, after the pillow bag 101 contacts the feed forward unit 105, the feed forward unit assists in moving the pillow bag, for example using a secondary input device 124, (e.g., a secondary conveyor belt, secondary rollers, or a driven overhead conveyor belt) on the bag-contacting surface of the feed forward unit 125. As the pillow bag is propelled under the feed forward unit, the position of the feed forward unit adjusts to accommodate the thickness and condition of pillow bag. For example, in FIG. 1 the feed forward unit comprises legs 121 which rotate in direction 112 around two axes of rotation 122. This rotating motion adjusts the position of the feed forward unit to accommodate the pillow bag, for example by adjusting the distance 126 between the bag-contacting surface 127 of first input device 102 and the bag-contacting surface 125 of the feed forward unit 105. As viewed in FIG. 1, the two axes of rotation are oriented perpendicular to the plane of FIG. 1 (in other words, the two axes of rotation appear to be coming out of the page). In some embodiments, the secondary input device 124 uses mechanical means to counter weight (e.g., springs, air cylinders, etc.) and dampen (e.g., shocks, dash pot, air cylinder, etc.) the movement of the secondary input device.

In one embodiment, the first input device 102 is a conveyor that propels a non-rigid pillow bag 101 into contact with a feed forward unit 105 so that the pillow bag 101 pushes up the feed forward unit 105. In one embodiment, the feed forward unit is lightweight. In one embodiment, the feed forward unit assists the conveyor to propel the pillow bag. In one embodiment, the feed forward unit uses a secondary input device 124 to propel the pillow bag 101 at a speed that is nearly identical to the speed at which the first input device 102 propels the pillow bag.

In one embodiment, the feed forward unit 105 is attached to fixed points which provide axes of rotation 122 and the feed forward unit is free to rotate about these fixed points. This allows, for example, the feed forward unit to be pushed by the pillow bag 101 vertically away from the first input device 102 and parallel to the direction 147 that the first input device conveys the pillow bag 101.

In one embodiment, the feed forward unit 105 comprises a vertical stop that maintains a gap between the feed forward unit and the first input device 102, allowing the pillow bag 101 to easily feed between the feed forward unit and first input device.

Third, as the feed forward unit 105 moves to accommodate the thickness and condition of the pillow bag 101 a distance sensor 106 measures the change in vertical displacement of the feed forward unit. In conjunction with a known initial vertical position of the feed forward unit, the change in vertical displacement of the feed forward unit can be used to determine the distance 126 between the bag-contacting surface 127 of first input device and the bag-contacting surface of the feed forward unit 125. This distance 126, in turn, corresponds to the thickness 128 of the pillow bag 101. The measurement of thickness 128 of the pillow bag 101 or the measurement of at least one dimension sufficient to determine the thickness 128 of the pillow bag 101 is captured as recorded information. For example, the recorded information can be stored on a computer, USB flash drive, hard drive, CD, DVD, or any other suitable computer-readable information storage medium. In one embodiment, the recorded information is stored in a robot controller. In one embodiment, the recorded information is passed to the robot controller from the distance sensor while the presence sensor detects the presence of a pillow bag.

In one embodiment, a flat surface 146 is mounted on the feed forward unit 105 for measurement of the vertical position of the feed forward unit using a laser distance sensor 106. In one embodiment, the distance sensor 106 is mounted to a fixed location not on the unit. In one embodiment, the distance sensor comprises a non-contact distance sensor, a camera, laser, light sensing device, or ultrasonic device.

In the embodiment shown in FIG. 1, the thickness 128 of the pillow bag 101 is measured using a presence sensor 113, for example a bag presence sensor. In one embodiment, the presence sensor is a photo eye, for example, through-beam photo eye or a capacitive or photoelectric sensor. In one embodiment, the presence sensor can be used to detect the position of the pillow bag relative to the bag-contacting surface 127 of the first input device 102. For example, the presence sensor can detect when the leading (e.g. front) and trailing (e.g. back) edge of the pillow bag passes the presence sensor as it moves in the first conveyance direction 147. In one embodiment, data from the presence sensor is sent to a robot controller which uses the information to determine the position of the leading and trailing edges of the bag.

As the presence sensor senses the presence of the pillow bag 101 under the feed forward unit 105, for example, when the pillow bag blocks the field of vision of the presence sensor, the height of the feed forward unit is monitored and captured. In one embodiment, this height is sent to a robot controller. As the pillow bag passes under the feed forward unit 105, the height of the feed forward unit will adjust to accommodate the thickness and condition of the pillow bag. For example, the feed forward unit in FIG. 1 has a tapered end 129 with a secondary input device 124 to enable the passage under the feed forward unit of any pillow bag with a leading-edge height less than the maximum height of the tapered end 131. Additionally, the feed forward unit 105 comprises a surface 150 substantially parallel to the bag-contacting surface 127 of the first input device 102. In the embodiment of FIG. 1, the surface 150 is also substantially horizontal.

In some embodiments, the presence sensor 113 triggers a pick and place robot 108 controller to log thickness measurements from the distance sensor 106. Accordingly, in some embodiments, the presence sensor 113 is located near the middle of the surface 150 of the secondary input device 124 when the feed forward unit 105 is resting on its vertical stops. This helps to ensure, for example, that thickness measurements for the pillow bag 101 are obtained when a substantial amount (e.g. the majority) of the pillow bag 101 is being conditioned underneath the feed forward unit 105. This conditioning can be useful to emulate the condition of a bag when the end effector of the pick and place robot 108 picks the bag.

As first input device 102 propels the pillow bag 101 into contact with the secondary input device 124 on the bottom side of the tapered end 129 of the feed forward unit 105, the pillow bag 101 will push up the feed forward unit 105 causing vertical displacement of the feed forward unit 105. Meanwhile, the presence sensor 113 will sense the presence of the pillow bag 101 under the feed forward unit 105. After the presence sensor 113 senses that the pillow bag 101 has passed, the maximum value of vertical displacement of the feed forward unit 105 caused by the pillow bag 101 is captured and used to determine a thickness of the pillow bag 101. The thickness 128 of the pillow bag 101 is then captured, for example, by storing the information in a robot controller. In one embodiment, a photo-eye sensor 113 is used at the gap between the feed forward unit 105 and the first input device 102 to detect the presence of the pillow bag 101 in order to capture the pillow bag's thickness 128.

Fourth, the pillow bag 101 is transported onto a second input device 103. The second input device 103 conveys the pillow bag 101 in a second conveyance direction 136. Although the first conveyance direction 147 and the second conveyance direction 136 can be the same, they can also be different. In the embodiment shown in FIG. 1, the second input device is directly coupled (1:1 mechanically, electrically or programmatically) to the first input device 102. A first encoder 104 tracks the positional information of the second input device 103. For example, in FIG. 1, the first encoder 104 is a wheel with a known radius 132 that turns around a wheel axis of rotation 133 located at the center of the wheel. The wheel contacts the bag-contacting surface 134 of the second input device 103. In FIG. 1, the bag-contacting surface 134 of the second input device 103 is a conveyor belt. The surface of the wheel exhibits a translational velocity that is equal to the translational velocity of the bag-contacting surface 134. Accordingly, the encoder can measure the translational change in position of the bag-contacting surface 134 at any particular time by measuring the translational change in position of the surface of the wheel at the same time. For example, if the wheel has turned N times, then the translational change in position of the surface of the wheel is equal to the product of N times 2 times it times the known radius 132 of the wheel of the first encoder 104. Although, in other embodiments, the first encoder 104 tracks the position of the second input device using other appropriate approaches. In addition to an encoder, other devices can also be used to track the position of the second input device, for example, resolvers or other rotational feedback devices that provide position and/or velocity information over time.

The first encoder 104 is used to track the position information of the second input device 103 under a vision system 107. The vision system 107 senses, for example, the orientation of the bag and the two-dimensional position of the bag along the plane of the bag-contacting surface 134 of the second input device 103. In one embodiment the vision system 107 comprises a grey scale camera that can identify key features of a bag to determine its position and orientation. In one embodiment, the vision system 107 is located in a vision tunnel to block out ambient light. In one embodiment, information regarding the pillow bag 101, for example, the bag's orientation, position, and thickness, is determined and tracked by the vision system 107, the first encoder 104, the presence sensor 113, and the distance sensor 106. In one embodiment the information is then stored by a robot controller along with times when the information was collected. The robot controller can use the stored information to position and orient an end effector 145 on a robot 108 in order to pick the pillow bag 101 at a specific location and time. The information can also be used by the robot controller to reorient and reposition the end effector 145 so that the pillow bag 101 conforms to a desired pattern when it is placed.

In FIG. 1, the measurement of the thickness 128 of the pillow bag 101 is used to position the end effector 145 a second height 135 above the surface of the pillow bag 101 to be picked, for example, 10 mm. Although, in other embodiments the second height 135 can vary. The second height 135 is selected to enable the robot 108 to effectively and efficiently pick the pillow bag 101. For example, if the robot uses a vacuum to pick the product, the second height 135 is small enough so that a robot 108 can grab the pillow bag using suction created by the vacuum. However, the second height 135 is large enough that the robot 108 is sufficiently distant from the pillow bag 101 to avoid contacting the pillow bag 101 before suction is established by the vacuum. This can help prevent the pillow bag from being damaged by the robot 108. For example, the robot 108 could break the bag if the second height 135 is too small. As another example, even if the second height 135 is greater than zero, if the robot is not positioned precisely and accurately at the second height 135, the robot 135 can damage the pillow bag 101. Accordingly, it can be desirable to incorporate a tolerance in the second height 135 to accommodate any inaccuracy or imprecision in the placement of the robot 108. In some embodiments, the second height 135, including a tolerance, is 10 mm.

Although the robot 108 has been described as using a vacuum to pick the pillow bag 101, the robot 108 can also use pinchers, claws, magnetism, electrostatic adhesion or other suitable approaches to pick the pillow bag 101. If a vacuum is used to pick the pillow bag, after the pillow bag 101 is picked, the vacuum between the pillow bag 101 and the robot 108 can be checked to ensure that the robot 108 is securely holding the pillow bag 101. For example, in one embodiment, if a pressure sensor does not detect a sufficient vacuum in a suction cup on the robot 108, then the pillow bag 101 is not securely held by the robot 108. In one embodiment, if the pillow bag is not securely held, the robot will take corrective action, for example, attempting to create a better hold, not picking the pillow bag, not placing the pillow bag in an array, or rejecting the pillow bag. In some embodiments, the pillow bag is rejected by using a robot to place the bag down a chute within reach of the robot. It can be advantageous for the chute to be close to the robot so it takes less time and energy for a robot to move into position to reject a pillow bag and then return to a position for picking and placing pillow bags in a pattern.

In some embodiments, the vision system 107 or a quality control system can be used to monitor the quality of pillow bags, which can be, for example, bags of product on the second input device 103. In one embodiment, if the bags do not satisfy quality standards, they are rejected, for example, by being allowed to travel off the end of the second input device 103 or by being removed by a robot 108.

In one embodiment of the invention, at least one queue of information regarding the pillow bags 101 is generated. In one embodiment, a queue comprises thickness information for each pillow bag 101 whose thickness 128 has been measured. In one embodiment, a queue comprises information related to the position of each pillow bag that has been detected by a presence sensor 113. In one embodiment, a queue comprises information about the thickness 128 of each pillow bag, and the position of each pillow bag 101 as measured along a vector parallel to second conveyance direction 136. For example, the position of each pillow bag 101 in the second conveyance direction 136 can be determined using the position of the bag-contacting surface 127 for the first input device 102 when the pillow bag 101 is first detected by presence sensor 113, last detected by presence sensor 113, or some combination thereof. The position of the bag-contacting surface 127 for the first input device 102 can be determined, for example, from the position of the bag-contacting surface 134 for the second input device 103 and information regarding a relationship between the positions of the two bag-contacting surfaces 127, 134. In one embodiment, the two bag-contacting surfaces are directly coupled (e.g. 1:1 mechanically, electrically or programmatically). Additionally, information regarding the position of the bag-contacting surface 134 for the second input device 103 can be determined using the position of the first encoder 104 and information regarding the relationship between the position of the first encoder 104 and the position of the bag-contacting surface 134 for the second input device 103. For example, one such relationship can be the circumference of the wheel on the first encoder 104 and the length, perimeter or circumference of a conveyor belt that makes up the bag-contacting surface 134 for the second input device 103. Other approaches for determining the position of a pillow bag can also be used. For example, the position can be determined using an encoder for a motor used to drive a belt that transports the bags.

In one embodiment, as a pillow bag 101 passes the presence sensor 113, information regarding the approximate position of the pillow bag 101 as measured along a vector parallel to the second conveyance direction 136 is stored in a queue. Then as the pillow bag 101 is detected by a vision system 107, the precise position of the pillow bag determined as measured along vectors parallel to and perpendicular to the conveyance direction 136. In some embodiments a more precise position of the pillow bag is measured along a number of vectors, for example, up to three vectors can correspond to the three-dimensional position of a pillow bag 101 and one vector can correspond to time. In one embodiment, the time vector corresponds to a time when a particular position of the pillow bag 101 was detected.

In one embodiment, a first queue comprises information regarding the thickness 128 of a pillow bag 101 and the approximate position of the pillow bag 101 as measured along a vector parallel to the second conveyance direction 136. For example, the first queue can be generated using information from the distance sensor 106 and the presence sensor 113. A second queue comprises information regarding the precise position of the pillow bag 101 as measured along vectors both parallel to and perpendicular to the conveyance direction 136. For example, the second queue can be generated using information from the vision system 107. Accordingly, the first and second queues both comprise coordinates for pillow bags 101 corresponding to the position of the pillow bags 101 as measured along a vector parallel to the second conveyance direction 136. If a pillow bag in the first queue and a pillow bag in the second queue both have coordinates that are within a specified tolerance (e.g. 10 cm), then the pillow bag in the first queue and the second queue are determined to be the same pillow bag 101. In this case, the position of the pillow bag 101 from the second queue is merged with the thickness 128 of the pillow bag 101 from the first queue to create a merged queue coupling thickness information with the most accurate and precise position information.

Although, this example has described positional information in two queues being merged when coordinates in the direction of conveyance match to a specified degree, other approaches could also be used. For example, the positional information from two queues could be merged based on any other measured coordinates that indicate that an approximate position and thickness of a bag in the first queue corresponds to a more precise position of the bag in the second queue.

In one embodiment, the robot 108 only picks a pillow bag 101 if the information associated with that pillow bag satisfies certain criteria. For example, in one embodiment the robot 108 ignores a pillow bag 101 if information from a first queue and information from a second queue regarding the coordinates of the pillow bag 101 do not match within a specified tolerance (e.g. 10 cm). As another example, the robot 108 ignores a pillow bag if it is too close to another pillow bag or misshapen. For example, two pillow bags can be stuck together or too close to each other for the distance sensor 106 to accurately measure the thickness 128 associated with each pillow bag.

In one embodiment, information regarding a pillow bag 101, for example the thickness 128 and position of the pillow bag 101, is used to assign three-dimensional coordinates where the robot 108 picks the pillow bag 101. In one embodiment, a two-dimensional position of the bag along the plane of the bag-contacting surface 134 of the second input device 103 is provided by the vision system 107 and the thickness 128 of the pillow bag is provided by the distance sensor 106. Because the pillow bag 101 can be moving, for example along the second input device 103, the three-dimensional coordinates for picking the pillow bag 101 are selected in part based upon where the pillow bag will be at the time the robot 108 reaches the three-dimensional coordinates. For example, in one embodiment, information regarding the thickness of the pillow bag is acquired by a distance sensor 106 and transmitted to a robot controller where it is stored. Furthermore, information regarding the position of the pillow bag is acquired from a presence sensor 113 and transmitted to the robot controller where it is stored.

As the robot controller receives information, it can save the information along with the time it was received. For example, in one embodiment, the robot controller can create a first queue with information regarding a pillow bag including the position of the bag, the thickness of the bag, and the time that the measurements were acquired. In one embodiment, the robot controller receives information regarding a more accurate position and an orientation of the pillow bag from a vision system and creates a second queue of information with the more accurate position of the pillow bag and the time it was obtained. In one embodiment, the robot controller receives information from an encoder 104 regarding the position of the encoder, which in conjunction with the time, can be used to determine the position of the second input device 103 and the position of the pillow bag 101 on the second input device 103 at a particular point in time. In one embodiment, the robot controller creates a more accurate queue of information for the pillow bag 101 comprising the thickness 128 of the bag from the first queue, the more accurate position and an orientation of the bag from the second queue, and a time associated with the position of the bag. In one embodiment, the robot controller positions and orients the end effector 145 on a robot 108 to pick the pillow bag 101 at a particular time and position based on the information in the more accurate queue.

Fifth, after the robot 108 picks the pillow bag 101, the measurement of the thickness 128 of the pillow bag 101, can be used to accurately and precisely place the pillow bag 101 on a universal surface 109 moving along a universal surface conveyor 110. For example, in FIG. 1, the universal surface 109 is a tray and the universal surface conveyor 110 is a tray conveyor belt. The measurement of the thickness 128 of the pillow bag 101 can be used to position the robot 108 so that it accurately and precisely places the pillow bag 101 in its place in an array of pillow bags 137 to create a high quality pattern. In one embodiment, a plurality of robots can work together to form the array of pillow bags 137. For example, this enables two robots working at a given speed to form an array of pillow bags 137 as fast as a faster robot working at twice the given speed. In one embodiment, this enables energy savings and cost savings due to using less power consumption (or fuel) and lubrication and due to less error in picking and placing pillow bags.

In another embodiment, the resulting forces on the bags will be reduced when using multiple robots. For example, if a plurality of robots is used in place of a single robot to place product at a combined total rate, then the individual robots in the multiple-robot-system can accelerate at slower rates and still achieve the same combined total rate of placement as the single-robot system. If the rate the robots accelerate the bags is decreased, then the force on the bags will also be decreased because (in the absence of other forces) the force on a bag is equal to the mass of the bag times its acceleration. Additionally, using multiple robots can decrease the rate of angular acceleration on bags and therefore decrease torque on the bags. In another embodiment, two robots working together at a given speed can form an array of pillow bags twice as fast as a single robot working at the given speed. For example, in some embodiments, the conveyor belt or other input device can move pillow bags more quickly than a single robot can pick and place the pillow bags into an array of pillow bags. In some embodiments a plurality of robots work together to pick and place the pillow bags at speeds faster than the speed of a single robot. In some embodiment, a single robot can pick and place pillow bags into an array of pillow bags at a rate of at least about 60 pillow bags per minute, at least about 80 pillow bags per minute, or at least about 100 pillow bags per minute. In some embodiments, a plurality of robots can pick and place pillow bags at multiple times the rate of a single robot, for example, 1.5 times, 2 times, 2.5 times, 3 times, 6 times, or 12 times the rate of a single robot.

Generally speaking, the use of a plurality of robots in place of a single robot is potentially advantageous for several reasons. It can increase production rates, lower the forces required to control the bags, or both increase production rates and lower the forces on the bags. Accordingly, in some embodiments, the use of a greater number of robots in place of a smaller number of robots can be advantageous.

In one embodiment, a pattern creation cell can accommodate pillow bags of variable thicknesses. For example, in one embodiment, the pattern creation cell comprises a robot 108 that can accommodate pillow bags 101 of variable thickness 128 without the need for operator intervention or adjustments to the pattern creation cell. In one embodiment, the feed forward unit 105 comprises a vertical stop that maintains a gap with a minimum distance between the feed forward unit and a first input device 102. If the minimum gap distance and the maximum height 131 of the tapered end 129 of the feed forward unit 105 are properly sized for the range of thicknesses that pillow bags 101 can exhibit, then the feed forward unit 105 can accommodate any pillow bags 101 or some subset of pillow bags 101 that contact the feed forward unit 105. For example, in one embodiment, the vertical stop is set so that the minimum gap distance is smaller than the thickness of all pillow bags or some subset of pillow bags. Accordingly, all pillow bags 101 will create a measurable change in the elevation of the feed forward unit 105 when the pillow bags contact the feed forward unit. In one embodiment, the vertical stop is set so that the minimum gap distance is sufficiently large to accommodate all pillow bags or a subset of all pillow bags. For example, in one embodiment, as the minimum gap distance is changed, the maximum height 131 of the tapered end 129 of the feed forward unit 105 changes by an equal amount. Thus, in one embodiment, the maximum height 131 of the tapered end 129 of the feed forward unit 105 can be set by setting the vertical stop.

The array of pillow bags 137 comprises pillow bags of various thicknesses that are stacked so that the pillow bags are right-side up. In FIG. 1, the orientation of the pillow bags in the array of pillow bags 137 is shown by bottom-to-top vectors 138 pointing from the bottom to the top of each pillow bag. The bottom-to-top vectors 138 are oriented perpendicular to and away from the plane represented by the surface of the universal surface 109. The thickness of each pillow bag is oriented parallel to the universal surface 109 and a first placement vector 114.

The position of a pillow bag's 101 placement along the first placement vector 114 depends on the thickness 128 of the pillow bag 101 and the thickness of any other pillow bags that have already been placed in an array of pillow bags 137 on the universal surface 109. For example, in FIG. 1 the position of the pillow bag 101 along the first placement vector 114 is determined using the measurement of the thickness 128 of the pillow bag 101 and captured or saved information regarding the position of previously placed pillow bags in the array of pillow bags 137.

In one embodiment, the array of pillow bags is arranged according to a pattern. For example, the pattern can comprise pillow bags arranged in a single plane or a plurality of planes. As another example, the pattern can comprise a plurality of pillow bags, for example, 6, 18, 25, 36, or 50 pillow bags. In one embodiment, information regarding the spacing, position, a thickness, or some combination thereof is transmitted between robots and a PAC or directly between robots. In one embodiment, a robot picks and places pillow bags to build an array of pillow bags and passes information about the array of pillow bags to another robot. Then, another robot uses the information to pick and place pillow bags to contribute to or modify the array. In one embodiment, for example, a first pattern creation cell comprising a first robot builds a first 6×1 array of pillow bags and passes information about the first array to a second pattern creation cell comprising a second robot. Then, the second pattern creation cell adds onto the first 6×1 array of pillow bags by building a second 6×1 array of pillow bags next to the first array. This process can continue until a grid, for example, a 2×3, 2×4, 3×5, 4×6, 5×10, 6×6 or 12×12 grid is constructed. Although, arrays and grids of various sizes can be constructed using various numbers of robots. In one embodiment, an array comprises only one row or column. In another embodiment, an array is an arrangement, for example, an ordered arrangement.

In one embodiment, information is transmitted along a line of communication, for example, a line of electronic communication. In one embodiment the line of communication comprises, a wired connection, Ethernet connection, fiber optic connection, wireless connection, Bluetooth connection, radio connection, WiFi connection, a connection using wireless telephone standards, 1 G, 2 G, 3 G, LTE, 4 G, 5 G, a connection using other technology, or some combination thereof. Although, in one embodiment a line of electronic communication can be a power line. In some embodiments, a line of communication directly transmits information from one device to another device. In some embodiments, a line of communication indirectly transmits information from one device to another device, for example, by transmitting information from one device to an intermediate device or devices and then to another device.

The universal surface conveyor 110 conveys the universal surface 109 in a direction that is horizontal. As seen from any side, for example, as shown in FIG. 1, the universal surface 109 is approximately in the shape of a wedge with a bottom surface 139 that is oriented horizontal and a top surface 140 that is oriented at a compound angle from horizontal.

Figure 7A:
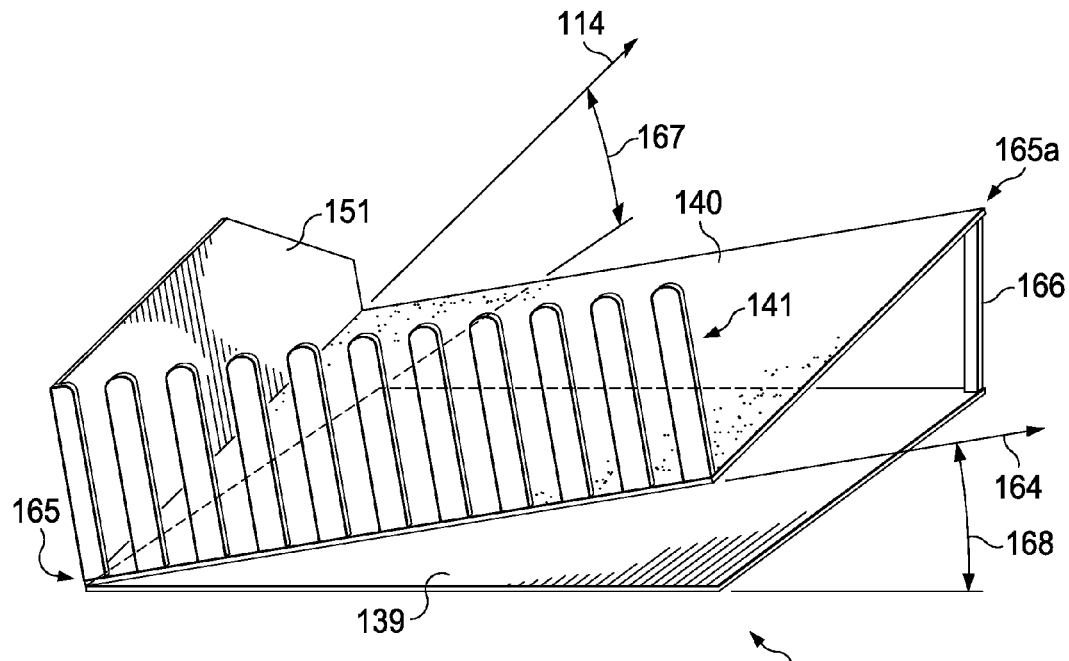
FIG. 7A is a schematic view depicting the compound angle of a universal surface.

As shown in FIG. 7A, which shows a universal surface 109 with the positions of supports 141 and 151 swapped relative to FIG. 1, the top surface 140 is parallel to a first placement vector 114 which is at a first angle 167 away from horizontal and points away from a lowest corner 165 of the universal surface 109. The top surface 140 is also substantially parallel to a second placement vector 164, which is at a second angle 168 away from horizontal. The second placement vector 164 also points away from the lowest corner 165 of the universal surface 109. Together, the first and second angles 167, 168 of the first and second placement vectors 114, 164 provide the compound angle for the top surface 140 of the universal surface 109.

Returning to FIG. 1, a first support 141 extends perpendicularly from the top surface 140 of the universal surface 109. The first placement vector 114 points away from the first support 141. A second support 151 also extends perpendicularly from the top surface 140. The second placement vector 164 (not shown in FIG. 1, but depicted in FIG. 7A) points away from the second support 151. The lowest pillow bag 142 on the incline leans against the first support 141 and the second support 151 under the force of gravity. If the bottom of the lowest pillow bag 142 on the incline is placed too close to the first support 141, the lowest pillow bag 142 can tilt and fall away from the incline under the force of gravity. If the bottom of the lowest pillow bag 142 is placed too far from the first support 141, the bottom of the lowest pillow bag can slip up the incline of the top surface 140, and the top of the lowest pillow bag can slip down the first support 141 under the force of gravity. Accordingly, the lowest pillow bag 142 will tilt and fall towards the first support 141. Thus, the lowest pillow bag 142 must be accurately and precisely placed and oriented with respect to the first placement vector 114 and the first support 141 to prevent the lowest pillow bag 142 from falling over. Furthermore, even if the lowest pillow bag 142 does not fall over, if it is not accurately and precisely placed and oriented with respect to the first placement vector 114, a poor quality pattern can result, or other pillow bags, which directly or indirectly lean against the lowest pillow bag 142 can fall. For example, because the second lowest pillow bag 143 leans against the lowest pillow bag 142, the second lowest pillow bag 143 must be accurately and precisely placed and oriented with respect to the first placement vector 114 and the lowest pillow bag 142. As each additional pillow bag is placed in the array of pillow bags 137, it must also be accurately and precisely placed and oriented with respect to the first placement vector 114 and the previously placed pillow bags. If any pillow bag is inaccurately or imprecisely placed, it can create a poor quality pattern. For example, the pillow bags in the array of pillow bags 137 can fall over, the pillow bags can fail to be oriented right-side-up, the pillow bags can be damaged by the robot 108, or the pillow bags can otherwise fail to conform to the desired pattern or arrangement of the pillow bags. Analogous considerations are relevant with respect to the lowest pillow bag's 142 placement in relation to the second support.

After the robot 108 has completed its portion of the pattern for the array of pillow bags 137, a column height 144 for the universal surface 109 is given by a distance along the first placement vector 114 equal to the sum of the thickness of each pillow bag and the gap between each pillow bag in the array 137. In some embodiments, the robot 108 captures the column height, for example, by measuring the column height 144 directly or indirectly. The column height 144 of the universal surface 109, and other captured information regarding the condition, dimensions, position, and orientation of the pillow bags in the array of pillow bags 137 are stored (e.g., locally or remotely) by the robot controller and passed to a programmable automation controller (PAC) or programmable logic controller (PLC). The information can be used to position a robot 108 to place another pillow bag in the array of pillow bags 137. For example, at least one current column height can be transmitted from the PAC to a control system or a robot controller. Additionally, the PAC can share the information with other pattern creation cells. For example, after one pattern creation cell has completed a pattern, the PAC can transmit at least one current column height to a subsequent pattern creation cell. In one embodiment, the at least one current column height is used to calculate the position where a pillow bag should be placed to form a pattern. In one embodiment, after a pillow bag is placed, for example, in a column, the at least one column height associated with the column is updated by the robot controller. In one embodiment, after a pattern is completed for a tray, all current column heights are transmitted to the PAC. For example, the information captured by the robot controller regarding the array of pillow bags 137 can be transmitted to the PAC.

In some embodiments a pattern creation line is formed from a plurality of pattern creation cells. For example, in some embodiments, each pattern creation cell in a pattern creation line creates a portion of a pattern on a universal surface. Accordingly, in some embodiments, each pattern creation cell places pillow bags to form part of a pattern on the universal surface and in so doing adds to the pattern created by previous pattern creation cells until the pattern is complete. Furthermore, in some embodiments a pattern creation line comprises a line PAC.

One embodiment of a pattern creation cell will now be described with reference to FIG. 1. The pattern creation cell comprises equipment for picking and placing pillow bags in an array of pillow bags 137 according to a desired pattern. For example, the pattern creation cell shown in FIG. 1 comprises a first input device 102, a feed forward unit 105, a presence sensor 113, a distance sensor 106, a second input device 103, a first encoder 104, a vision system 107, a robot 108, a universal surface 109, a universal surface conveyor 110, and a second encoder 111.

The first input device 102 comprises a bag-contacting surface 127 which is used to transport the pillow bag 101.

The feed forward unit 105 comprises legs 121 that rotate in direction 112 around two axes of rotation 122 and a bag-contacting surface 125 with a secondary input device 124. The bag-contacting surface 125 comprises a tapered end 129 with a maximum height 131.

The presence sensor 113 senses whether the pillow bag 101 is under the feed forward unit 105.

The distance sensor 106 directly or indirectly measures the thickness 128 of the pillow bag 101. In some embodiments, the distance sensor directly or indirectly measures a measured distance between the feed forward unit and an input device, which measured distance can be used, for example, to determine the thickness of a pillow bag.

The second input device 103 comprises a bag-contacting surface 134 that transports pillow bags in the second conveyance direction 136.

The first encoder 104 comprises a known radius 132 and rotates around a wheel axis of rotation 133. The first encoder 104 tracks positional information related to the second input device 103 and can be used to track position information for the pillow bags being transported by the second input device 103. If the relative positions of the second input device 103 and the first input device 102 are known, then the first encoder 104 can also be used to track positional information related to the first input device 103.

The vision system 107 comprises a 2D greyscale camera capable of detecting location and orientation of the pillow bags.

The robot 108 is capable of changing the orientation the pillow bags that are picked up. The robot 108 comprises an end effector 145. In some embodiment, the end effector 108 changes the orientation of the plane of the bag, for example, from horizontal to vertical. In other embodiments, the end effector rotates the bag about an axis so that when the bag is placed it sits on a different surface than when it was picked.

The universal surface 109 comprises a bottom surface 139 that is oriented horizontal, and a top surface 140 that is oriented at a compound angle from horizontal. The universal surface 109 also comprises a first support 141 that is approximately perpendicular to, affixed to, and extends away from a first lower end of the top surface 140. In some embodiments, as shown in FIG. 7A, the compound angle comprises a first angle 167 and a second angle 168 such that one corner 165 of the universal surface 109 is lower than all the other corners. As shown in the embodiment of FIG. 1, the lowest corner 165 is the back right corner (not visible) of the universal surface 109. In other words, as shown in FIG. 1 the universal surface 109 slants down, not only from left to right, but also from the front to the back of the page. In one embodiment, the universal surface 109 comprises a top surface 140 oriented at a compound 20 degree incline from horizontal. In some embodiments, the compound angle comprises two angles and each of the two angles is greater than 0°, greater than about 5°, greater than about 15°, greater than about 20°, greater than about 30°, less than about 90°, less than about 45°, less than about 30°, or an angle selected from the range of about 0° to about 45°, about 10° to about 30°, about 15° to about 25°, or an angle selected from any range whose end points are selected from the endpoints of, or any point within, any of the provided ranges. In some embodiments, both angles are the same angle. In other embodiments, the angles can be different, even when both angles fall within the provided ranges.

In some embodiments, the compound angle of the universal surface 109 results in a gravitational force on the bags that encourages them to justify against or align along two walls 141, 151. As shown in FIG. 1, one of the two walls is the first support 141. The other wall is the second support 151 that is behind the array of pillow bags 137. Like the first support 141, in some embodiments, the second support is approximately perpendicular to, affixed to, and extends away from a second lower end (not shown) of the top surface 140. Although not every bag touches the two walls, if a bag is not directly supported by the two walls, it can lean against another bag that is directly or indirectly supported by the walls. Further, although one embodiment of the invention has been described with reference to two fixed walls, in some embodiments the number of walls may be greater. For example, other arrangements of walls also have a lowest corner and can be used analogously. Other arrangements have a lowest side or edge and can also be used similarly, although they may not have a single lowest corner. In comparison to using a lowest corner, using a lowest edge does not typically provide as much support for maintaining the pillow bags in a desired position and orientation.

In the embodiment shown in FIG. 1, the universal surface conveyor 110 comprises a rotary servomotor with a gearbox attached to a roller with a set of sprockets. Each sprocket drives a loop of chain. The universal surfaces 109 are affixed between these loops of chain. Although, the universal surface conveyor 110 can also take other forms, for example, a conveyor belt with a flat belt upon which a universal surface 109 can sit. In other embodiments, the universal surface conveyor 110 employs rollers, upon which the universal surface 109 is supported.

With reference again to FIG. 1, the second encoder 111 tracks position information related to the universal surface conveyor 110 and can be used to track position information for the universal surface 109 and the array of pillow bags 137 being transported by the universal surface conveyor 110. In one embodiment, the encoder 111 is attached to a servomotor (not shown) with a gear box (not shown) that drives a cylinder with two sprockets (not shown) that drive a pair of chains (not shown). Universal surface 109 attaches to the chains so that as the chains move so does the universal surface 109. For example, with reference to FIG. 1, universal surface 109 is traveling out of the page.

Figure 1A:
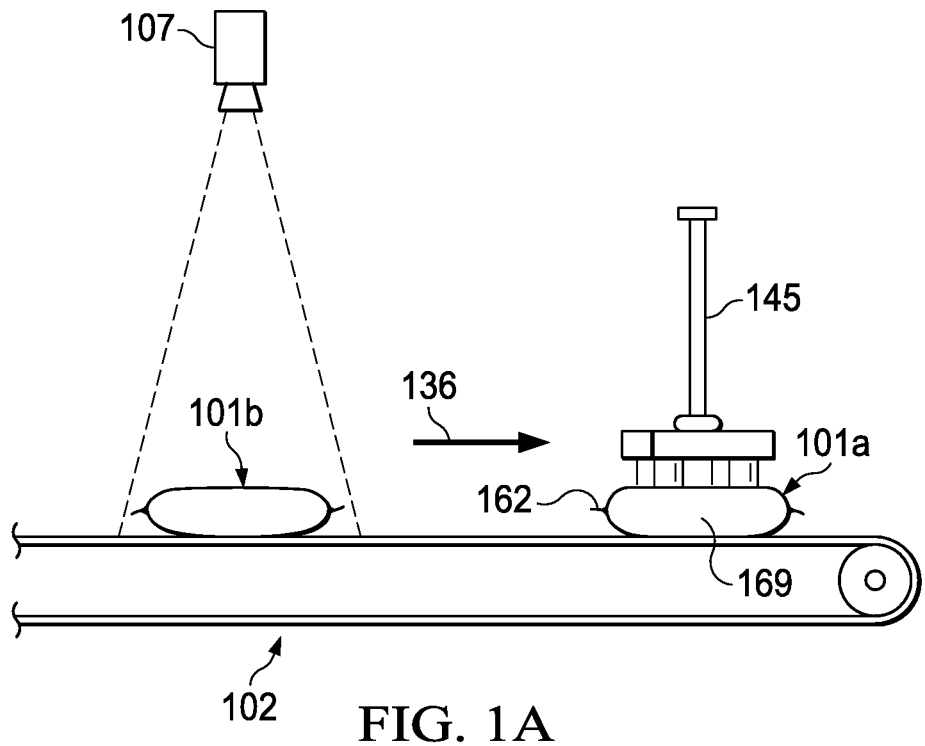
FIG. 1A is a schematic of one embodiment of the present invention depicting a side view of a robot end effector picking a pillow bag.
Figure 1B:
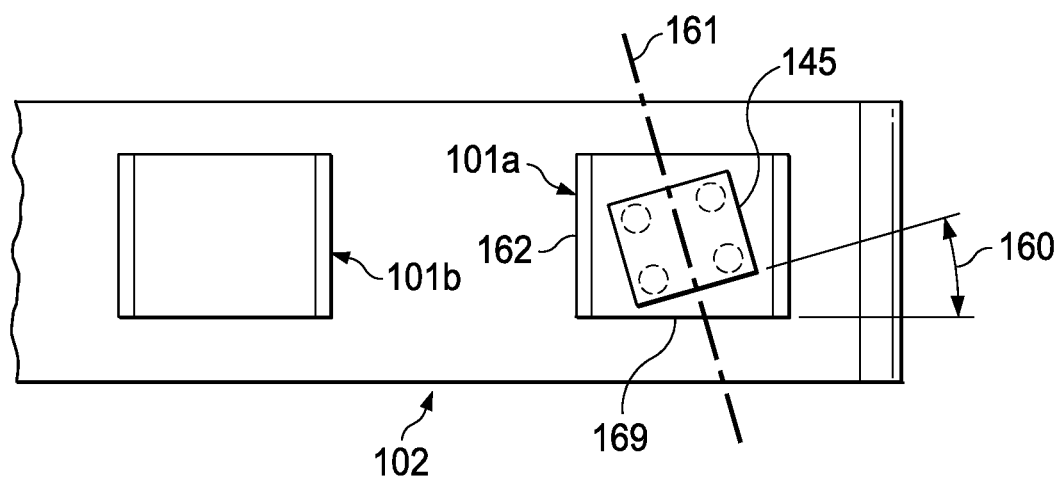
FIG. 1B is a schematic of one embodiment of the present invention depicting a top plan view of some of the elements shown in FIG. 1A.
Figure 1C:
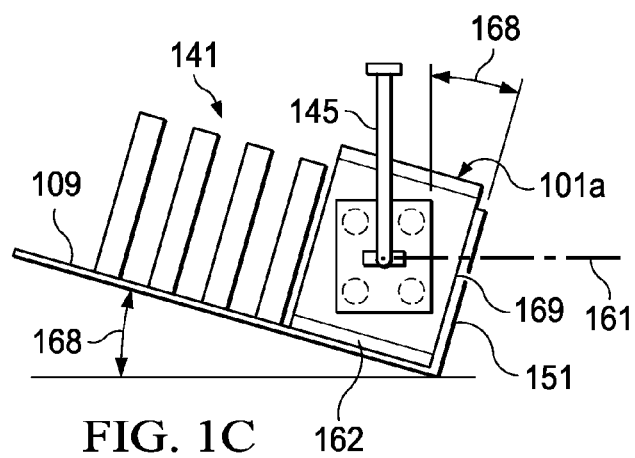
FIG. 1C is a schematic of one embodiment of the present invention depicting a side view of an end effector placing the pillow bag it picked in FIG. 1C.

FIGS. 1A-1C show an apparatus and method for picking a first pillow bag 101a from a horizontal input device 102 and placing the first pillow bag 101a in a desired orientation in alignment with a compound angled universal surface 109. As shown in a side view in FIG. 1A, a vision system 107 measures the angle of a second pillow bag 101b. As the second pillow bag 101b travels in a conveyance direction 136, it will reach the position of the first pillow bag 101a, where an end effector 145 picks the first pillow bag 101a. As the first pillow bag 101a was conveyed to a pick location, the vision system 107 tracked the first pillow bag 101a.

When the first pillow bag 101a reaches the pick location, as shown in FIG. 1B, the vision system 107 commands the end effector 145 to be oriented at a picking angle 160 relative to a supported side 169 of the first pillow bag 101a. Accordingly, the end effector 145 picks the first pillow bag 101a at a picking angle 160 so that a rotation about an axis 161 achieves a desired alignment of the supported side 169 of the first pillow bag 101a relative to a supporting surface (e.g. sidewall 151) of the universal surface 109.

As can be seen in FIG. 1C, when the first pillow bag 101a is placed in the universal surface 109, the supported side 169 of the first pillow bag 101a is aligned with the supporting surface (e.g. sidewall 151) of the universal surface 109.

As shown in FIGS. 1B and 1C, the picking angle 160 is substantially equal to an angle 168 of the universal surface 109 relative to horizontal and substantially equal to an angle 168 of the support 151 to vertical. Picking the first pillow bag 101a at a picking angle 160 equal to the angle 168 of the support 151 relative to vertical is useful, for example, when it is desirable to have a lower side 169 of the first pillow bag 101a aligned (e.g., flush) with the supporting surface 151 of the compound angled tray 109. Although aligning the first pillow bag 101a with the supporting surface 151 is not always necessary, it can be useful to provide additional support for the first pillow bag 101a, for example, when creating standup patterns in which the first pillow bag 101a stands on a relatively thin edge 162. When it is desirable to place the first pillow bag 101a at an angle to the universal surface 109, the picking angle 160 can be adjusted accordingly.

Figure 1D:
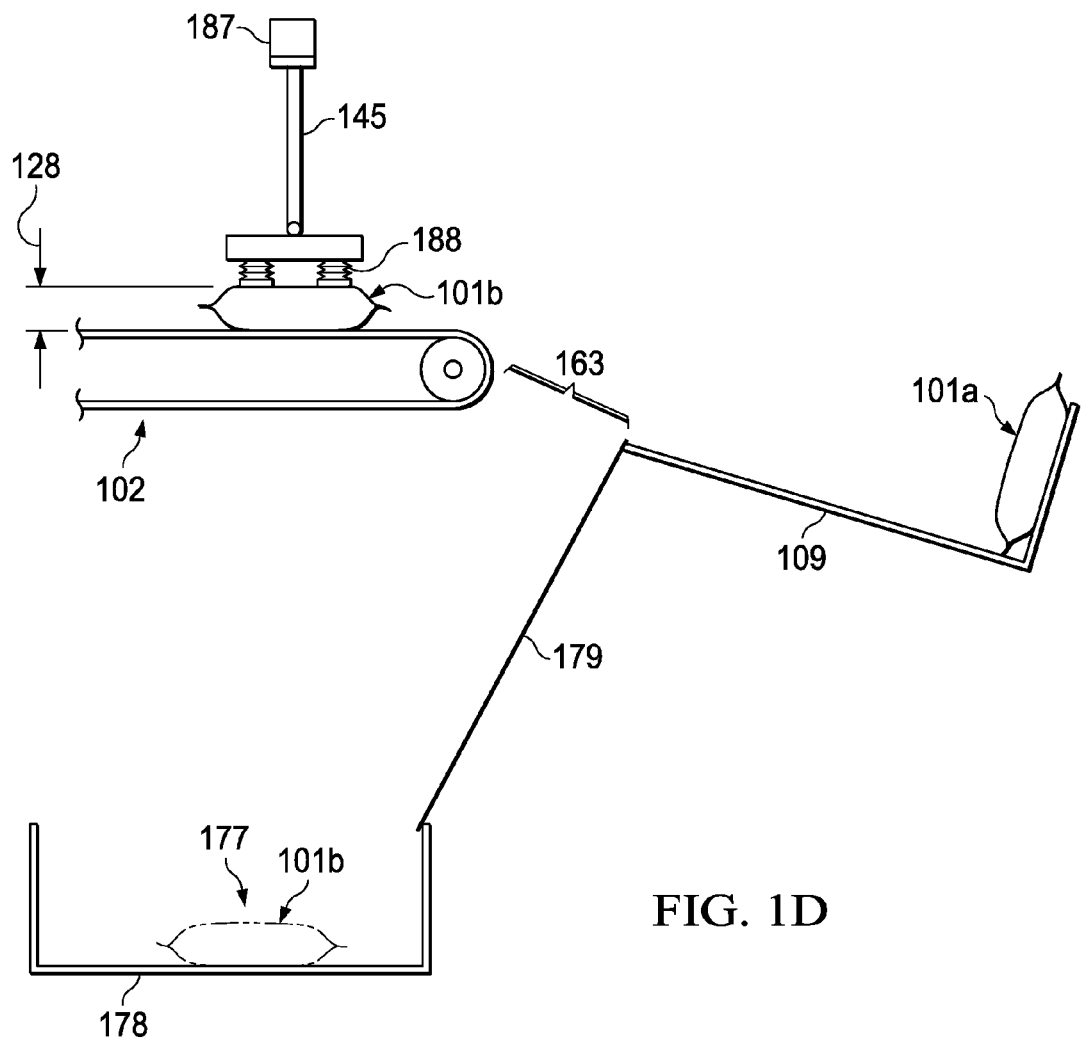
FIG. 1D is a schematic of one embodiment of the present invention depicting a side view of a pillow bag being picked by an end effector.

FIG. 1D shows an end effector 145 picking a pillow bag 101b from an input device 102. The target position for the pillow bag is a position adjacent to a previously placed pillow bag 101a in a compound angled universal surface 109. The target alignment for the pillow bag 101b is a standup alignment similar to the previously placed pillow bag 101a.

To pick the pillow bag 101b, the end effector 145 is commanded to a predefined height 128 above the input device 102, which height corresponds to the thickness (e.g., caused by air fill) of the pillow bag 101b. The end effector 145 picks the pillow bag (e.g. using suction created by a vacuum nozzle 188 with bellows). If the thickness of the bag 101b does not satisfy a specification condition (e.g., being at least as large as a specified value) then the bag 101b will be rejected. For example, the end effector 145 can bring the bag 101b to a rejection space 163 between an end of the input device 102 and the edge of the compound angled universal surface 109 and release the bag. Alternatively, if the end effector 145 simply does not pick the bag 101b, the bag will run off the input device 102 to the rejection space 163. The bag 101b then slides along ramp 179 to a location 177 in a reject bin 178.

Similarly, a vacuum sensor 187 measures the vacuum level achieved when the end effector 145 is in contact with the bag 101b. If the vacuum level is insufficient to properly control the bag for an accurate placement, then the end effector 145 releases the bag into the rejection space 163.

Figure 2A:
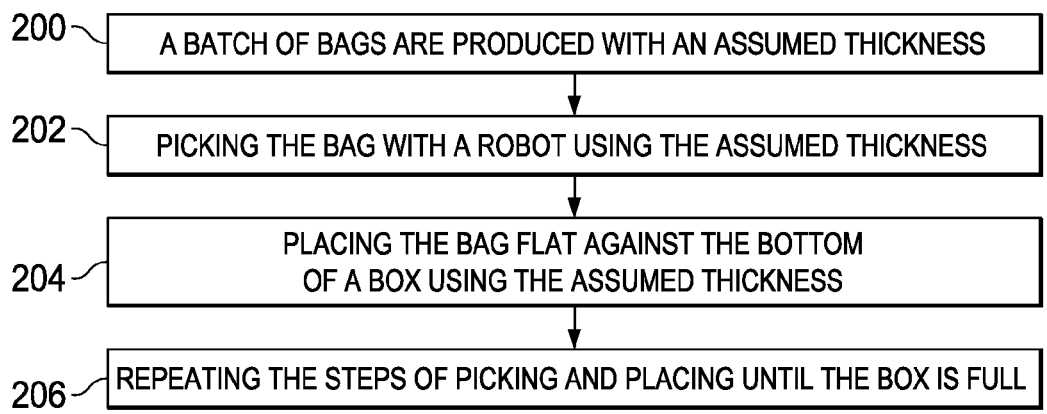
FIG. 2A is a flow chart representation of a prior art process for picking and placing a pillow bag using an assumed thickness.
Figure 2B:
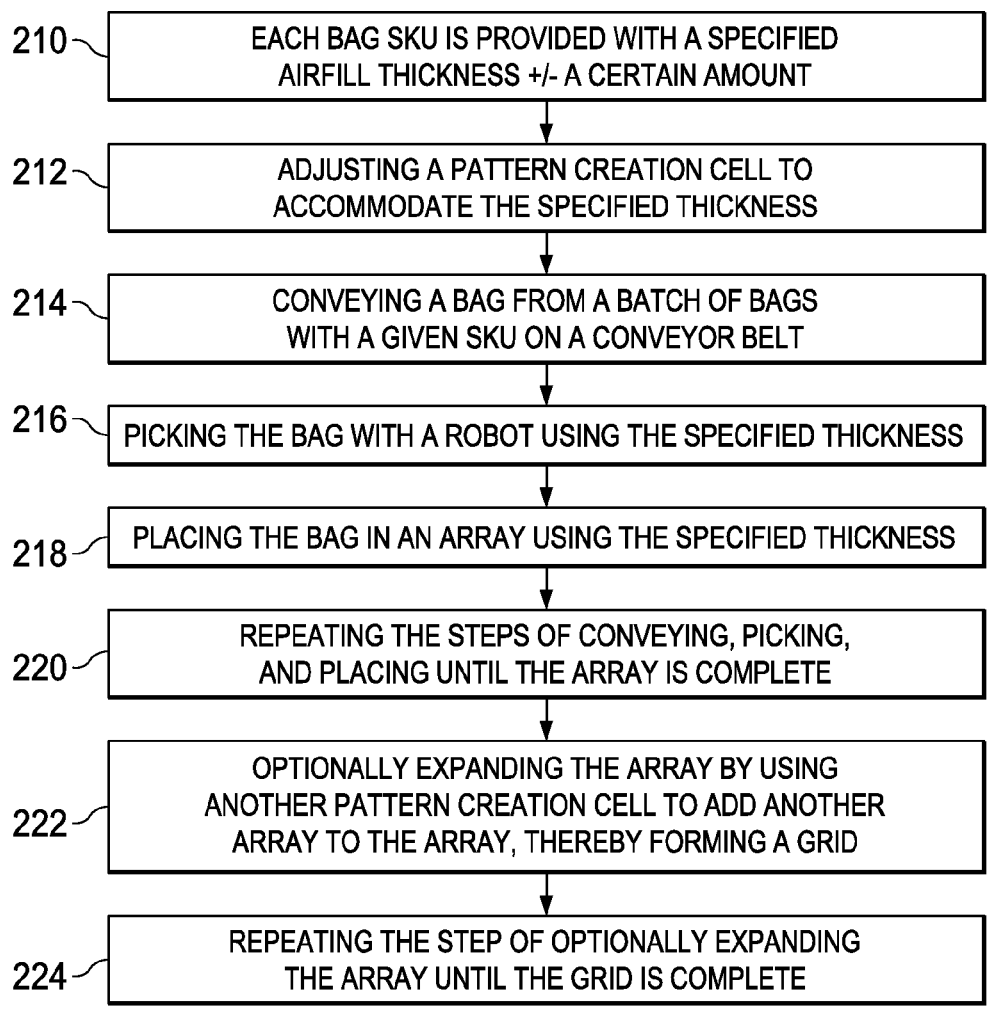
FIG. 2B is a flow chart representation of an overall process of one embodiment of the invention.

One embodiment of a method according to the invention will now be described with respect to FIG. 2B. In a first step 210, each stock keeping unit ("SKU") of bags is provided with a specified thickness to determine air fill amount within a certain tolerance. Therefore, each SKU typically has an assumed thickness within this tolerance. This enables the operator to develop one assumed thickness for every bag in the batch. Second, in an adjusting step 212 the operator adjusts the pattern creation cell to accommodate bags of the assumed thickness. Third, in a conveying step 214, a bag from a batch with a given SKU is conveyed on a conveyor belt. Fourth, in a picking step 216, as each bag approaches a robot, the robot picks the bag using the assumed thickness from the specification step 210. Fifth, in a placing step 218, after the robot picks the bag, it places the bag in a first array, for example, a line of bags. In placing the bag, the robot again uses the assumed thickness. For example, the assumed thickness is used to estimate the position of previously placed bags and determine where the bag should be placed in relation to the other bags. Sixth, in a first repeating step 220, the steps of conveying 214, picking 216, and placing 218 are repeated until the first array is complete. Seventh, in an optional expanding step 222, the first array is optionally expanded by using another pattern creation cell to add a second array to the first array to create an expanded array or a grid. For example, the first array can comprise one column of bags, while the expanded array comprises two columns of bags. Eighth, in a second repeating step 224, the step of optionally expanding the array is repeated until the expanded array matches a desired pattern. For example, the desired pattern can be in the form of a 3×3 grid of bags.

One embodiment of a method according to the invention will now be described with reference to the flowchart in FIG. 3. First, in a measuring step 302, a pattern creation cell measures the thickness 128 of a pillow bag 101 that is moving on a conveyor belt 102 to obtain a measured thickness. In one embodiment, the measured thickness 128 is measured directly or indirectly using a distance sensor 106.

Second, in a transmitting step 304 the measured thickness 128 is transmitted directly or indirectly from the distance sensor 106 to a robot 108. In some embodiments, the measured thickness is transmitted from the distance sensor to a PAC and then to the robot. In other embodiments, the measured thickness is transmitted from the distance sensor to a first PAC, from the first PAC to a control system, from the control system to a second PAC, and from the second PAC to a robot. Other transmission paths are also possible.

Third, in a picking step 306, as each pillow bag 101 approaches a robot 108, the robot picks the bag using the measured thickness 128. In one embodiment the pillow bag is picked using an end effector 145 on the robot 108. In one embodiment, the end effector 145 comprises a vacuum nozzle which creates suction between the robot 108 and the pillow bag 101. In one embodiment, the vacuum nozzle comprises flexible suction cups, and bellows connect the flexible suction cups to the end effector 145.

Fourth, in a placing step 308, after the robot 108 picks the bag 101, it places the bag according to a pattern to form a first array 137. In one embodiment, the pattern is a line or column of bags. In one embodiment, the measured thickness 128 is used to place the bags and maintain a desired pattern quality for the first array. In one embodiment, the measured thickness is used to conserve space in a package. For example, in one embodiment, the measured thickness is used to place the bag as close to previous bags as possible without damaging bags or negatively affecting the desired pattern quality.

Fifth, in a first repeating step 310, the steps of measuring 302, transmitting 304, picking 306, and placing 308 are repeated until the first array 137 is complete.

Sixth, in an optional capturing step 312, the pattern creation cell captures information about the first array 137. For example, the pattern creation cell can determine information about the array, calculate information about the array, acquire information about the array, or perform some combination of these steps. In one embodiment, the pattern creation cell can capture information about an array by recording the location of the robot 108 as it places pillow bags 101 in the array 137. In one embodiment, the pattern creation cell captures at least one column height 144 that is the sum of the thicknesses 128 of all the pillow bags 101 in a column in an array 137. In one embodiment, the pattern creation cell captures information related to the position, orientation, thickness, or some combination thereof for at least one pillow bag in an array. In one embodiment, the pattern creation cell captures information related to the position, orientation, thickness, or some combination thereof for each pillow bag in an array.

Seventh, in an optional transmitting step 314, information about the array 137 is transmitted, for example, within a pattern creation cell, from one pattern creation cell to another, or using some combination thereof. In one embodiment, the information is transmitted from one device or system to another in a pattern creation cell, for example, from a second encoder 111, a distance sensor 106, or a robot 108 to a control system. It can be useful to transmit information about the array within a pattern creation cell to verify that the array satisfies a desired pattern quality. It can also be useful to transmit information within a cell to take an appropriate action to accept or reject an array depending upon whether it satisfies a desired pattern quality. In another embodiment, information about the array is transmitted from one pattern creation cell to another pattern creation cell. In yet another embodiment, information about the cell is transmitted in some combination of inter-cell and intra-cell transmission.

Eighth, in an optional expanding step 316, the first array 137 is optionally expanded by using another creation cell to add a second array to the first array to create an expanded array or a grid. For example, the first array can comprise one column of bags 101, while the expanded array comprises two columns of bags.

Ninth, in a second repeating step 318, the step of optionally expanding the array 137 is repeated until the expanded array matches a desired pattern. For example, the desired pattern can be a grid of bags with multiple rows and columns.

Figure 3:
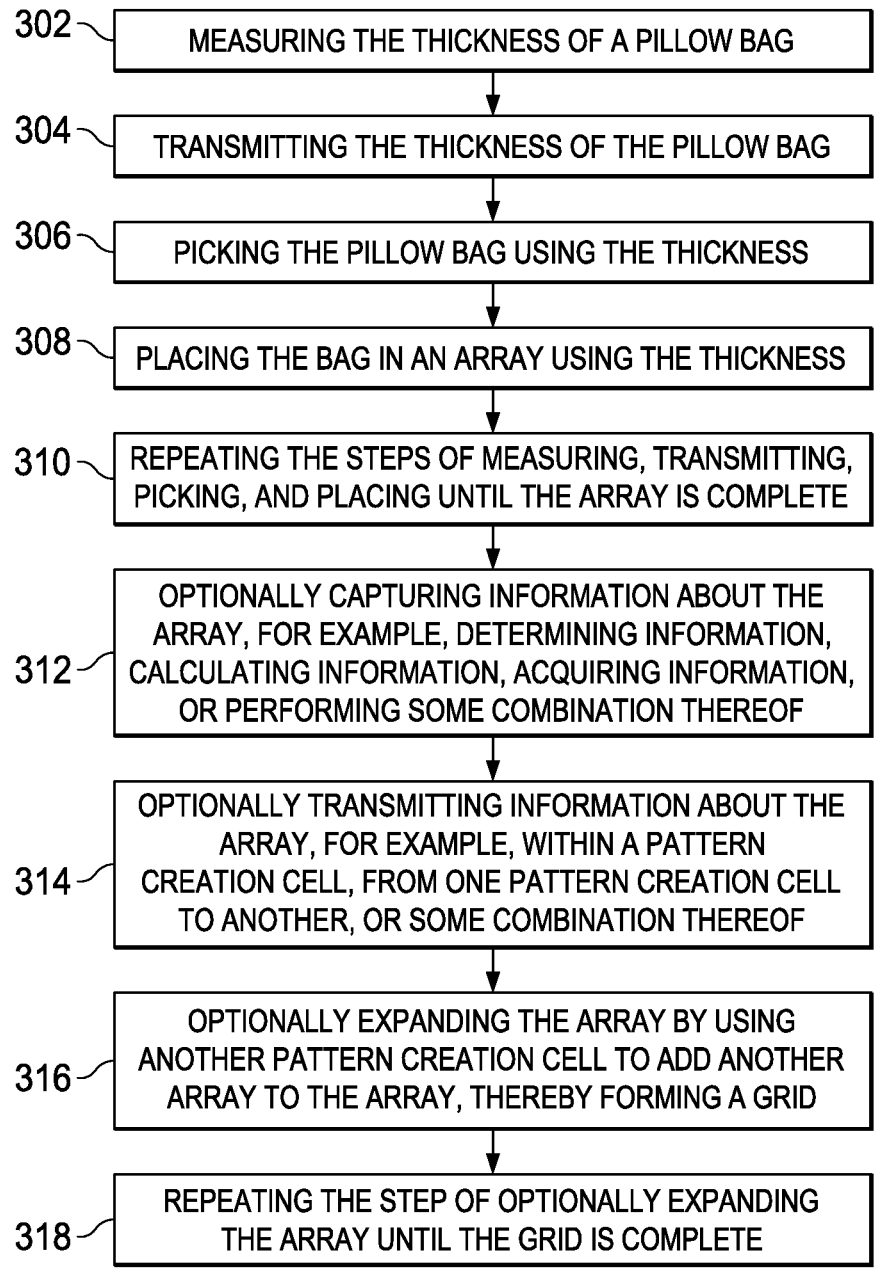
FIG. 3 is a flow chart representation depicting the overall process of one embodiment of the invention.

Although the steps for the embodiment shown in FIG. 3 have been provided in a particular order, the steps can be appropriately reordered in other embodiments. For example, in one embodiment, performing the optional transmitting step 314 occurs at multiple points in a pattern creation process. Additionally, in some embodiments, not all of the steps shown in FIG. 3 need to be present to perform a method according to the invention. Likewise although the steps for some embodiments (e.g. the embodiment shown in FIGS. 3A-3C) have been provided in a particular order, the steps can be reordered in other embodiments as appropriate.

Figure 3A:
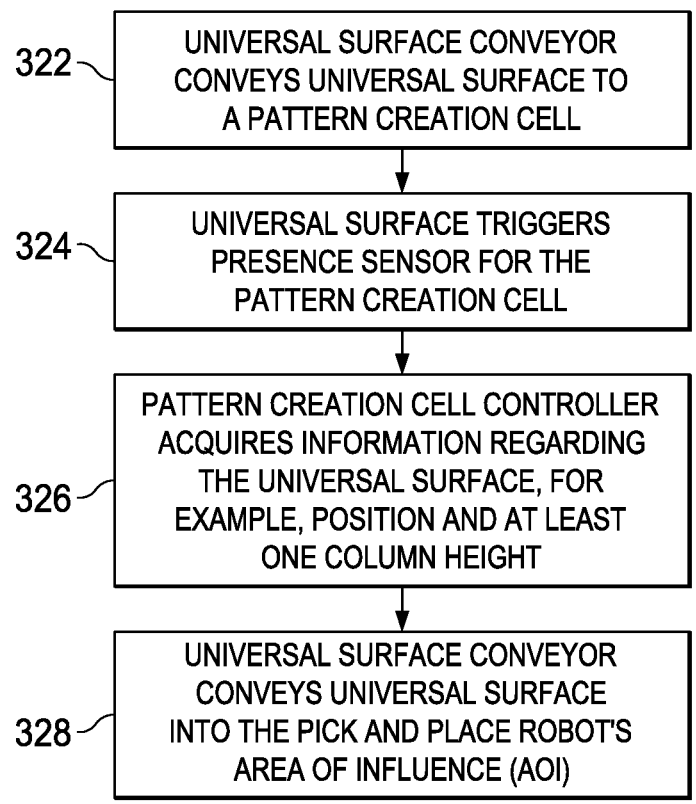
FIG. 3A is a flow chart representation depicting part of an overall process for another embodiment of the invention.

One embodiment of an apparatus and method according to the invention will now be described with reference to FIGS. 3A-3D. As shown in FIG. 3A in a first universal surface conveying step 322, a universal surface conveyor conveys a universal surface to a pattern creation cell (e.g., pick and place cell). For example, FIGS. 1, 10, 11, 12, 13, and the accompanying description describe examples of a universal surface conveyor.

Second, in a universal surface presence sensing step 324, the universal surface triggers a presence sensor for the universal surface. An example of a presence sensor (e.g. for a pillow bag, which could also sense other objects such as a universal surface) is described in FIGS. 1, 4, and 4A and the accompanying description.

Third, in a universal surface information acquisition step 326, a pattern creation cell controller for the pattern creation cell acquires information regarding the universal surface, for example, the position of the universal surface and at least one column height for the universal surface. For example, information regarding an object (e.g., a pillow bag or a universal surface) can be acquired as described in FIGS. 1, 1A-1D, 4, 4A, 4B, and the accompanying description.

Fourth, in a second universal surface conveying step 328, the universal surface conveyor conveys the universal surface into an area of influence (AOI) for a robot (e.g. pick and place robot). For example, FIGS. 1, 10, 11, 12, 13, and the accompanying text describe how an object (e.g. a pillow bag or a universal surface) can be conveyed into the AOI of a robot.

In some embodiments the universal surface comprises a compound angled tray. In some embodiments, the presence sensor for the universal surface comprises a photo eye. In some embodiments, during the universal surface information acquisition step 326, when the universal surface triggers the presence sensor for the universal surface, a pick and place robot controller starts to continuously acquire information regarding the position of the universal surface from an encoder. For example, in some embodiments the pick and place robot controller acquires information regarding the universal surface (e.g., position) from the pattern creation cell controller. Furthermore, in some embodiments, during the universal surface information acquisition step 326, a pattern creation line PAC sends, via a communications fieldbus, data concerning the universal surface (e.g., current column height values) to the pick and place robot controller. For example, if the pattern creation cell is the first cell in a pattern creation line, the PAC sends zeros for all the column height values of the universal surface.

Figure 3B:
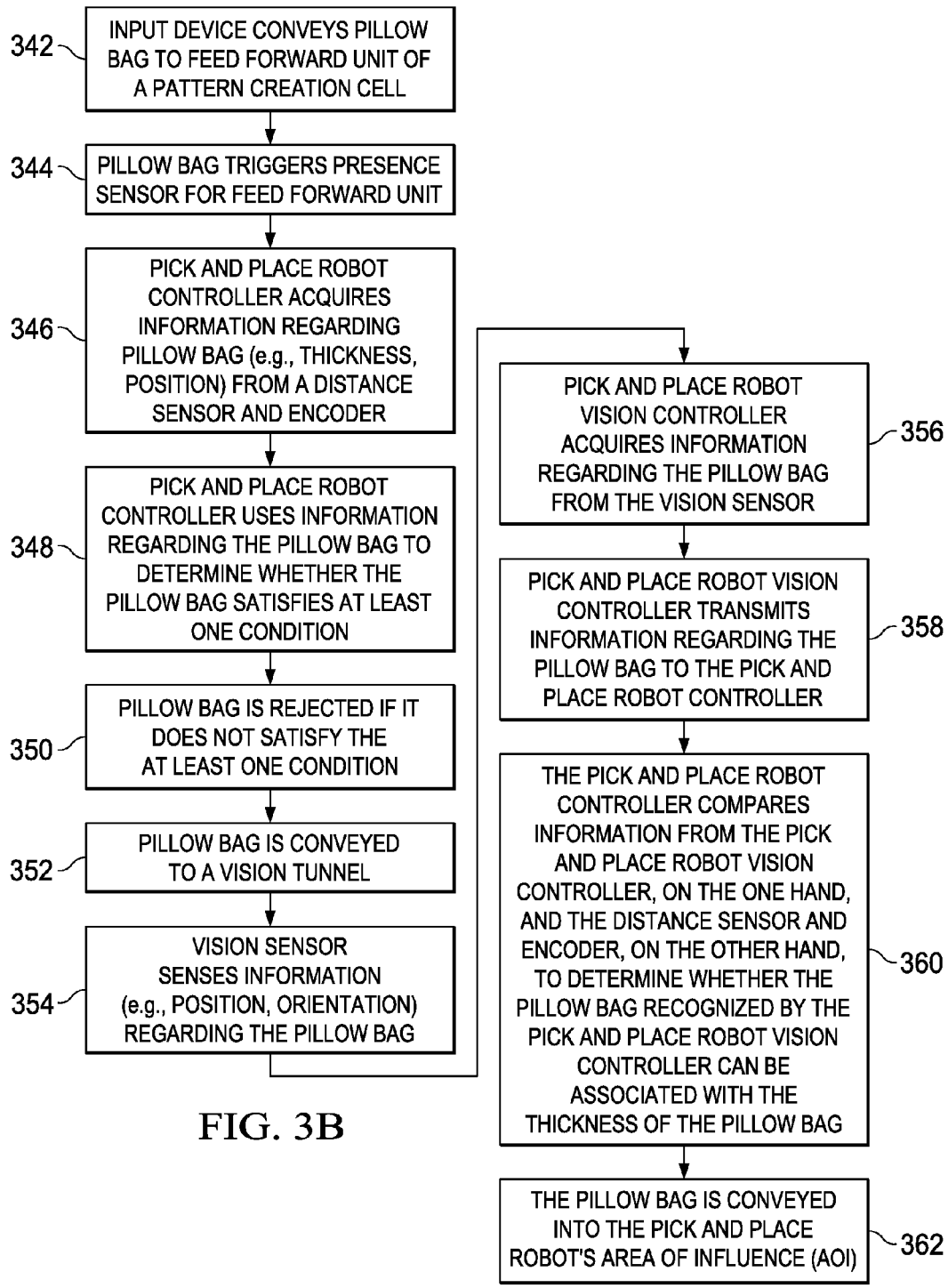
FIG. 3B is a flow chart representation depicting part of an overall process for the embodiment of FIG. 3A.

As shown in FIG. 3B, in a first pillow bag conveying step 342, a first input device conveys a pillow bag to a feed forward unit of a pattern creation cell. For example, FIGS. 1, 10, 11, 12, 13, and the accompanying description describe examples of input devices (e.g. for pillow bags or universal surfaces).

Second, in a first pillow bag sensing step 344, the pillow bag triggers a presence sensor for the feed forward unit. An example of a presence sensor is described in FIGS. 1, 4, and 4A and the accompanying description.

Third, in a first pillow bag information acquisition step 346, a pick and place robot controller (e.g. a controller for a pick and place robot in the pattern creation cell) acquires information regarding the pillow bag from a distance sensor. For example, information regarding an object can be acquired as described in FIGS. 1, 1A-1D, 4, 4A, 4B, and the accompanying description. In some embodiments the pick and place robot controller directly or indirectly acquires the thickness of the pillow bag from a distance sensor and the position of the pillow bag from an encoder. In some embodiments a pick and place robot controller is the same as a pattern creation robot controller and a pick and place robot is the same as a pattern creation robot. Accordingly, in some embodiments the terms can be used interchangeably.

Fourth, in a conditional verification step 348, the pick and place robot controller uses information regarding the pillow bag to determine whether the pillow bag satisfies at least one condition. Fifth, in a gatekeeping step 350, the pillow bag is rejected if it does not satisfy the at least one condition. For example, FIG. 1D and the accompanying description describe an example of gate keeping or quality verification.

Sixth, in a second pillow bag conveying step 352, the pillow bag is conveyed by a second input device to a vision tunnel. Seventh, in a second pillow bag sensing step 354, a vision sensor senses information (e.g., position and orientation) regarding the pillow bag. Eighth, in a second pillow bag information acquisition step 356, a pick and place robot vision controller acquires information regarding the pillow bag from the vision sensor. For example, a vision system is described in FIGS. 1, 1A, 11 and the accompanying description. Ninth, in a pillow bag information transmission step 358, the pick and place robot vision controller transmits information regarding the pillow bag to the pick and place robot controller.

Tenth, in an information comparison step 360, the pick and place robot controller compares information from the pick and place robot vision controller, on the one hand, and the distance sensor and the encoder, on the other hand, to determine whether the pillow bag recognized by the pick and place robot vision controller can be associated with a thickness of the pillow bag. For example, in one embodiment if the position of the pillow bag as determined by the encoder and the vision sensor match within a specified tolerance, then the two position readings are deemed to correspond to the same pillow bag. Since a thickness measurement from the distance sensor is already associated with the position of the pillow bag as determined by the encoder, the thickness measurement is now also associated with the more accurate position determined by the vision sensor. Seventh, in a third pillow bag conveying step 362, the pillow bag is conveyed into the pick and place robot's area of influence (AOI). For example, FIGS. 1, 10, 11, 12, 13, and the accompanying text describe how an object can be conveyed into the AOI of a robot.

In some embodiments, the steps in FIGS. 3A and 3B occur simultaneously. For example, a universal surface can be conveyed to a pattern creation cell on the universal surface conveyor the same time that pillow bags are conveyed to the feed forward unit and a vision tunnel. In some embodiments it is efficient for the universal surface to enter a pick and place robot's area of influence (AOI) before the pillow bags enter the robot's AOI because the pillow bags are typically placed on the universal surface. Nonetheless, in some embodiments the invention can also accommodate scenarios where pillow bags enter the robot's AOI before the universal surface. For example, the input device for the pillow bags can pause so that pillow bags do not leave the robot's AOI before the universal surface enters the robot's AOI and the robot places the pillow bags on the universal surface. In some embodiments, the invention can accommodate scenarios where pillow bags enter the robot's AOI after the universal surface. For example, the input device for the universal surface can pause so that the universal surface does not leave the robot's AOI before the pillow bags enter the robot's AOI and the robot places the pillow bags on the universal surface.

In some embodiments, the presence sensor for the feed forward unit is a photo eye that is triggered when a pillow bag blocks the photo eye. For example, if the photo eye is located under the feed forward unit, and if the photo eye is blocked by a pillow bag, then the pillow bag is also under the feed forward unit.

In some embodiments, the first pillow bag information acquisition step 346 begins for a pillow bag when the pillow bag triggers a presence sensor and ends when the presence sensor can no longer detect the pillow bag. In some embodiments, during the conditional verification step 348, the pick and place robot controller uses information from the information acquisition step 346 to determine the thickness of a pillow bag, the length of the pillow bag, or both.

In some embodiments, during the conditional verification step 348, a pillow bag is rejected if it is too long, too short, too thick, or too thin.

In some embodiments, during the second pillow bag sensing step 354, the vision sensor is a 2-D camera. For example, in some embodiments as the pillow bags are conveyed through a vision tunnel they pass underneath the 2-D camera which acquires information regarding the pillow bag.

In some embodiments, during the second pillow bag information acquisition step 356, the robot vision controller acquires information from the 2-D camera. In some embodiments, the pick and place robot vision controller uses information acquired by the 2-D camera determine the 2-D position of a pillow bag and the orientation of the bag.

In some embodiments, in a pillow bag information transmission step 358, the pick and place robot vision controller passes the 2-D position of the pillow bag and the orientation of the pillow bag to the pick and place robot controller.

In some embodiments, during the information comparison step 360, the pick and place robot controller compares information received from the pick and place robot vision controller with information from the encoder of the feed forward unit to associate each bag recognized by the pick and place robot vision controller with height data from the feed forward unit. For example, in some embodiments pillow bag positional information from an encoder is associated with a thickness of the pillow bag at the feed forward unit. Then, positional information from the encoder is compared to 2-D position information from the robot vision controller. If the two positions match to a specified degree, the two positions are deemed to correspond to the same pillow bag and the thickness of the pillow bag as measured by the feed forward unit is combined with the more accurate position of the pillow bag from the vision controller.

Figure 3C:
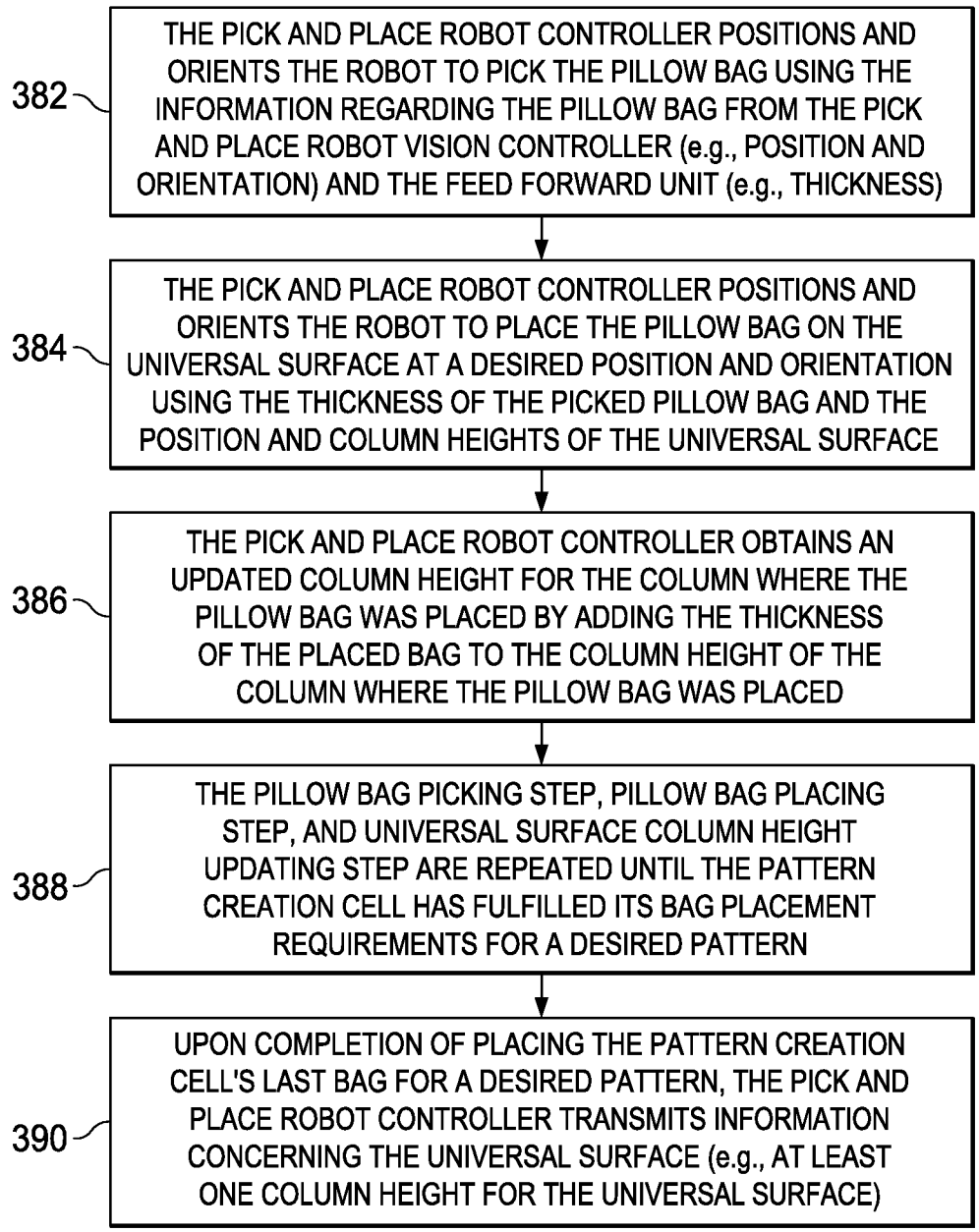
FIG. 3C is a flow chart representation depicting part of the overall process for the embodiment of FIG. 3A.

Turning now to FIG. 3C, in a picking step 382, the pick and place robot controller positions and orients the robot to pick the pillow bag using the information regarding the pillow bag from the pick and place robot vision controller (e.g., the pillow bag's position and orientation) and the feed forward unit (e.g., the pillow bag's thickness). Second, in a placing step 384, the pick and place robot controller positions and orients the robot to place the pillow bag on the universal surface in a desired position and orientation using the thickness of the pillow bag and the position and the at least one column height of the universal surface. For example, FIGS. 1A, 1B, 1C, 5A, 5B, 5C, 5D, and the accompanying text describe how a robot can pick and place an object (e.g. a pillow bag, plurality of pillow bags, or layer of pillow bags).

Third, in a column height updating step 386, the pick and place robot controller obtains an updated column height for the column where the pillow bag was placed. For example, in one embodiment the column height is updated by adding the thickness of the placed bag to the column height of the column where the pillow bag was placed to obtain an updated column height.

Fourth, in a first repeating step 388, the pillow bag picking step 382, the pillow bag placing step 384, and the universal surface column height updating step 386 are repeated until the pattern creation cell has fulfilled its bag placement requirements for a desired pattern.

Fifth, in a universal surface information transmission step 390, upon completion of placing the pattern creation cell's last bag for a desired pattern, the pick and place robot controller transmits information concerning the universal surface (e.g., at least one column height of the universal surface).

In some embodiments during the picking step 382, information regarding the pillow bag from the vision controller, for example, the 2-D position of the pillow bag, the pillow bag's orientation, or both, are used by the pick and place robot controller to position and orient a robot to pick the pillow bag. In some embodiments, the pillow bag is picked (e.g., via vacuum) at the correct elevation from a surface (e.g. conveyor belt) by using the thickness of the pillow bag from the feed forward unit.

In some embodiments during the placing step 384, the pick and place robot controller places the pillow bag at the correct position, depth, orientation, or some combination thereof on a universal surface using the thickness of the pillow bag, column height values for the universal surface, positional information for the universal surface, or some combination thereof. For example, in some embodiments the pick and place robot controller places the pillow bag using column height values from the pattern creation line PAC for the universal surface, positional information from an encoder tracking the universal surface conveyor, or both. In some embodiments, the pick and place robot controller commands the pick and place robot to place the pillow bag on its bottom and so that it stands nearly perpendicular to the top surface of the universal surface. For example, if the pillow bag is picked using an end effector in a first orientation and a first orientation of the pillow bag is known, the end effector on the robot can be reoriented into a second orientation so that the pillow bag is also placed in a second orientation. Furthermore, in some embodiments the robot controller uses information regarding the thickness of the pillow bag and column heights of a universal surface (e.g. after any previous pattern creation cells have placed bags on the universal surface) to command the pick and place robot to place the pillow bag on the universal surface so that it stands nearly perpendicular to the top surface of the universal surface. For comparison, if a subsequently placed pillow bag is placed too far from or too close to a previously placed pillow bag, the pillow bag can lean into or away from that pillow bag, resulting in a non-perpendicular angle between the top surface of the universal surface and the pillow bag. Alternatively, if a non-perpendicular angle between the pillow bags and the universal surface is desired, if a subsequently placed pillow bag is placed too far from or too near to a previously placed pillow bag, the desired angle will not be obtained and, for example, the pillow bag could fall over or slip out of position.

In some embodiments, during the universal surface column height updating step 386, only a single column height is updated, while in other embodiments a plurality of column heights are updated.

In some embodiments, during the first repeating step 388, a single robot picks and places the pillow bags on a universal surface while in other embodiments a plurality of robots pick and place bags on the universal surface. Furthermore, in some embodiments during the first repeating step 388, a single controller updates at least one universal surface column height after the placement of at least one pillow bag on the universal surface. In other embodiments during the first repeating step 388, a plurality of controllers update at least one universal surface column height after the placement of at least one pillow bag on the universal surface. In some embodiments, the first repeating step 388 is performed by a single pattern creation cell (e.g., a single pick and place cell).

In some embodiments, during the universal surface information transmission step 390, information regarding a pattern on a universal surface (e.g., compound angled tray) is sent, via a communications fieldbus, from the pick and place robot controller to the pattern creation line PAC. In some embodiments the information regarding the universal surface is used by subsequent pattern creation cells to modify or add to the pattern on the universal surface.

Figure 3D:
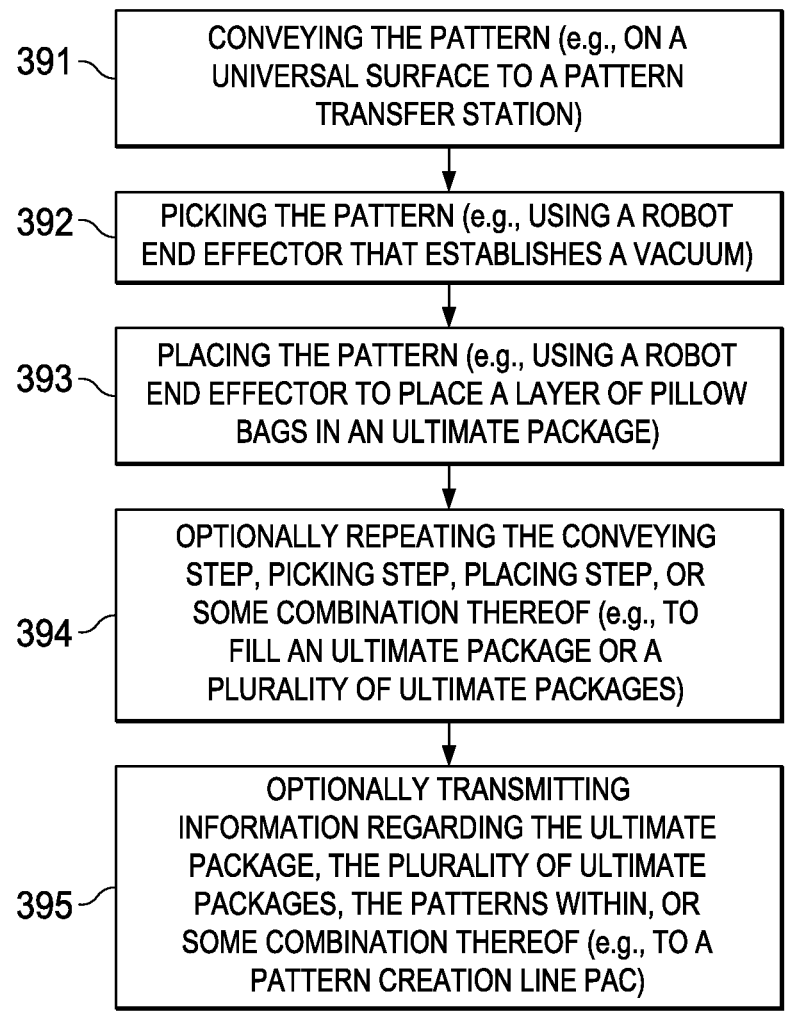
FIG. 3D is a flow chart representation depicting part of the overall process for the embodiment of FIG. 3A.

Turning now to FIG. 3D, an apparatus and method for transferring a pattern from a universal surface to an ultimate package is described. First, in a conveying step 391, the pattern (e.g., a layer of pillow bags) on a universal surface is conveyed to a pattern transfer station. For example, FIGS. 11, 12, and 13 and the accompanying description describe how a universal surface can be conveyed to a pattern transfer station. Second, in a picking step 392, the pattern is picked by an end effector using vacuum. Third, in a placing step 393, the end effector places the pattern in an ultimate package. For example, FIGS. 8A, 8B, 9, 11, and 13 and the accompanying description show an end effector and how it can be used to pick a pattern from a universal surface and place the pattern in an ultimate package.

Fourth, in an optional repeating step 394, the conveying step 391, picking step 392, placing step 393, or some combination thereof are repeated until the ultimate package is filled with a desired pattern or plurality of patterns. For example, the end effector can pick an additional pattern from the universal surface or a subsequent universal surface, and place the additional pattern in an ultimate package. In some embodiments, the end effector picks a first layer of pillow bags and places the layer on a universal surface to form a universal element. Then, the end effector picks a subsequent layer of pillow bags and places the subsequent layer on a universal surface to form another universal element. Additionally, a first pattern or layer of pillow bags (e.g., a first universal element) can be placed in a first ultimate package and a subsequent pattern or layer of pillow bags (e.g., a second universal element) can be placed in a subsequent ultimate package. Although, in some embodiments, universal elements can be stacked on top of each other.

Fifth, in an optional transmitting step 395, information regarding the ultimate package, the plurality of ultimate packages, any pattern or layer associated with an ultimate package, or some combination thereof is transmitted. For example, the information may be transmitted to a pattern creation line PAC for use in transporting an ultimate package to a customer.

Although one embodiment of the invention has been described with at least one column height, in some embodiments, the universal surface is associated with only a single column height or a plurality of column heights. Although one embodiment of the invention has been described using a single universal surface conveyor, in some embodiments a plurality of universal surface conveyors are used instead of a single universal surface conveyor. In some embodiments, the universal surface is a tray or a compound angled tray.

Although one embodiment of the invention has been described using a pattern creation cell (e.g., pick and place cell) using a single robot to pick and place pillow bags, other embodiments use a plurality of robots to pick the pillow bags from a surface and place the pillow bags on a single universal surface. Although one embodiment of the invention has been described as using a vision sensor to sense information, for example, position and orientation, regarding the pillow bag, in other embodiments other sensors can be used. For example, in some embodiments, analogs to vision sensor can also be used so that the vision sensor can be replaced by any position and orientation sensor (e.g. acoustic, radar, etc.). Although one embodiment of the invention has been described as using an encoder, in some embodiments any position sensor can be used in place of an encoder.

Although one embodiment of the invention has been described as comprising a pick and place robot controller and a pattern creation cell controller, in some embodiments, the same controller can be used for both the pick an place cell and the pick and place robot in the pattern creation cell. Although one embodiment of the invention has been described using a controller of a certain type to accomplish a task, in other embodiments, another controller, or a plurality of controllers perform the same task. Although one embodiment of the invention has been described using a plurality of controllers to perform a plurality of tasks, in some embodiments, a single controller performs the plurality of tasks. For example, a robot controller can control a single robot or a plurality of robots. As another example, at least one pattern creation line PAC can be used to perform the role of at least one pattern creation cell controller, or vice versa. As another example, a pattern creation cell controller can be used to perform the tasks of a robot controller, or vice versa.

Although one embodiment of the invention has been described using a specific type of controller (e.g., pick and place robot controller, vision system controller, a pattern creation cell controller, pattern creation line controller) in other embodiments a single controller can perform the roles of a plurality of controllers or a plurality of controllers can perform the role of a single controller. Furthermore, in some embodiments a controller performs additional roles, a controller is present but performs no role, a controller is present but its role is performed by another controller, or a controller is not present. Also, although in some embodiments information is transmitted to a robot, in other embodiments the information is transmitted to a robot controller, and vice versa.

Although one embodiment of the invention uses a plurality of input devices, in some embodiments a single input device is used.

Figure 4:
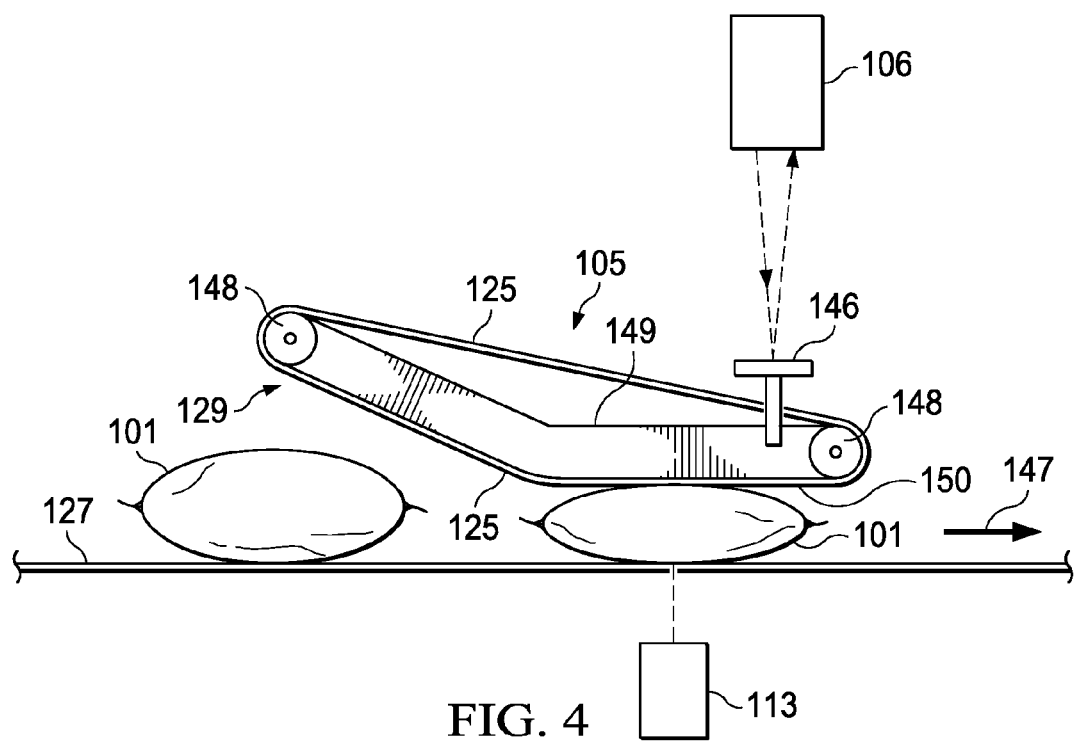
FIG. 4 is a schematic depicting an apparatus that is one embodiment of the invention.

One embodiment of an apparatus according to the invention will now be described with reference to FIG. 4. Generally speaking, the embodiment of FIG. 4 comprises parts that were described with reference to FIG. 1. However, the embodiment of FIG. 4 focuses on a portion of a pattern creation cell comprising a feed forward unit 105, a bag-contacting surface 127 of a first input device 102, a presence sensor 113, and a distance sensor 106. For example, the feed forward unit 105 of FIG. 4 comprises a frame 149 which is attached to rollers 148. A bag-contacting surface 125 (e.g. a conveyor belt) rolls around the rollers 148 and slides along the bottom of the frame 149. The frame 149 and the rollers 148 guide the bag-contacting surface in a desired path. Although FIG. 4 only shows two rollers 148, more rollers can be used, for example, to guide the bag-contacting surface or to reduce friction. Additionally, the frame 148 can be formed in various shapes. For example, the frame 148 can be any shape that comprises an end 129 suitable to receive pillow bags 101 and a surface 150 that is substantially parallel to a bag-contacting surface 127 of an input device 102. The end 129 is suitable to receive pillow bags 101 and guide them between the bag-contacting surface 127 of the input device 102 and the substantially parallel surface 150 of the feed forward unit 105. A presence sensor 113 detects when a pillow bag 101 is between the bag-contacting surface 127 and the substantially parallel surface 150. When a bag is between the two surfaces 127, 150, the thickness 128 of the pillow bag 101 is measured by detecting the distance from a distance sensor 106 to a flat surface 146 mounted on the feed forward unit 105. In the embodiment shown in FIG. 4, the pillow bags 101 are conveyed in a first conveyance direction 147.

Figure 4A:
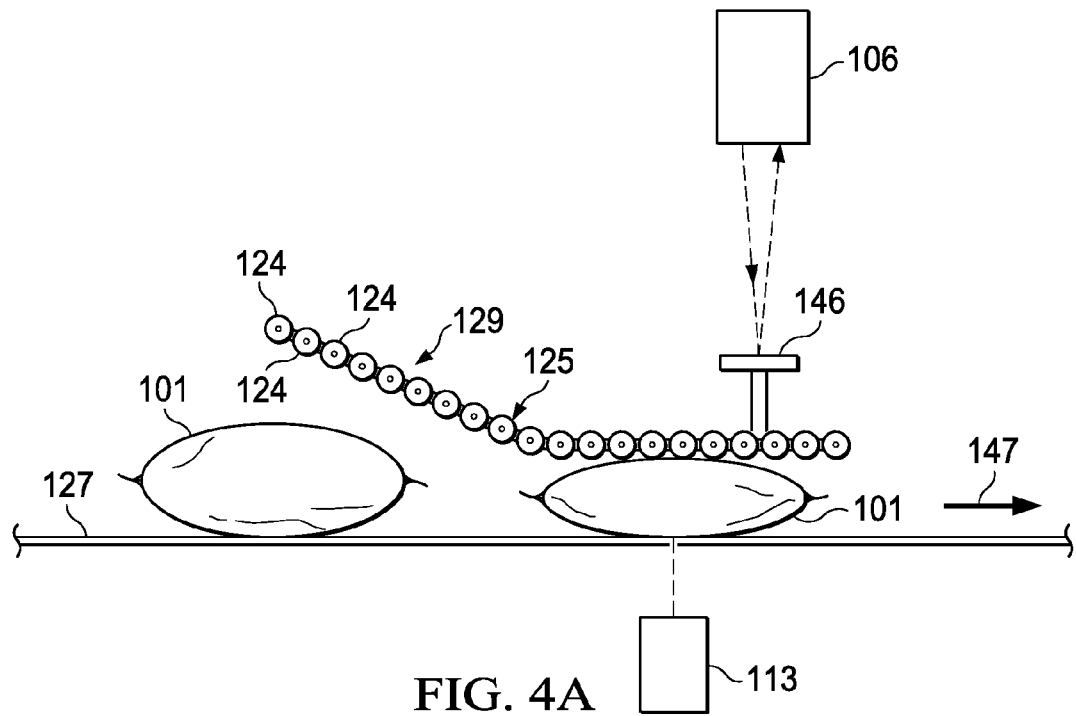
FIG. 4A is a schematic depicting an apparatus that is one embodiment of the invention.

One embodiment of an apparatus according to the invention will now be described with reference to FIG. 4A. Generally speaking, the embodiment of FIG. 4A comprises parts that were described with reference to FIG. 1. However, the embodiment of FIG. 4A shows a feed forward unit 105 that differs from the feed forward unit 105 shown in FIG. 1. For example, the feed forward unit 105 of FIG. 4A comprises a secondary input device 124 that comprises secondary rollers.

Figure 4B:
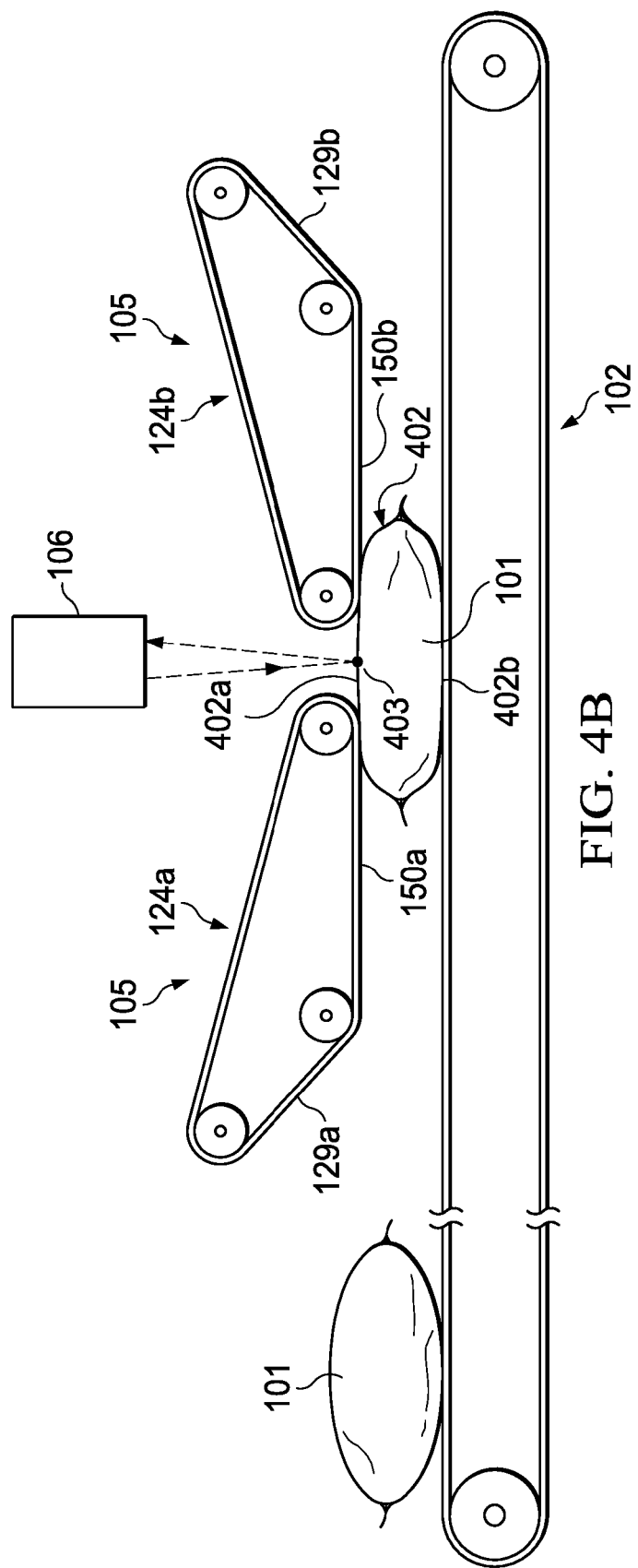
FIG. 4B is a schematic depicting an apparatus that is one embodiment of the invention.

Another embodiment of an apparatus according to the invention will now be described with reference to FIG. 4B. Generally speaking, the embodiment of FIG. 4B comprises parts that were described with reference to FIG. 1. However, some components have been omitted to focus on changed components. For example, the embodiment of FIG. 4B shows a feed forward unit 105 that differs from the feed forward unit 105 shown in FIG. 1. The feed forward unit 105 of FIG. 4B comprises a first secondary input device 124a and a second secondary input device 124b. As a pillow bag 101 passes under the feed forward unit 105, a distance sensor 106 (e.g., a transducer) is used to measure, directly or indirectly, the distance to the pillow bag. In some embodiments, the distance sensor is used to measure, directly, the distance to a bulge in the pillow bag 101 that develops at the outer surface 402 between the first and second secondary input devices. The distance from the sensor to the bulge can be used to directly or indirectly measure the thickness of the pillow bag 101. For example, if a bulge develops on the outer surface 402 where the thickness measurement is taken, the measured thickness can be further converted into a more accurate actual thickness by calculations, estimations, or reasonable assumptions.

In one embodiment, in order to properly condition the pillow bag 101 for measuring thickness using a distance sensor 106, the feed forward unit 105 comprises a first secondary input device 124*a* and a second secondary input device 124*b* that are fixed in relation to each other so that they are positioned the same distance from the first input device 102. For example, the first and second secondary input devices 124*a*, 124*b* can be fixed in relation to each other by being physically linked. In some embodiments, a pillow bag 101 passing under the feed forward unit 105 contacts components of the feed forward unit 105 in the following order: a tapered end 129*a* of the first secondary input device 124*a*, a horizontal surface 150*a* of the first secondary input device 124*a*, a horizontal surface 150*b* of the second secondary input device 124*b*, and a tapered end 129*b* of the second secondary input device 124*b*. Accordingly, when the thickness of a pillow bag 101 is being measured at a point of measurement 403 on the outer surface 402 of the pillow bag 101, a portion of the outer surface 402*a* is in contact with the horizontal surfaces 150*a*, 150*b* of the feed forward unit 105 and an opposite portion 402*b* of the outer surface is in contact with first input device 102. In FIG. 4B, the contact between the pillow bag 101 and the horizontal surfaces 150*a*, 150*b* occurs on opposing sides of the point of measurement 403. This serves to condition (e.g. flatten) the pillow bag 101 so that a desired thickness of the pillow bag 101 can be measured more accurately. For example, the desired thickness of the pillow bag 101 can correspond to the condition that the pillow bag 101 will experience when placed in a pattern by a pick and place robot.

In some embodiments, the distance sensor 106 directly or indirectly measures a distance across two opposite surfaces 402*a*, 402*b* of the pillow bag 101 to provide a measured dimension of the pillow bag 101. In some embodiment, the distance sensor 106, measures the distance to a surface 402 of the pillow bag 101 through a gap between two portions (e.g., the first and second secondary input devices 124*a*, 124*b*) of the feed forward unit 105.

Although the bags 101 have been described as passing under the secondary input device, in some embodiments this is not necessary. For example, in addition to or in place of using gravity to provide a force to position the feed forward unit 105 in contact with the bags 101, a force can be provided, for example, by a spring, magnetism, or vacuum. Likewise, other forces or configurations can be used to maintain the bags 101 in contact with the input device 102.

One embodiment of the invention will now be described with respect to FIGS. 5A-5E, which provide an example of how pillow bags 101 can be picked from a second input device 103 and placed on a universal surface 109 to form an array of pillow bags 137. First, in FIG. 5A an end effector 145 is positioned over a second input device 103 and an array of pillow bags 137 is arranged on a top surface 140 of a universal surface 109. The array of pillow bags 137 comprises a single column of pillow bags. The universal surface 109 is positioned on a universal surface conveyor 110. Universal surface 109 comprises a bottom surface 139, a top surface 140, a first wall 141, and a second wall 151. The first wall 141 is a finger wall. The second wall 151 is a leading sidewall. The leading sidewall 151, the finger wall 141, and the top surface 140 come together to form a bottom corner (not shown) of the universal surface 109. A bag at the bottom corner leans against the first wall 141 and the second wall 151.

Figure 5A:
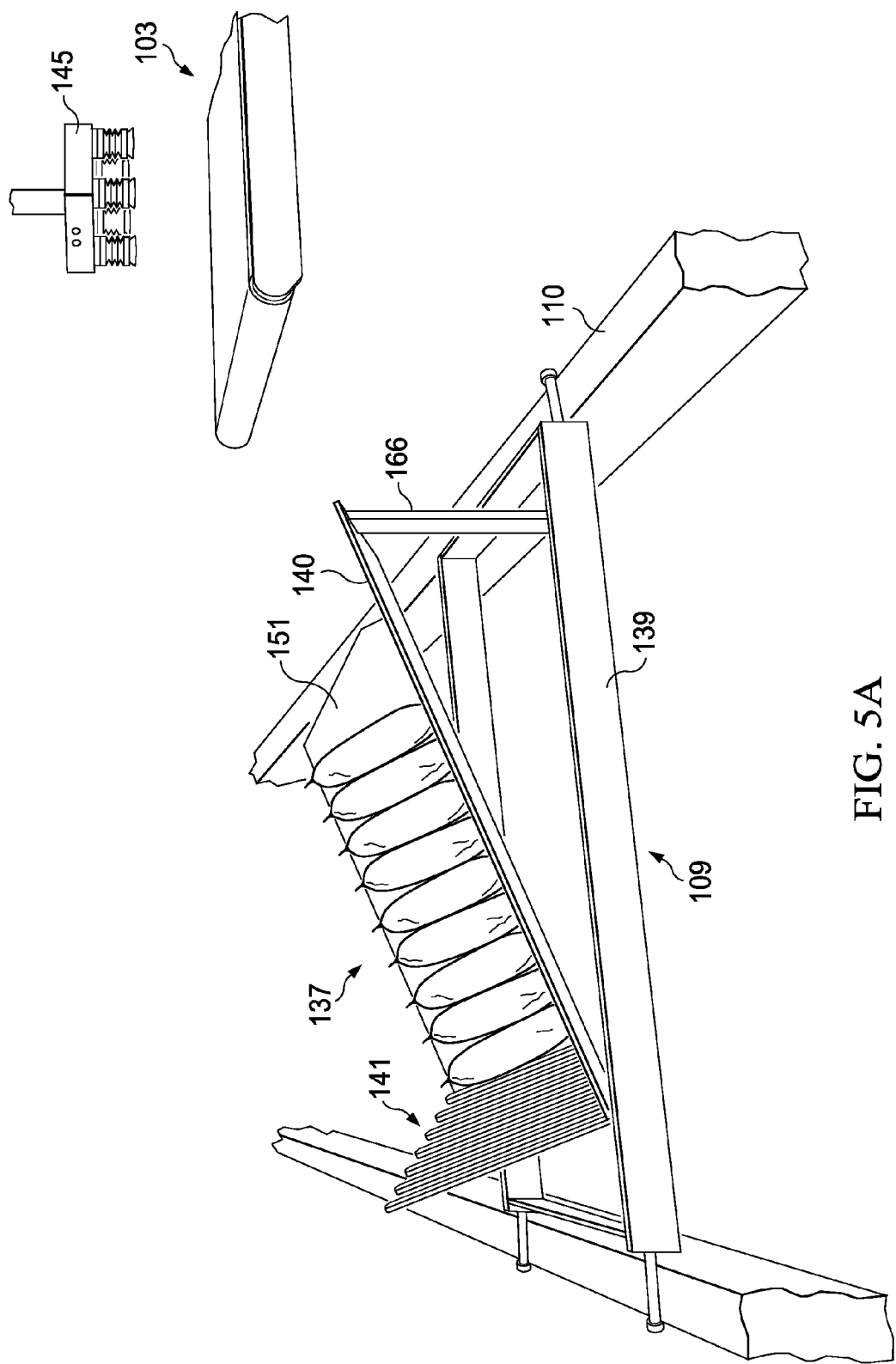
FIG. 5A shows an embodiment of the invention depicting a robot end effector positioned to pick pillow bags from a second input device and place the bags on a universal surface.

As can be seen in FIG. 5A, in some embodiments the top surface 140 of universal surface 109 is at a compound angle. In some embodiments, a support post 166 is attached to the top surface 140 and the bottom surface 139 to elevate one corner of the top surface 140 and provide the compound angle. As shown in FIG. 5A, support post 166 may be fixed to a top corner of the top surface 140 and a portion of the bottom surface 139. In some embodiments, the bottom surface 139 is a frame with an empty interior, for example, rather than being in the form of a solid plane.

Figure 5B:
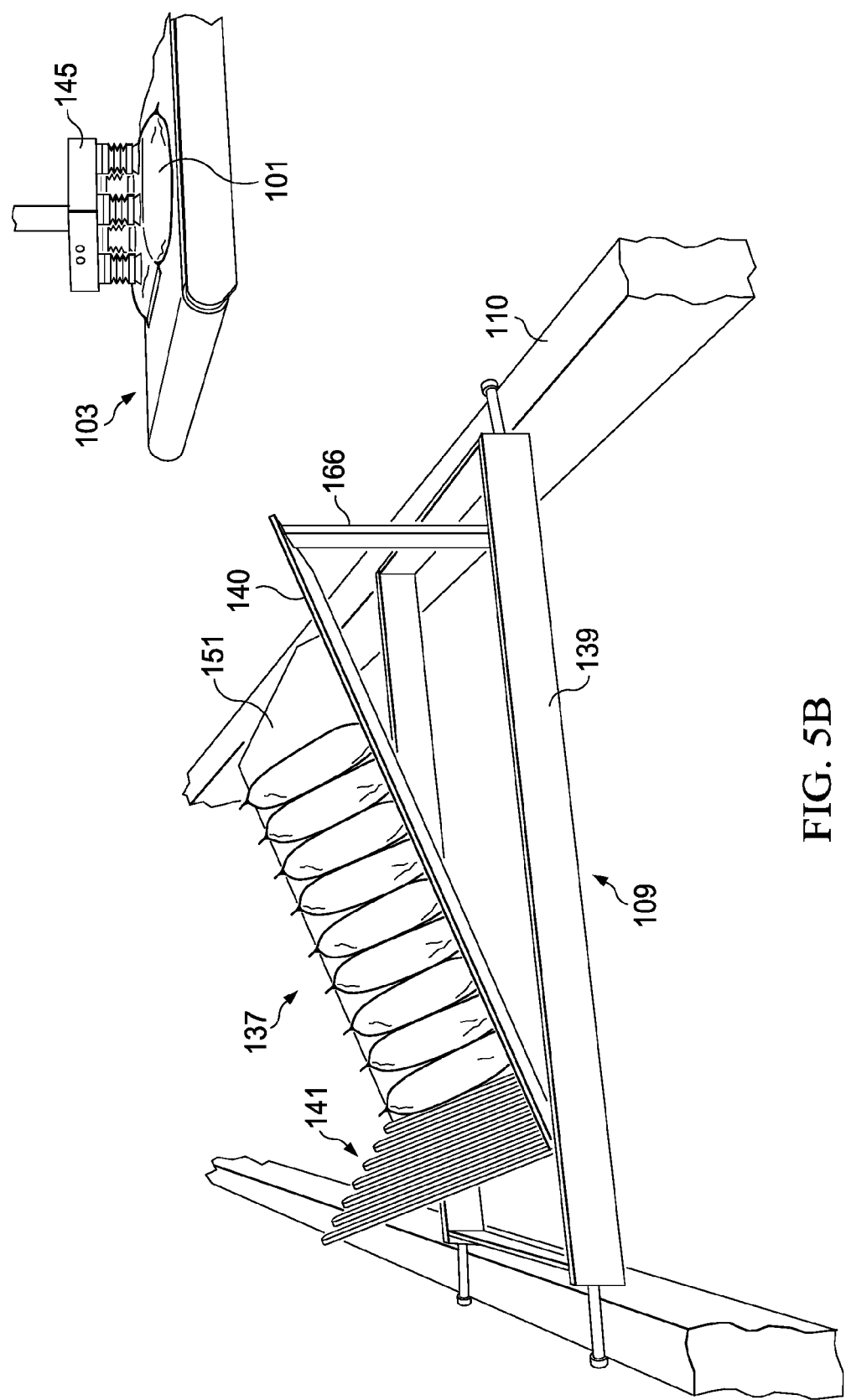
FIG. 5B shows an embodiment of the invention depicting a robot end effector picking a pillow bag.

In FIG. 5B, the second input device 103 has conveyed a pillow bag 101 into the picking range of an end effector 145, and the end effector 145 has been lowered into contact with the pillow bag 101.

Figure 5C:
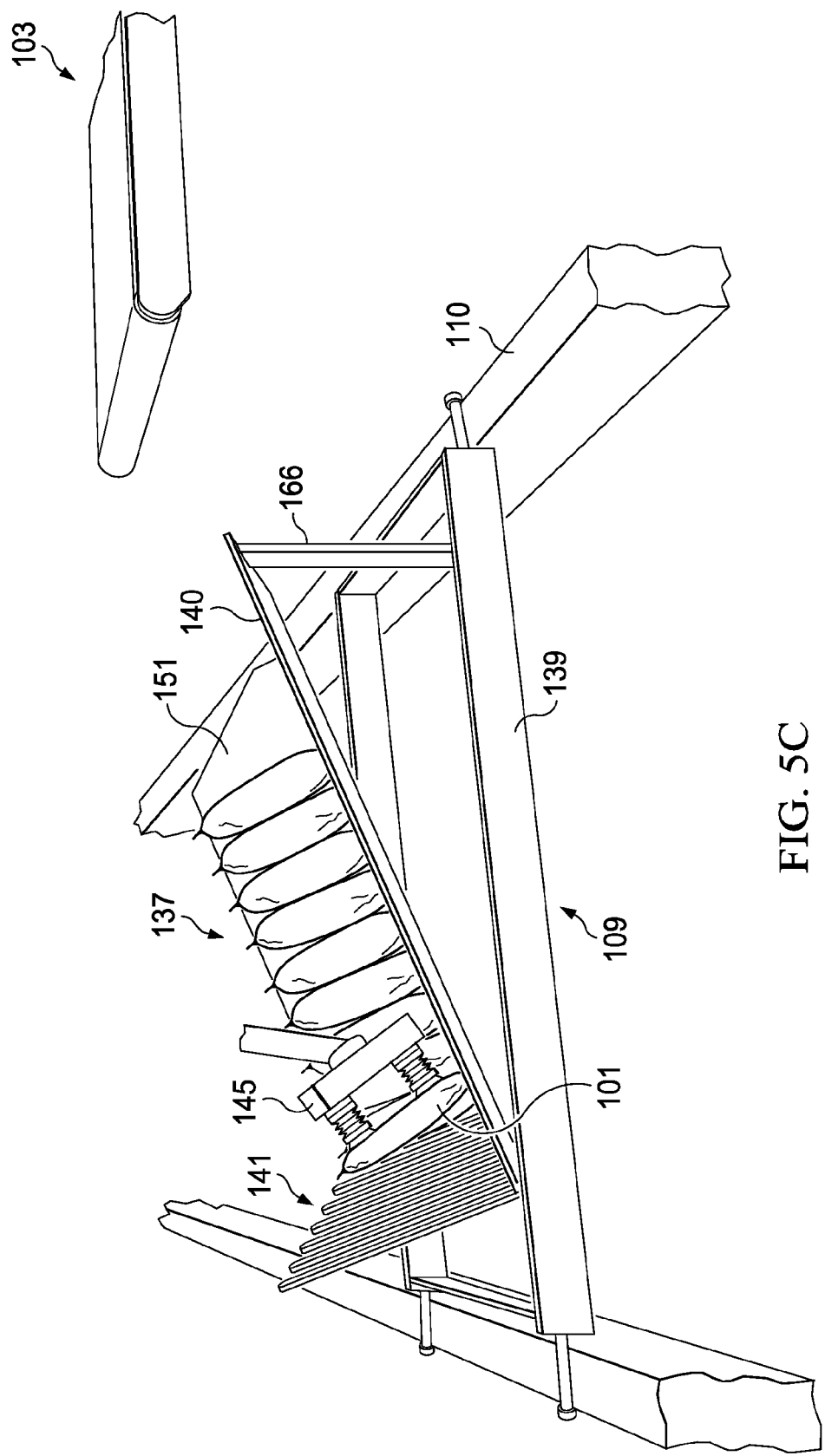
FIG. 5C shows an embodiment of the invention depicting a robot end effector placing a pillow bag in a second column of an array of pillow bags.

In FIG. 5C, an end effector 145 has been positioned to place the picked pillow bag 101 in a second column of pillow bags next to a first column of pillow bags, which have already been placed. Together, the two columns of pillow bags form an array of pillow bags 137. The array of pillow bags 137 rests on the universal surface 109 comprising a top surface 140, a sidewall 151, and a finger wall 141. The first column of pillow bags is placed adjacent to the sidewall. The end effector 145 is starting a second column that is adjacent to the first column by placing a pillow bag 101 against the finger wall 141 and next to the first pillow bag 142 in the first column. In some embodiments, a pillow bag can be placed in any orientation with respect to the universal surface so long as the bag is supported in the orientation (e.g. as a result of gravity, friction, the universal surface, other bags, etc.). As an example of a possible orientation, a pillow bag can be placed facing away from a universal surface wall (e.g., sidewall 151, finger wall 141), facing toward a wall, and any angle in between while the bag stands on the bag's end seal. As another example, bags can be placed flat against the top surface 140 of the universal surface facing either toward or away from the universal surface.

Figure 5D:
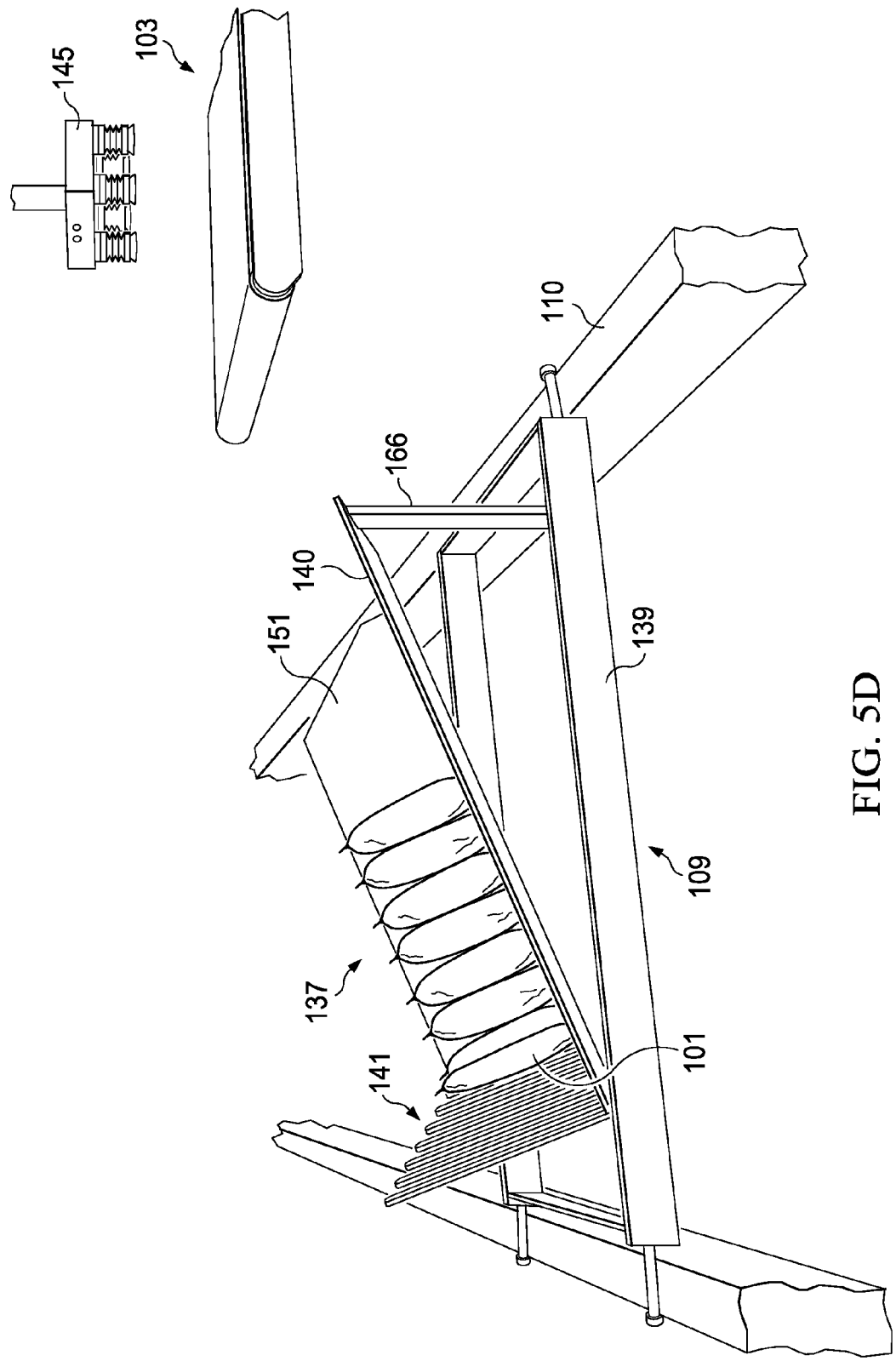
FIG. 5D shows an embodiment of the invention depicting two columns in an array of pillow bags that have been placed by a robot end effector and depicting an end effector which has returned to a position above a second input device after placing a pillow bag in a second column.

FIG. 5D shows the first pillow bag in the second column placed adjacent to the first column. The end effector 145 is once again positioned over the second input device 103.

FIG. 5E shows an array of pillow bags 137 arranged in a pattern on the universal surface 109. The array of pillow bags 137 are supported by a top surface 140 and directly or indirectly lean against a first wall 141 and a second wall 151. The top surface 140 of the universal surface 109 comprises a frictional coating 152. The frictional coating increases the friction between the top surface 140 and the pillow bags and helps prevent the pillow bags from slipping. In some embodiments, the frictional coating is a rubber mat, or a textured surface (e.g. surface with ribs, gnarling, aggregate coating, etc.).

FIGS. 6A-6D show examples of patterns that can be formed with pillow bags in accordance with the present invention. The pillow bags 101 are placed on a universal surface 109 starting with the lowest pillow bag 142, which is placed adjacent to the lowest corner 165 of the universal surface 109.

Figure 6A:
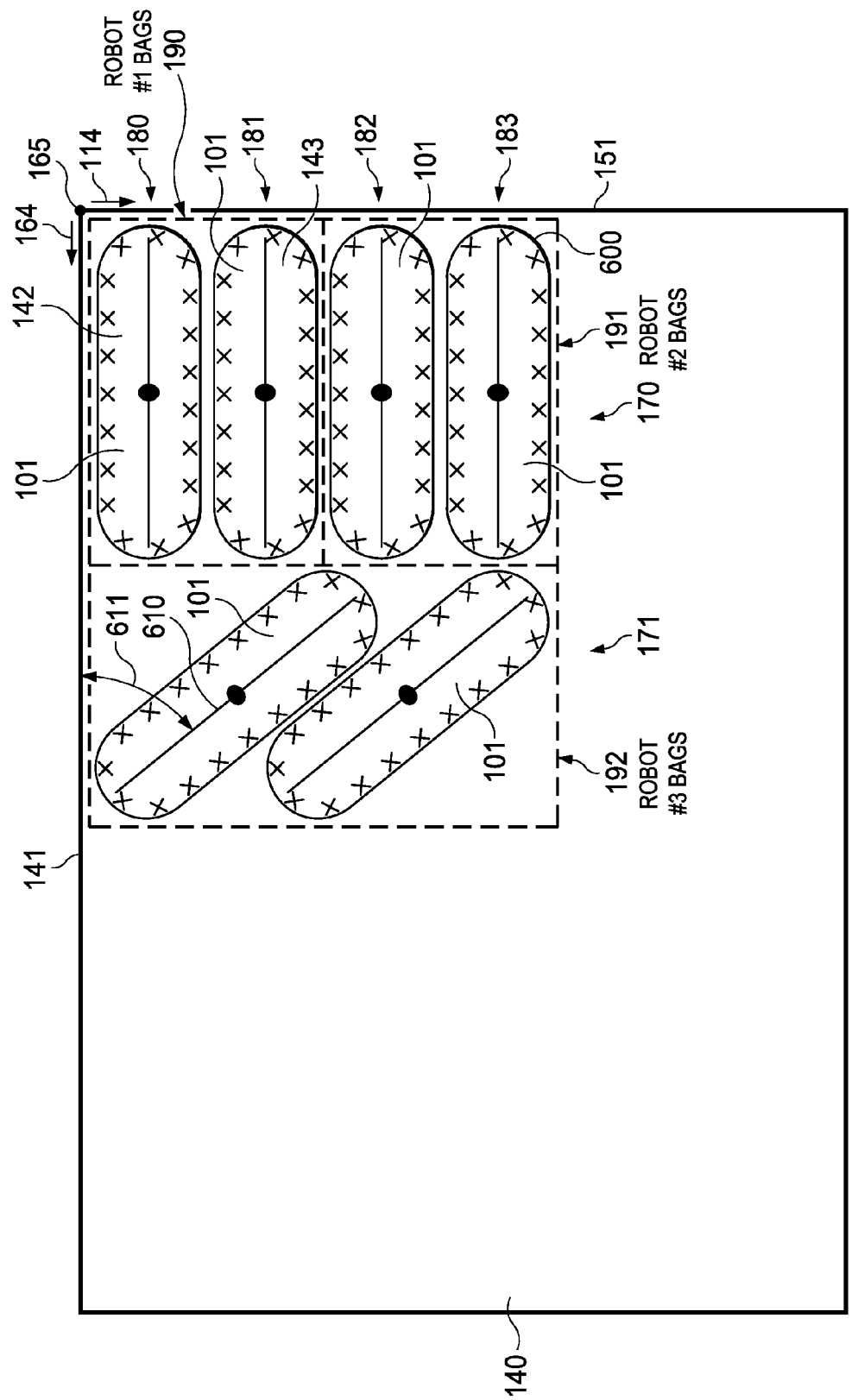
FIG. 6A is a schematic view depicting an array of pillow bags arranged in a pattern in a single plane and depicting two pillow bags arranged at an angle to a wall of a universal surface.
Figure 6B:
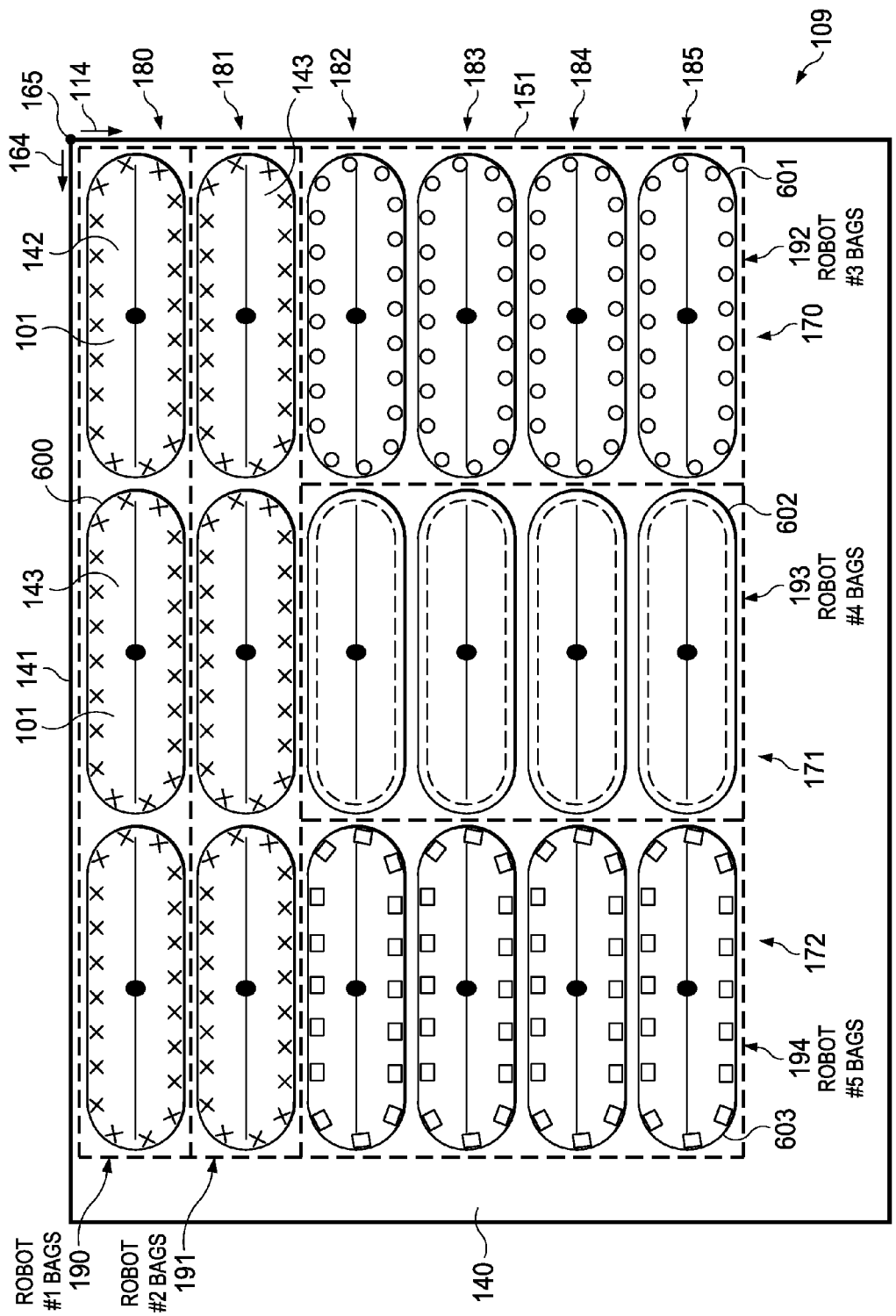
FIG. 6B is a schematic view depicting an array of pillow bags arranged in a pattern in a single plane and four different types of pillow bags arranged by five robots to form an array of pillow bags with six rows and three columns.

Turning to FIG. 6B, an array of pillow bags is situated on a universal surface 109 oriented with respect to a lowest corner 165 and two placement vectors 114, 164 extending away from the lowest corner 165. The first placement vector 114 is parallel to a top surface 140 and a sidewall 151 of the universal surface 109. The second placement vector 164 is parallel to the top surface 140 and a finger wall 141 of the universal surface 109. Although the two placement vectors 164 and 114 are shown as perpendicular, they can also be at some other angle.

The array of pillow bags on the universal surface 109 is arranged in a pattern having three columns 170, 171, 172 and six rows 180, 181, 182, 183, 184, 185. Each column 170, 171, 172 is parallel to the first placement vector 114. Each row 180, 181, 182, 183, 184, 185 is parallel to the second placement vector 164.

The first column 170 is adjacent to and leans against the sidewall 151 of the universal surface 109. Each subsequent column leans against and is adjacent to the previous column. For example, a second column 171 of pillow bags is adjacent to and leans against the first column 170. A third column 172 of pillow bags is adjacent to and leans against the second column 171.

A first row 180 of the array of pillow bags is adjacent to the finger wall 141 of the universal surface 109. Each subsequent row leans against and is adjacent to a previous row. For example, a second row 181 is adjacent to and leans against the first row 180. A third row 182 is adjacent to and leans against the second row 181. This pattern continues for a total of six rows.

Accordingly, the second lowest pillow bag 143 in the first column 170 and along the first placement vector 114 leans against the lowest pillow bag 142 in the first column 170 and thus leans indirectly against the finger wall 141. Additionally, the second lowest pillow bag 143 in the first column 170 leans directly against the sidewall 151. Thus, the second lowest pillow bag 143 in the first column 170 is also the lowest pillow bag in the second row 181.

Similarly, the second lowest pillow bag 143 in the first row 180 and along the second placement vector 164 leans against the lowest pillow bag 142 in the first row 180 and thus leans indirectly against the sidewall 141. Additionally, the second lowest pillow bag 143 in the first row 180 leans directly against the finger wall 141. Thus, the second lowest pillow bag 143 in the first row 180 is also the lowest pillow bag in the second column 171.

As shown in FIG. 6B, a pattern can comprise various kinds of bags and can be placed by a plurality of robots. For example, a first set 190 of bags is placed by a first robot. In FIG. 6B, the first set 190 consists of the first row of pillow bags 180. A second set 191 of bags is placed by a second robot. In FIG. 6B, the second set 191 consists of the second row of pillow bags 181. A third set 192 of bags is placed by a third robot. In FIG. 6B, the third set 192 consists of the first column 170 of pillow bags, excluding the first two rows. A fourth set 193 of bags is placed by a fourth robot. In FIG. 6B, the fourth set 193 consists of the second column 171 of pillow bags, excluding the first two rows. A fifth set 194 of bags is placed by a fifth robot. In FIG. 6B, the fifth set 194 consists of the third column 172 of pillow bags, excluding the first two rows.

In addition to showing a pattern placed by a plurality of robots, FIG. 6B also shows a pattern that comprises a plurality of pillow bag types. For example, the pattern in FIG. 6B comprises four different types 600, 601, 602, 603 of pillow bags. The first type 600 of pillow bags is outlined with the letter "X". The second type 601 of pillow bags is outlined with circles. The third type 602 of pillow bags is outlined with dashes. The fourth type 603 of pillow bags is outlined with squares.

Although FIG. 6B shows one particular pattern of pillow bags, other patterns are also possible. In addition to patterns with three columns and six rows of pillow bags, patterns with more or less rows, more or less columns, or both are also possible. For example, a pattern can comprise a single row or a plurality of rows. A pattern can also comprise a single column or a plurality of columns. Likewise, patterns can comprise a single bag type or a plurality of bag types and patterns can comprises bags that are placed by a single robot or a plurality of robots.

Figure 6C:
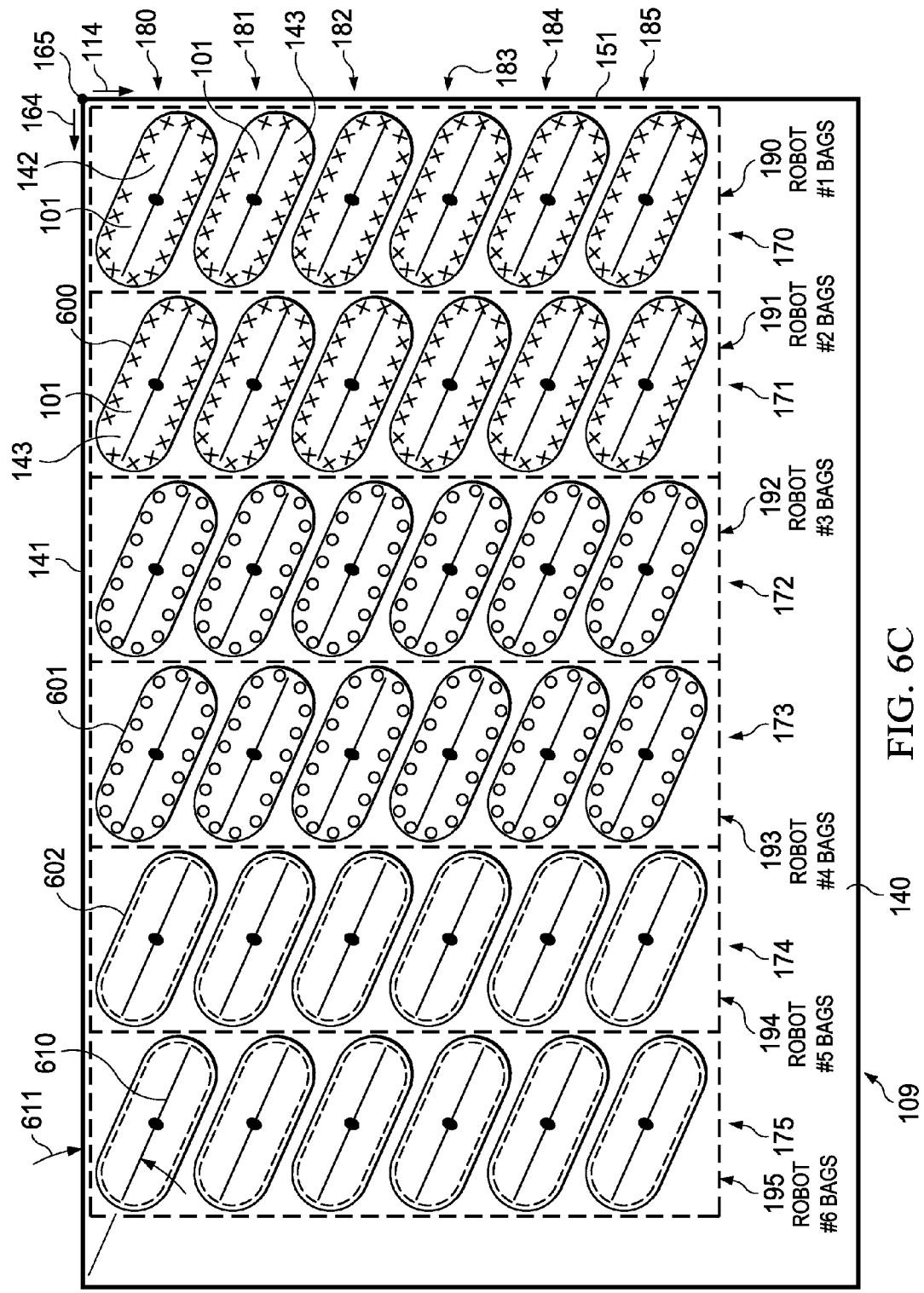
FIG. 6C is a schematic view depicting an array of pillow bags arranged in a single plane at an angle to a wall and depicting three different types of pillow bags arranged by six robots to form an array of pillow bags with six rows and three columns.
Figure 6D:
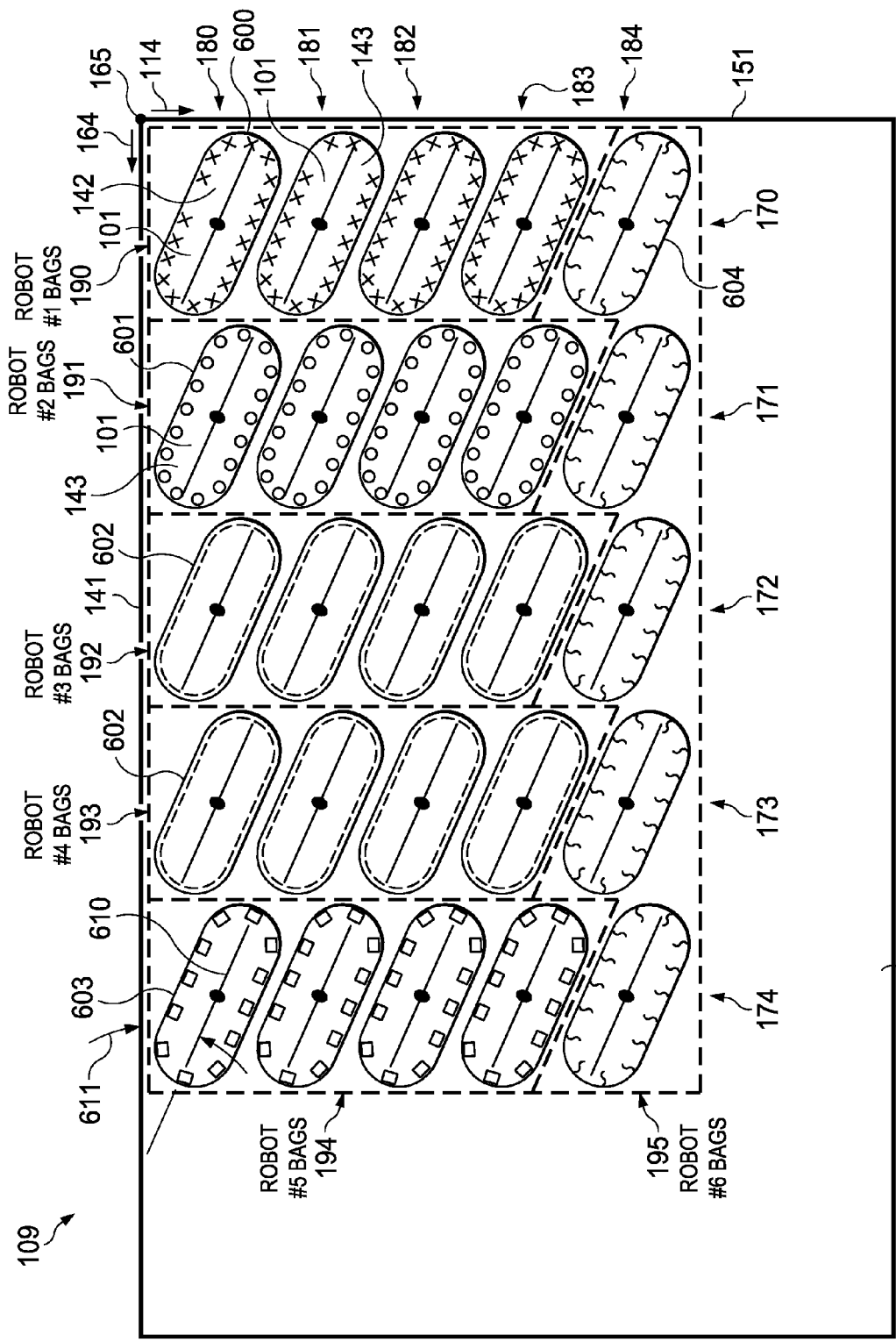
FIG. 6D is a schematic view depicting an array of pillow bags arranged in a single plane at an angle to a wall and depicting five different types of pillow bags arranged by six robots to form an array of pillow bags with five rows and five columns.

FIGS. 6A and 6C-6D show elements that are analogous to the elements shown in FIG. 6B, so every element will not be described. However, some of the major differences between FIG. 6B and FIGS. 6A and 6C-6D will now be described.

FIG. 6A shows a pattern of pillow bags that comprises two columns 170, 171, four rows 180, 181, 182, 183, a single type 600 of pillow bags, and a plurality of sets 190, 191, 192 of pillow bags that have each been placed by a different robot. FIG. 6A also depicts a pattern that comprises a second column 171 of pillow bags in which each bag is oriented at an angle 611 to the first support 141 along a dimension 610 (e.g., length, width, or height) of the pillow bag. Meanwhile, the pattern also comprises a first column 170 of pillow bags in which each bag is oriented parallel the first support 141 along a dimension 610 (e.g., length, width, or height) of the pillow bag. As can be seen in FIG. 6A, in some embodiments a row or pattern according to the invention can comprise both bags that are at an angle to a support along a dimension and bags that are parallel to the support along the dimension. An array of pillow bags can also be arranged in a pattern that comprises rows, columns, or both with the same number of pillow bags. Alternatively, a pattern can comprise rows, columns, or both with varying numbers of pillow bags.

FIG. 6C shows a pattern of pillow bags that comprises six columns 170, 171, 172, 173, 174, 175 six rows 180, 181, 182, 183, 184, 185, three types 600, 601, 602 of pillow bags, and six sets 190, 191, 192, 193, 194, 195 of pillow bags, each set having been placed by a different robot. For every row and every column in the pattern, each pillow bag is oriented at an angle 611 to a support (e.g., first support 141, second support 151, or both) along a dimension 610 (e.g., length, width, or height) of the pillow bag.

FIG. 6D shows a pattern of pillow bags that comprises five columns 170, 171, 172, 173, 174 five rows 180, 181, 182, 183, 184, five types 600, 601, 602, 603, 604 of pillow bags, and six sets 190, 191, 192, 193, 194, 195 of pillow bags with each set having been placed by a different robot. As can be seen, the columns 170, 171, 172, 173, 174, excluding the last row (e.g. row five 184), were each placed by a different robot. In other words, each column, excluding the last row, consists of a set 190, 191, 192, 193, 194 of pillow bags. The last row (e.g. row five 184), consists of another set 195 of pillow bags. Each pillow bag in the pattern is oriented at an angle 611 to a support (e.g., first support 141, second support 151, or both) along a dimension 610 (e.g., length, width, or height) of the pillow bag.

As can be seen with reference to FIG. 6D, it can be advantageous for a set 190, 191, 192, 193, 194, 195 of bags to comprise adjacent bags because, in some cases, bags that are placed close together can be more quickly placed by a single robot than bags that are placed further apart. Although FIG. 6D shows each set 190, 191, 192, 193, 194, 195 as a full or partial row or column, a set can also comprise bags arranged in other configurations, for example, in a plurality of rows and a plurality of columns. Although bags in a set can be placed adjacent to each other, a single robot can also place a set comprising bags that are not all adjacent. For example, in one embodiment, lower positions in a row and a column are filled before higher positions, but a plurality of robots fill the rows so that a first robot can place a first bag in a column or row, a second robot can place a second bag in the column or row, and the first robot can place a third bag in the column or row. Accordingly, the set of bags placed by the first robot can comprise bags that are not adjacent. Furthermore, using a plurality of robots, bags in a set placed by each robot can all be adjacent, can all be non-adjacent, or can be both adjacent and non-adjacent.

Although FIG. 6A-6D showed columns that were perpendicular to the first support 141 and rows that were perpendicular to second support 151, the columns and rows can also be at an angle to a support, for example, to provide columns that are diagonal or curved.

One embodiment of a universal surface 109 according to the present invention will now be described with reference to FIG. 7A. The universal surface 109 comprises a first support 141, a second support 151, a top surface 140, a lowest corner 165, and a bottom 139.

The first support 141, the second support 151, and the top surface 140, come together at a point to form the lowest corner 165. A first placement vector 114 and a second placement vector 164 extend from the lowest corner 165 and along a second edge and first edge, respectively, of the top surface 140. The first edge is a line formed by the intersection of the first support 141 with the top surface 140. Likewise, the second edge is a line formed by the intersection of the second support 151 with the top surface 140.

In some embodiments, the first support 141 comprises a finger wall. For example, the finger wall can comprise a series of slats spaced apart a distance to form openings between the slats. In some embodiments, the second support 151 comprises a solid sidewall.

As shown in FIG. 7A, the top surface 140 of the universal surface 109 can be at a compound angle. In some embodiments, the universal surface also comprises a post 166 to maintain the top surface 140 at the compound angle. The compound angle can comprise a first angle 167 and a second angle 168, which are angles between the first placement vector 114 and the second placement vector 164, respectively, and the bottom 139 of the universal surface 109. As shown in FIG. 7A, the bottom 139 of the universal surface 109 is horizontal, so the first angle 167 and the second angle 168 are at an angle away from horizontal. Additionally, the placement vectors 114, 164 are perpendicular to each other, although in other embodiments, the vectors are at another angle to each other. As shown in FIG. 7A, both the top surface 140 and the bottom 139 of the universal surface 109 are flat. In some embodiments, the bottom 139 of the universal surface 109 is solid. However, in other embodiments the bottom 139 of the universal surface 109 is not solid. For example, the bottom can be a frame. In some embodiments, the bottom 139 of the universal surface 109, alone or in conjunction with other components, orients the top surface 140 at a compound angle. For example, the bottom 139 and post 166 can be used to maintain the top surface 140 of the universal surface 109 at a compound angle. Although a post is used to provide a compound angle, in other embodiments, the compound angle can be provided in other ways, for example, by molding a universal surface to comprise a first surface at a compound angle to the bottom of the universal surface. As another example, the compound angle of the universal surface can be provided by attaching (e.g. with screws) the first surface to the bottom of the universal surface at an angle.

Figure 7B:
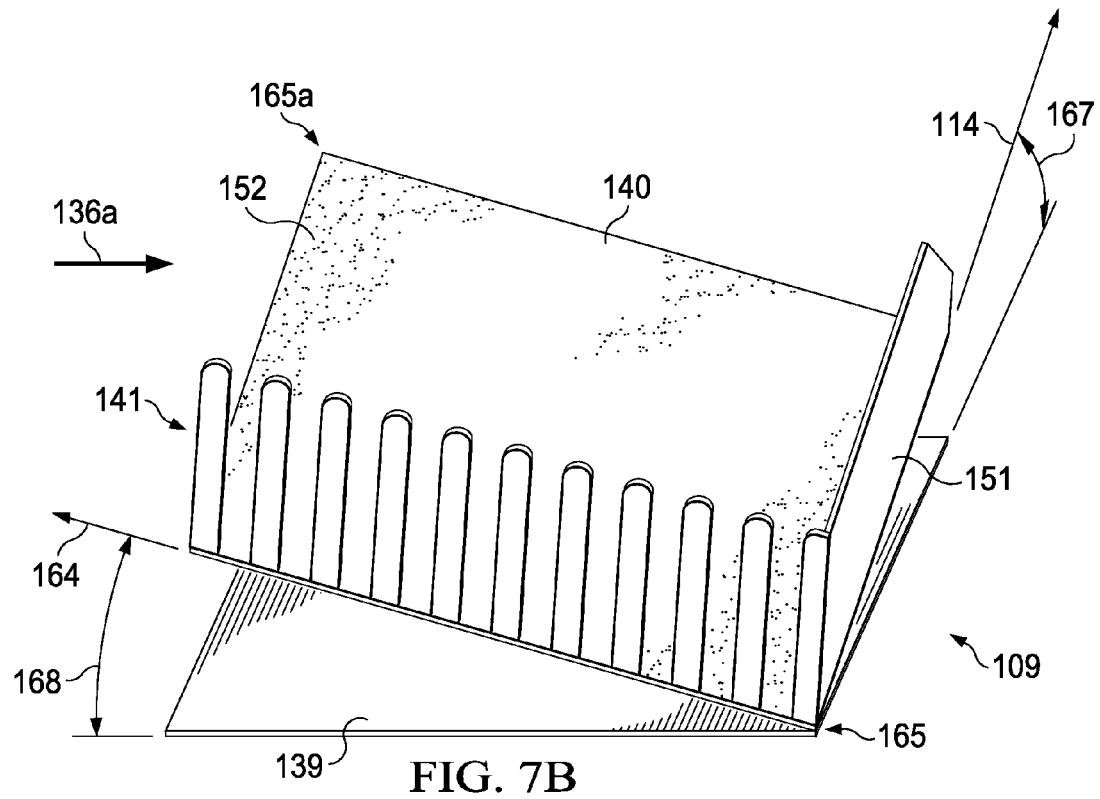
FIG. 7B is a schematic view depicting the compound angle of a universal surface in which the positions of a finger wall and solid wall have been swapped relative to FIG. 7A.

FIG. 7B shows a schematic view of one embodiment of a universal surface that is a compound angled tray 109. In FIG. 7B, the position of a finger wall 141 and a solid second support 151 have been swapped relative to FIG. 7A. The universal surface 109 comprises a first surface (e.g., top surface 140), a second surface (e.g., support 141) that is at a 90 degree angle to the first surface 140, and a third surface (e.g. second support 151) that is orthogonal to both the first surface 140 and the second surface 141. Although, in this embodiment the surfaces 140, 141, 151 are mutually orthogonal, in some embodiments the surfaces are not orthogonal to each other. The third surface 151 is slotted to facilitate pattern transfer, although in some embodiments the third surface is solid.

The three surfaces 140, 141, 151 are maintained in an attitude relative to horizontal. As shown in FIG. 7B, horizontal corresponds with the bottom 139 of the universal surface 109. The attitude of the tray 109 results in two angles 167, 168 relative to horizontal. As shown in FIG. 7B, the intersection of the first surface 140 with the third surface 151 forms a first vector 114 that points away from the bottom corner 165. The intersection of the first surface 140 and the second surface 141 forms a second a vector 164, which points away from a bottom corner 165 of the universal surface 109. The first vector 114 is at a first angle 167 above horizontal. The second vector 164 is at a second angle 168 above horizontal. In some embodiments, the vectors 114, 164 are mutually orthogonal. The two angles 167, 168 provide a compound angle for the universal surface 109 and in addition to resulting in a bottom or lower corner 165, the compound angle also results in an upper or higher corner 165a.

Given the attitude of the universal surface 109 as a result of the compound angle, a pillow bag can be placed on the first surface 140 near the lower corner 165 supported by the second and third surfaces 141, 151 to provide, e.g., a bag in a standup orientation. Subsequent bags can be placed on the first surface 140, and can be supported by a previously placed bag or can be supported by one of the first or second surfaces 141, 151. The universal surface 109 can be transported, for example, in a universal surface conveyance direction 136a positioning the universal surface 109 in range of multiple pattern creation cells. Other directions of travel of the universal surface 109 are possible, for example, as described in FIGS. 12 and 13.

In one embodiment, as shown in FIG. 7B, a universal surface is a compound angle tray. A high coefficient of friction surface 152 can be added to the first surface 140 to increase pillow bag stability during pattern creation and transportation. In one embodiment, the coefficient of friction is a static coefficient of friction that is high enough to keep the object from sliding when the first surface is at a compound angle of at least about 15°, at least about 20°, at least about 30°, or at least about 45° from horizontal.

Figure 8A:
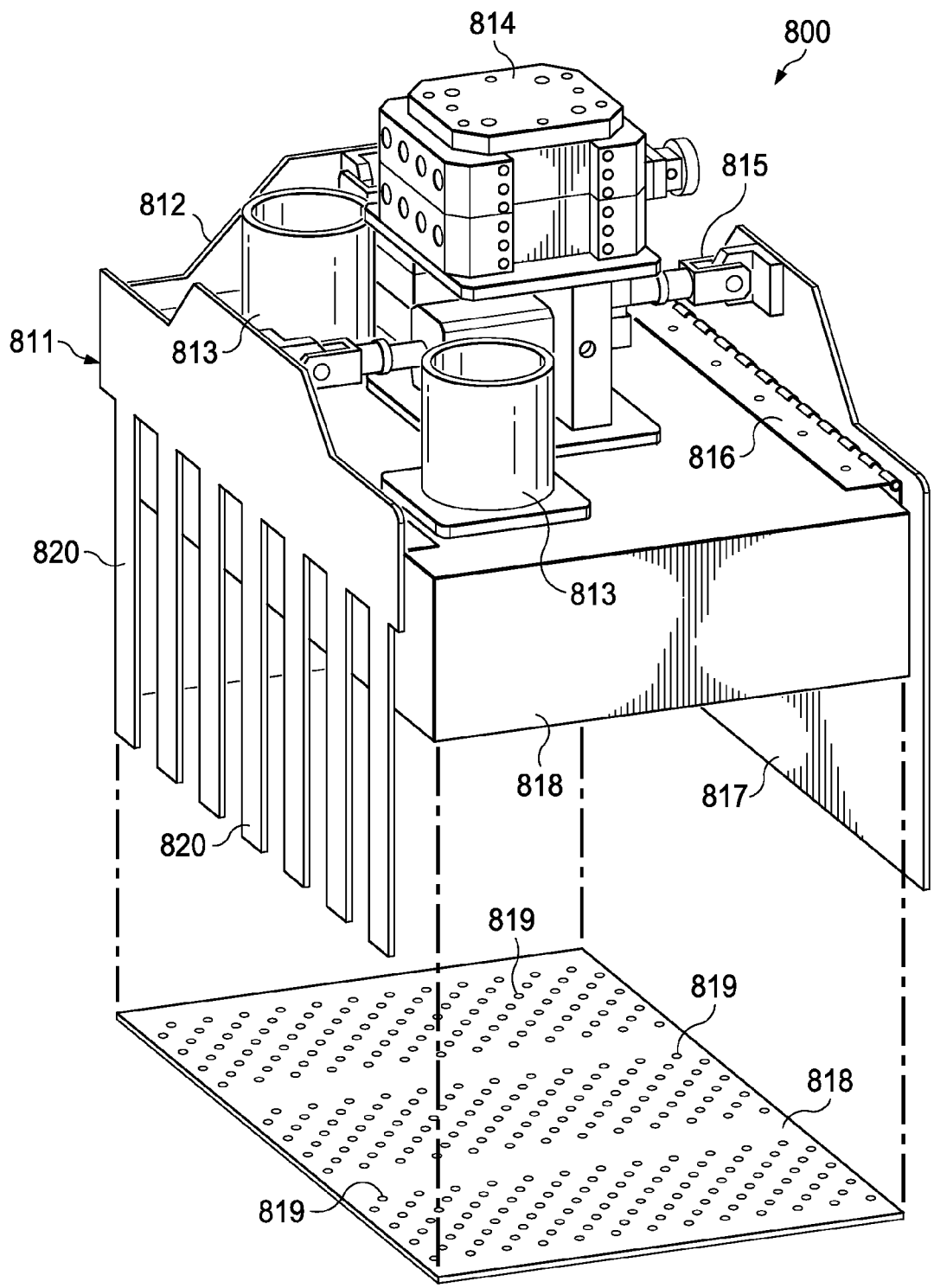
FIG. 8A shows a schematic view of an embodiment of the invention depicting an end effector for a pattern transfer robot.

FIG. 8A shows one embodiment of an end effector 800 for a pattern transfer robot, which in some embodiments comprises an articulated arm that is connected to an adapter plate 814. An adapter plate can be used to adapt robot tooling depending on the pillow bags and patterns that are being placed. For example, an adapter plate allows one robot to adapt to form a pattern because multiple end effectors fit the same adapter plate. By using an adapter plate and simply changing the end effector attached to the adapter plate, a robot can pick and place bags in a variety of patterns and in a variety of secondary packaging (e.g. ultimate packages). A vacuum input tube 813 provides vacuum to a plenum 818. As shown in the exploded view in FIG. 8A, the bottom of the plenum has holes 819. Although the holes 819 may be present in a removable panel, which forms the bottom of the plenum 818, the holes can also be on a panel that is integral with the rest of the plenum 818. Holes 819 (also shown in a plan view of the bottom surface of the plenum 818 in FIG. 8C) allow the vacuum to gain control of one pillow bag or a plurality of pillow bags as the pattern transfer robot positions the end effector 800 in close proximity to pillow bags. Crowder plates 811, 812, and 817 constrain the at least one pillow bag laterally to facilitate entry of the at least one pillow bag into an ultimate package (e.g. a cardboard box, a sack, etc.). For ease of viewing, in FIG. 8A a fourth crowder plate (e.g. crowder plate 823 in FIG. 8B) has been removed from the side of the end effector 800 that is facing the viewer. The crowder plates 811, 812, 817, 823 articulate away from the at least one pillow bag during the picking step and then back into the at least one pillow bags for the transfer or placing step. For example, during articulation, crowder plate 817 is forced to rotate around hinge 816 by actuator 815. When a pattern of pillow bags is transferred from a universal surface to an ultimate package, the pattern transfer robot picks the at least one pillow bag from the universal surface during a picking step. After the picking step, the crowder plates of the pattern transfer robot articulate toward the at least one pillow bag. Then, the pattern transfer robot transfers the at least one pillow bag to the ultimate package. As the at least one pillow bag is placed in the ultimate package during a transfer or placing step, the crowder plates act like a shoe horn to help keep the at least one pillow bag from splaying out. In some embodiments, without the crowder plates, it is more difficult to effectively, accurately, and consistently place pillow bags in an ultimate package. For example, the crowder plates prevent the at least one pillow bag from hitting the mouth of the ultimate package and being deflected outside the ultimate package rather than being placed inside the ultimate package.

Figure 8B:
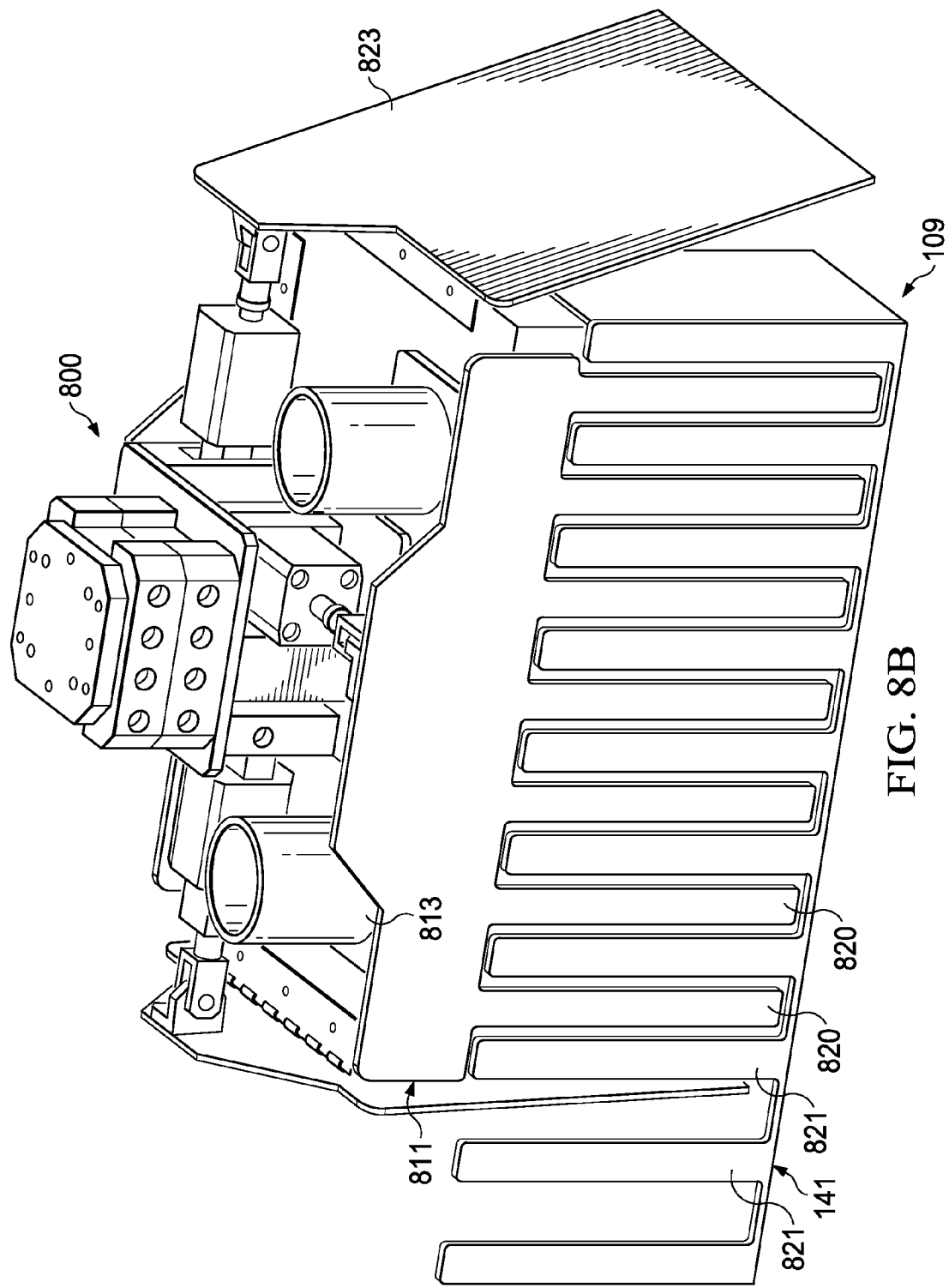
FIG. 8B shows another view of the embodiment of FIG. 8A.
Figure 8C:
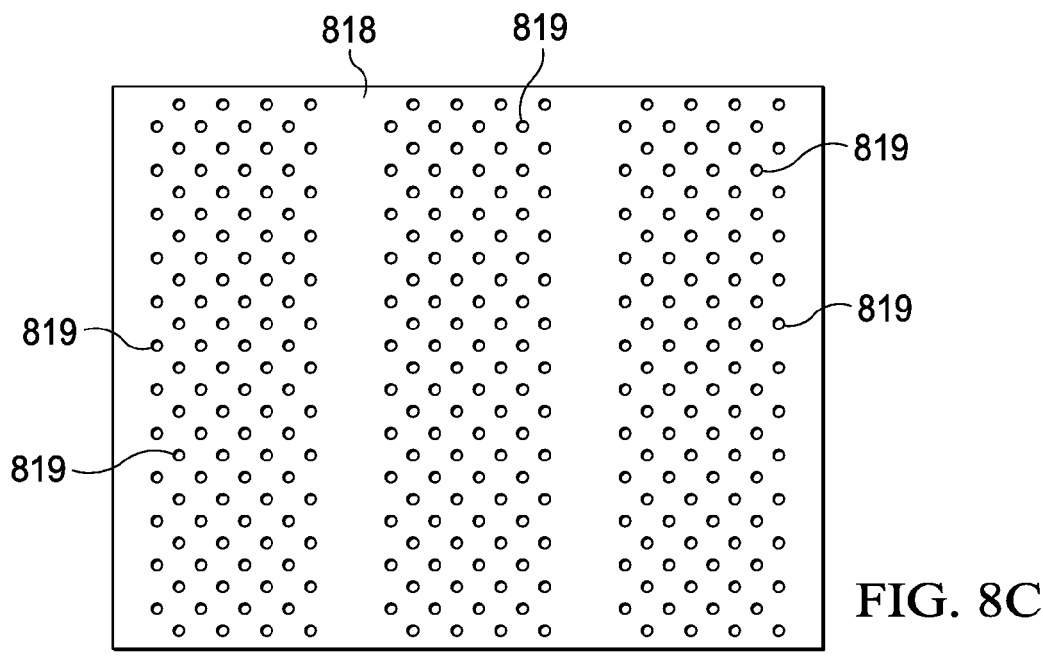
FIG. 8C shows a schematic plan view of holes in the bottom surface of a plenum for the end effector.

FIG. 8B shows the pattern transfer end effector with the crowder plate 823 that was removed for clarity in FIG. 8A. The end effector 800 is in a picking position with crowder plate 823 shown in an open position. As shown in FIG. 8B, a crowder plate can be a surface similar to the first surface 141 or second surface 151 of the universal surface. For example, a crowder plate can be a finger wall. As shown in FIG. 8B, fingers 820 in crowder plate 811 interface with fingers 821 of a universal surface 109 (e.g. compound angled tray). This finger interface between the end effector 800 and universal surface 109 allows the path of the end effector 800 as it departs from the pick position and travels to the place position to be more direct. This results, for example, in increased cycle times for picking and placing using the pattern transfer robot. The fingers in the end effector 800 also reduce the frictional load between the at least one pillow bag and the universal surface 109 (e.g. the force between the at least one pillow bag and the second surface 141 of the universal surface 109) thereby reducing the force required to be delivered by the vacuum plenum when picking the at least one bag. Additionally, the fingers in the end effector 800, because they can pass through the fingers of the universal surface, can simplify the process of transferring pillow bags from the universal surface to an ultimate package. For example, rather than needing to slide all the crowder walls of the end effector precisely between the walls of the universal surface and pillow bags, crowder walls with fingers can just pass through a corresponding finger wall of the universal surface to help corral the pillow bags for picking and/or transferring the pillow bags.

Figure 9:
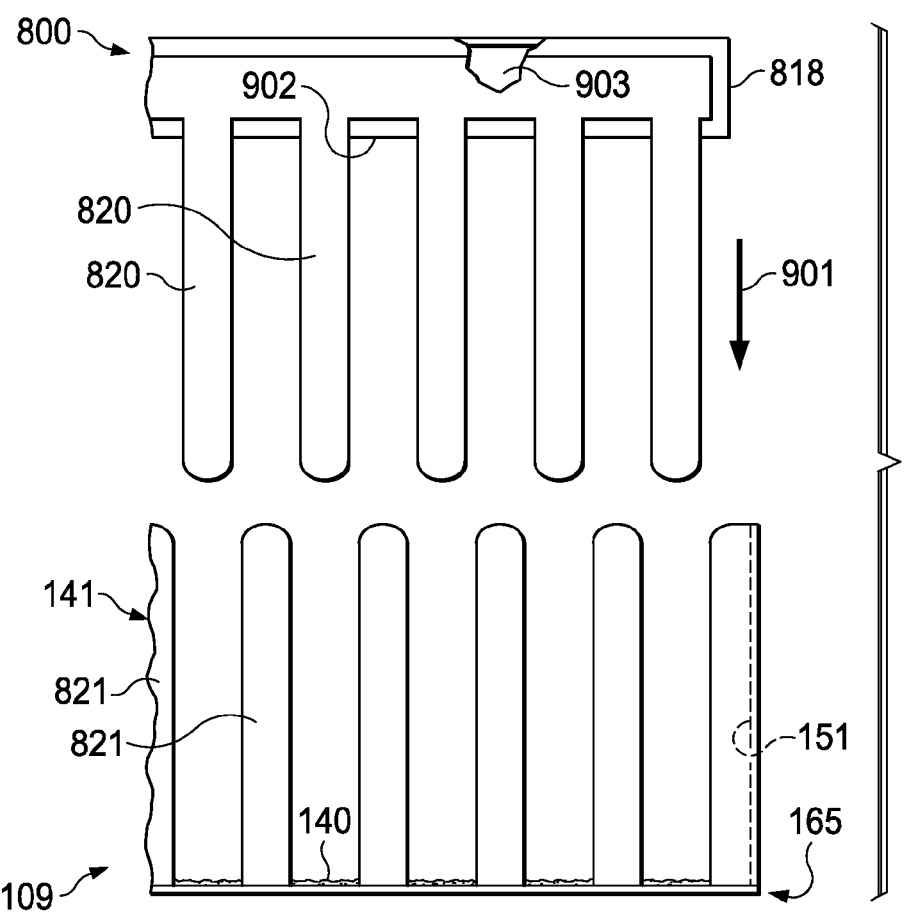
FIG. 9 shows a schematic view of an embodiment of the invention depicting mating or matching finger walls for a universal surface and robot end effector.

FIG. 9 shows a side view of the universal surface 109 looking parallel to the second surface 151 with lower corner 165 shown on the right.

The fingers 821 of the universal surface are shown at a mating orientation (e.g. pitch) to the end effector 800 that is connected and controlled by a pattern transfer robot.

At least one pillow bag will be resting on the first surface 140 and supported by the second and third surfaces 141, 151 as the end effector moves in direction 901. This motion continues until the lower surface 902 of the end effector (e.g., lower surface of plenum 818) contacts the top of the at least one pillow bag and secures the at least one pillow bag via the vacuum 903 generated in a vacuum chamber (e.g. plenum 818).

As shown in FIG. 9, the mating slotted fingers of the universal surface 821 and end effector 820 allow, for example, the path of the end effector 800 to go into the page instead of having to lift up and over the second surface 141 of the universal surface 109. The resulting motion improves pillow bag control and improves transfer rates. If the end effector or universal surface had solid walls and the end effector took a path into the page after being lowered, the walls of the end effector and universal surface would collide rather than slip past each other.

Figure 10:
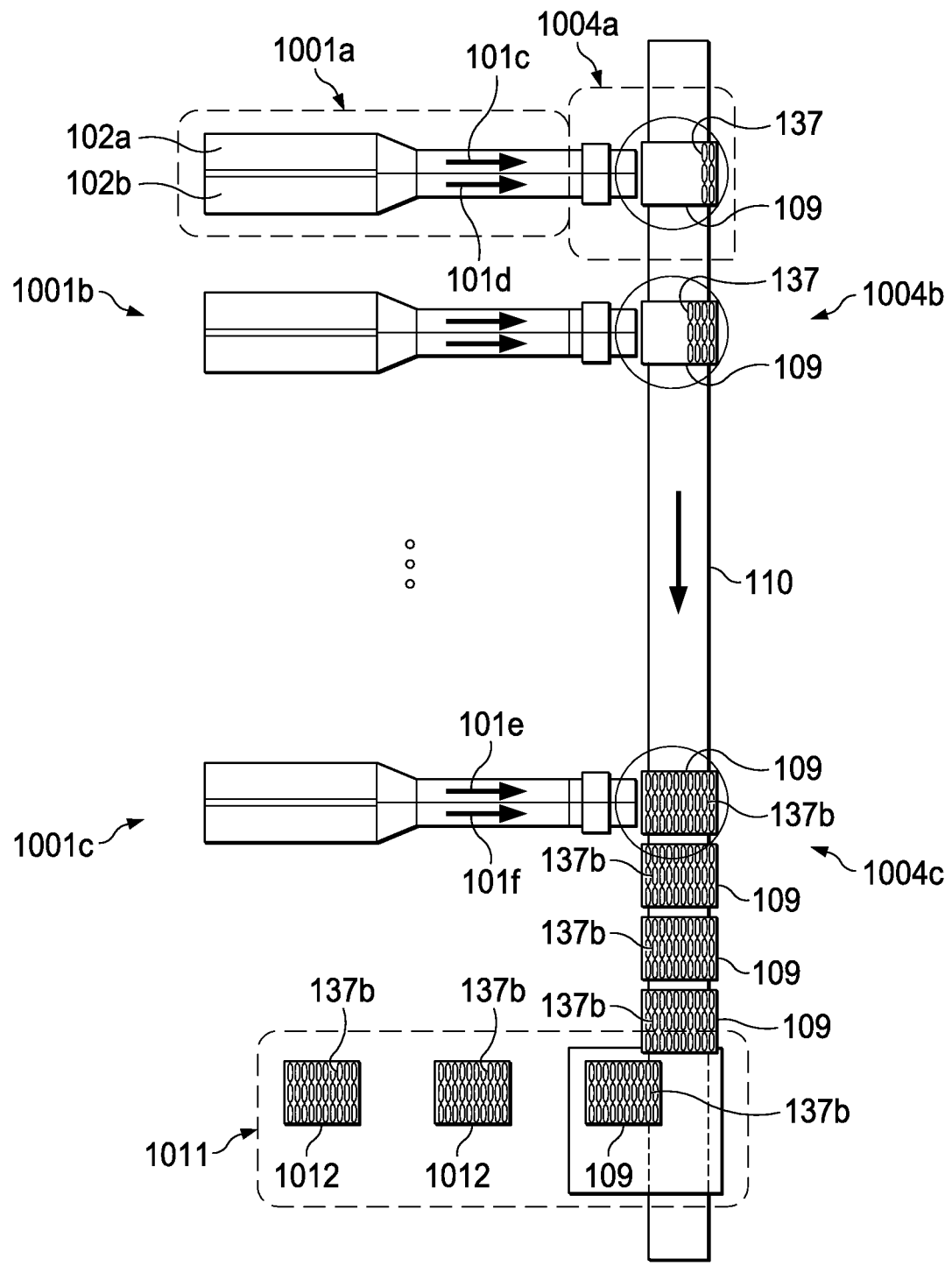
FIG. 10 shows a schematic view of an embodiment of the invention depicting a pattern creation line using multiple input modules to form a finished pattern.

FIG. 10 shows a first input module 1001a feeding a first pillow bag 101c and a second pillow bag 101d to a first pattern creation cell 1004a. The first input module 1001a comprises a first input device 102a and a second input device 102b, although in some embodiments the first input module 1001a comprises a single input device or a plurality of input devices. In some embodiments, the first pillow bag 101c and the second pillow bag 101d are different in type, in size, with regard to some other characteristic, or in some combination thereof. The first pattern creation cell 1004a receives the pillow bags 101c, 101d from the input module and places them on universal surface 109 in desired patterns 137.

Subsequent input modules 1001b, 1001c and subsequent pattern creation cells 1004b, 1004c work together to add pillow bags to a universal surface 109 until the final input module 1001c feeds pillow bags 101e and 101f to the final pattern creation cell 1004c creating a finished pattern 137b.

A universal surface conveyor 110 transports the universal surfaces 109 with the completed patterns 137b to a pattern transfer station 1011 where the completed patterns 137b are removed from the universal surfaces 109 and placed into ultimate packages 1012.

An input module 1001a, 1001b, 1001c can feed a single pillow bag 101c, 101d, 101e, 101f to a pattern creation cell or feed a plurality of pillow bags. FIG. 10 shows an embodiment where two types of pillow bags 101c, 101d are fed from a single input module 1001a. More than two types of pillow bags can be fed from a single input module if desired.

Figure 11:
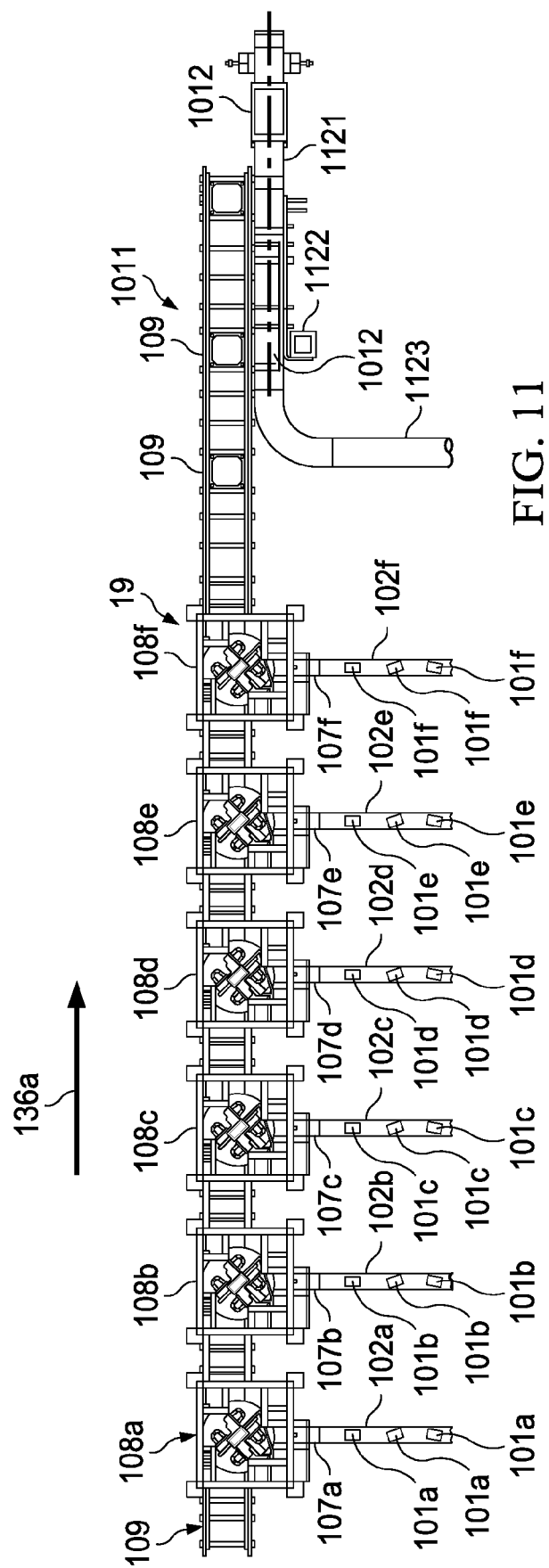
FIG. 11 shows a schematic view of an embodiment of the invention depicting a pattern creation line with input modules that comprise only a single input device.

FIG. 11 shows an embodiment of the invention for making multipacks of snack food bags that are placed in a pattern in an ultimate package that is a caddie or case.

A first set of pillow bags 101a are transported by a first input device 102a under a first vision system 107a. The orientation and position of the first set of bags 101a are determined and tracked by the first vision system 107a such that a first delta robot 108a can pick the bags from the first input device 102a and place the bags on a universal surface 109. Subsequent sets of pillow bags 101b, 101c, 101d, 101e, 101f are handled by subsequent input devices 102b, 102c, 102d, 102e, 102f, vision systems 107b, 107c, 107d, 107e, 107f, and delta robots 108b, 108c, 108d, 108e, 108f. The embodiment shown in FIG. 11 uses delta robots 108a, 108b, 108c, 108d, 108e, 108f that are Adept Quattro 650H robots. Additionally, the embodiment shown in FIG. 11 comprises input modules which each comprise a single input device 102b, 102c, 102d, 102e, 102f.

The bags 101a, 101b, 101c, 101d, 101e, 101f on the input devices 102a, 102b, 102c, 102d, 102e, 102f are flat but at random angular orientations. A first delta robot 108 picks a bag 101a in a flat condition, orients the angle of the bag, flips the bag into a stand-up position and then places the bag on a universal surface 109 to form a pattern. The universal surface 109 travels in direction 136a and maintains the position and orientation of the bag as subsequent delta robots 108b, 108c, 108*d*, 108*e*, 108*f* add subsequent bags 101*b*, 101*c*, 101*d*, 101*e*, 101*f*, to a pattern of bags until the pattern is completed after the final delta robot 108*f* places the final bag or bags 101*f*.

In some embodiments, a robot 108*a*, 108*b*, 108*c*, 108*d*, 108*e*, 108*f* places a plurality of bags on a universal surface 109. Although, in other embodiments, a robot places a single bag on the universal surface 109.

The universal surface 109 transports the completed patterns to a pattern transfer station 1011. A pattern transfer robot 1122 removes the completed patterns from the universal surface 109. The embodiment shown in FIG. 11 uses a pattern transfer robot 1122 that is a Kawasaki RS30N, 6-axis articulated arm robot. The pattern transfer robot 1122 places the patterns into an ultimate package 1012, for example, a multipack case or caddie supplied by a first ultimate package conveyor 1121. Some of the ultimate packages 1012 are used to package multiple layers of bags. When an ultimate package 1012 is used to package multiple layers of bags, the ultimate package 1012 remains stationary as a pattern transfer robot 1122 loads the required number of layers into the ultimate package 1012. In some embodiments, an ultimate package 1012 comprises a plurality of universal elements. A universal element is a pattern in the form of a layer. The universal element can be fed to the in-feed of a packaging device (e.g., a sacking, carting, or boxing machine) or can be loaded directly into an ultimate package 1012. In some embodiments, a second universal element is supported by a first universal element that has already been placed inside the ultimate package 1012. For example, each universal element can form a layer in a multi-layer pattern inside an ultimate package 1012. Once a completed pattern is loaded into the ultimate package 1012, the ultimate package is transported away by a second ultimate package conveyor 1123.

In some embodiments, the pattern transfer robot 1122 can remove patterns from the universal surface 109 and place them into an input device for a sack machine. The sack machine then completes the transfer of the pattern into a sack.

Although some embodiments have been described as using a single conveyor, various numbers of conveyors can be used. For example, in some embodiments, ultimate packages are conveyed by a single ultimate package conveyor. In other embodiments, ultimate packages are conveyed by a plurality of ultimate package conveyors.

Figure 12:
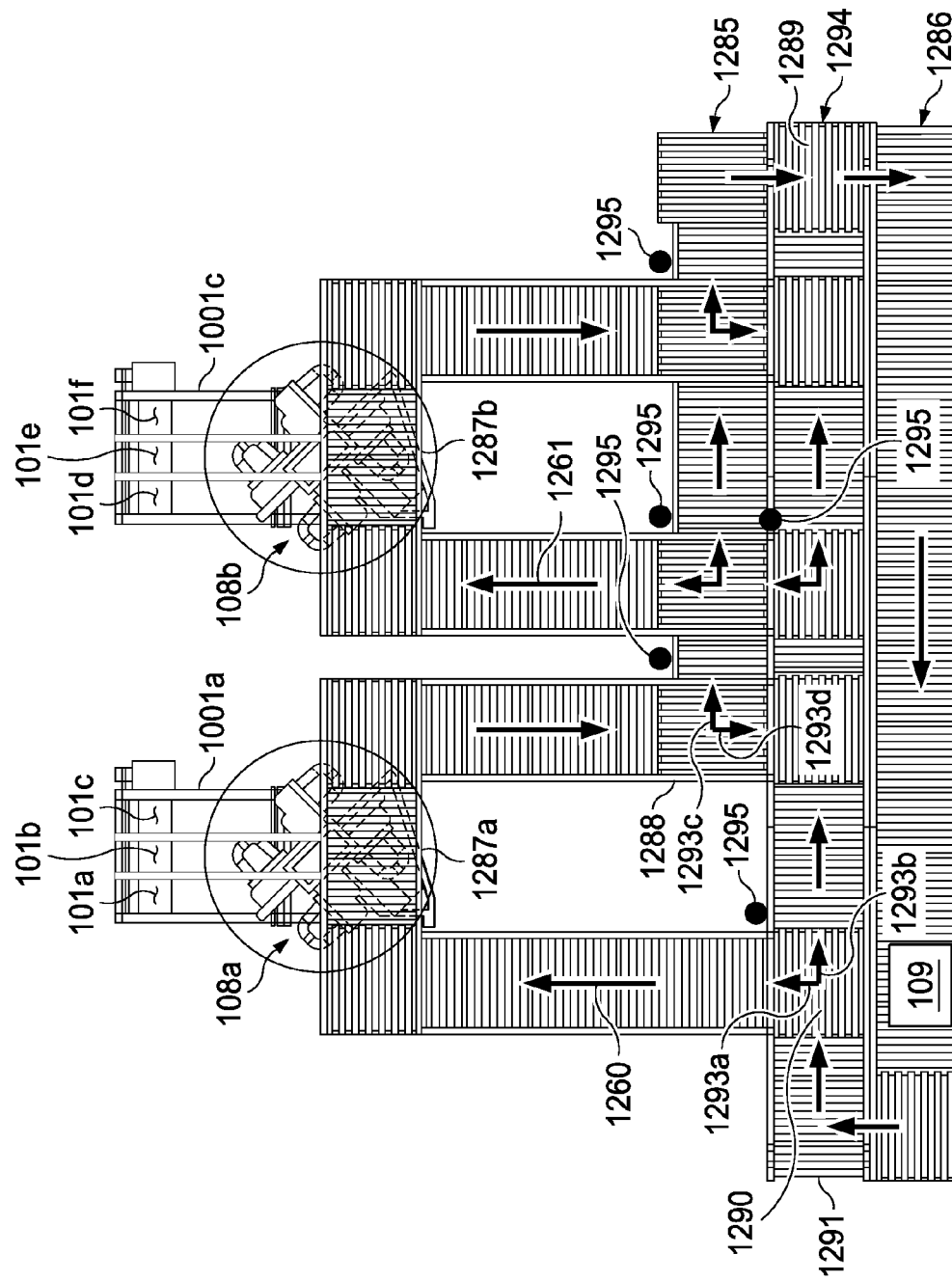
FIG. 12 shows a schematic view of an embodiment of the invention depicting a universal surface that is decoupled from a universal surface conveyor.

FIG. 12 shows an embodiment of a universal surface 109 where the universal surface 109 is a compound angled tray that is de-coupled from the universal surface conveyor. Universal surfaces 109 travel on reuse path 1286 and are inducted into a universal surface filling system (e.g., pattern creation line) at a reuse turn 1292. Universal surfaces travel from first turn 1291 to a first decision point 1290. At the first decision point 1290 a label reader 1295 identifies the universal surface. Although, a label reader (e.g., bar code scanner) is used, other approaches to identifying the universal surface can also be used. After the universal surface has been identified, it can be directed in various directions at a decision point, depending on which, if any, pillow bags still need to be added to a pattern on the universal surface. At the first decision point 1290, a turn can be rotated so that the universal surfaces can be sent in a first direction 1293*a* on a first pattern creation cell lane 1260 toward a first pattern creation robot 108*a* or allowed to continue in a second direction 1293*b* that bypasses the first robot 108*a*. In some embodiments, the turn can comprise rollers, although other approaches can also be used to change the direction of a universal surface at a turn. For example, a conveyor belt or a magnet way with a linear motor (e.g., a linear induction motor) can also be used to convey or change the direction of a universal surface. As another example, the universal surface can comprise a magnet, (e.g., permanent magnet, or electromagnet such as an induction coil), or a metal that experiences a force in the presence of a magnetic field. If a universal surface 109 is sent in the first direction 1293*a*, the universal surface will continue to first pattern creation cell 1287*a* where the first pattern creation robot 108*a* will pick a desired number of bags from each of the available types of bags 101*a*, 101*b*, and 101*c* from a first input module 1001*a* and place the picked bags into the universal surface 109. The universal surface 109 will then continue to second decision point 1288. If more pillow bags are required to complete a pattern on the universal surface 109, then the universal surface is sent in a first direction 1293*c* to a Work-In-Progress (WIP) lane 1285. From the WIP lane 1285, the universal surface 109 can be sent to a subsequent pattern creation cell lane 1261 toward a subsequent pattern creation robot 108*b* at a subsequent pattern creation cell 1287*b*. If the pattern is complete at the second decision point 1288 then the universal surface 109 can be sent in a second direction 1293*d* to an express lane 1294 for transportation to a pattern transfer location. In some embodiments, once the universal surface 109 reaches the express lane 1294, another turn 1289 can be used, for example, to position the universal surface 109 on a reuse path 1286. In one embodiment, only completely empty universal surfaces or universal surfaces with completed patterns are sent to the express lane 1294 and any universal surface that is on the WIP lane 1285 or on a pattern creation cell lane 1260, 1261, remains on a WIP lane or a pattern creation cell lane until a pattern on the universal surface is complete or the universal surface is emptied, for example, by a pattern transfer robot at a pattern transfer location. In some embodiments, the express lane provides a more direct path from one location to another as compared to the WIP lane. For example, the WIP lane can include more turns and decision points than the express lane. The WIP can also experience traffic jams, for example, where a universal surface returning from a pattern creation cell and a universal surface that bypassed the pattern creation cell can approach a given location on the WIP lane at the same time. Under these circumstances, the universal surfaces can collide if one conveyor is not paused. However, pausing a conveyor slows down the average time at which the WIP lane can convey products. Thus, even if the WIP lane and the express lane convey products at the same speed, the express lane can be used to convey a universal surface with a finished pattern to another location (e.g. pattern transfer station) more quickly. Additionally, in some embodiments, the express lane conveys products at a faster speed than the WIP lane.

In some embodiments, a universal surface pattern does not include any of the types of pillow bags 101*a*, 101*b*, 101*c* at a first pattern creation cell 1287*a* but does include at least one or even all of the types of pillow bags 101*d*, 101*e*, 101*f* available at a subsequent pattern creation cell 1287*b*. If the final design for a pattern on a universal surface includes pillow bags from the subsequent pattern creation cell 1287*b*, the universal surface will be sent to the pattern creation cell 1287*b*.

Figure 13:
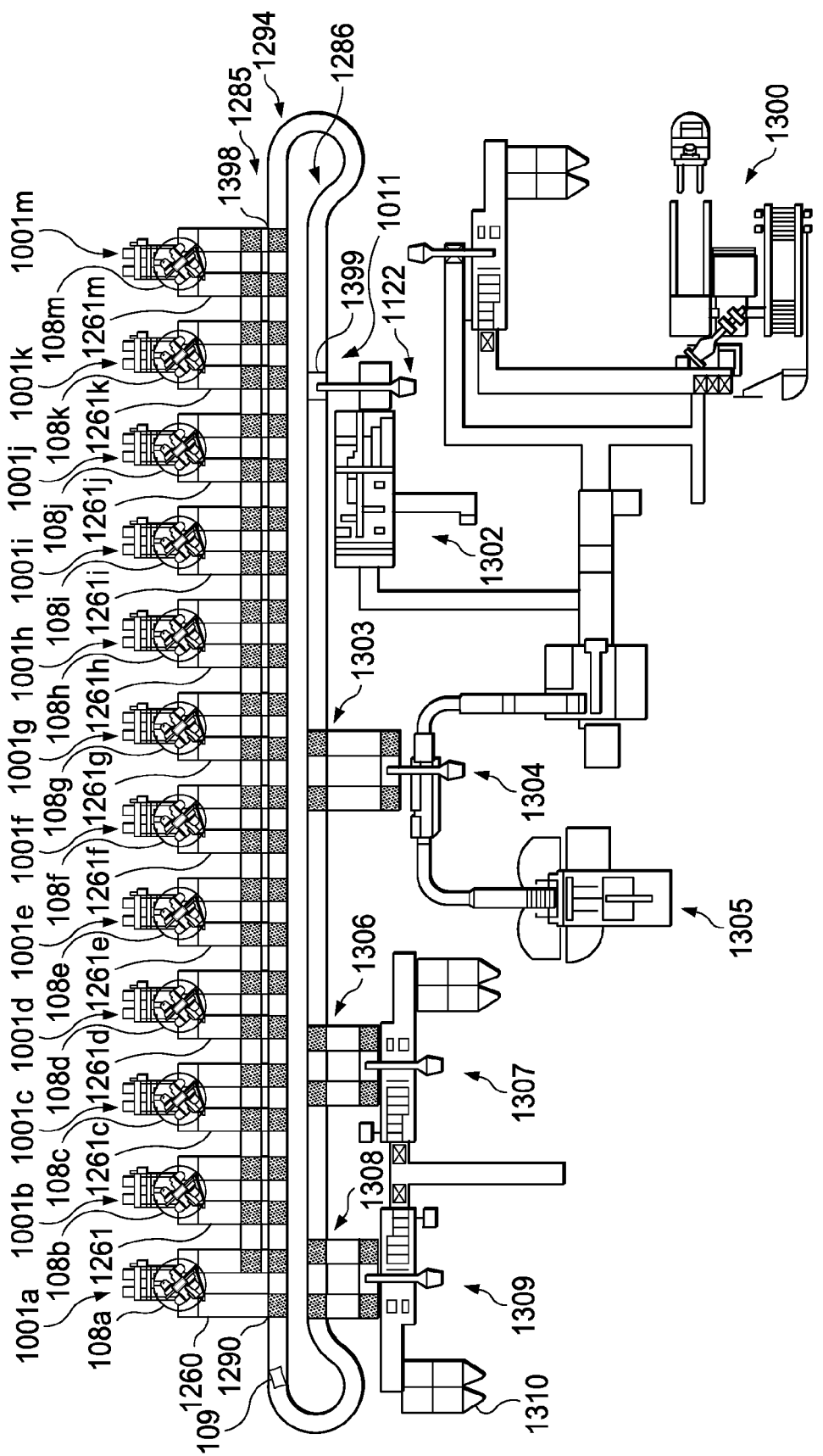
FIG. 13 shows a schematic view of an embodiment of the invention depicting a universal surface that is decoupled from a universal surface conveyor in the context of a pattern creation line that comprises twelve pattern creation cells which each comprise a single pattern creation robot.

FIG. 13 shows an example of a decoupled universal surface 109 that is decoupled from a universal surface conveyor in conjunction with twelve pattern creation robots 108*a*, 108*b*, 108*c*, 108*d*, 108*e*, 108*f*, 108*g*, 108*h*, 108*i*, 108*j*, 108*k*, 108*m*, with each robot being fed by an input module 1001*a*, 1001*b*, 1001*c*, 1001*d*, 1001*e*, 1001*f*, 1001*g*, 1001*h*, 1001*i*, 1001*j*, 1001*k*, 1001*m* using a triple in-feed system. In other words, each pattern input module comprises three input devices. Some of the equipment associated with the twelve pattern creation robots, input modules, first pattern creation lane 1260, subsequent pattern creation lanes 1261, 1261*c*, 1261*d*, 1261*e*, 1261*f*, 1261*g*, 1261*h*, 1261*i*, 1261*j*, 1261*k*, 1261*m*, WIP lane 1285, express lane 1294, reuse path 1286 and associated equipment was generally described in FIG. 12. FIG. 13 shows, for example, how a decoupled universal surface can be used with a plurality of pattern creation cells.

As shown in FIG. 13, a universal surface 109 is sent from a first decision point 1290 to appropriate pattern creation cells to receive a required quantity of 36 available types of pillow bags. Once a pattern on a universal surface is completed, the universal surface exits the WIP lane 1285 and enters the express lane 1294. The universal surface exits the WIP lane at a location (e.g., location 1398) and is sent to a first pattern transfer station (e.g. first pattern transfer station 1011). At the first pattern transfer location 1399, the pattern can be removed from the universal surface 109 and placed on an input device for a sack machine 1302 by a pattern transfer robot 1122. Similarly at a subsequent decision point 1303 the universal surface can be sent to a second pattern transfer station where a second pattern transfer robot 1304 removes the pattern from the universal surface 109 and places the pattern into a carton made by a carton forming machine 1305. The universal surface can also be sent to a third decision point 1306, where the pattern transfer robot can be sent to a third pattern transfer robot 1307. Additionally, the universal surface can be sent to a fourth decision point 1308, where the universal surface can be sent to a fourth pattern transfer robot 1309. In some embodiments, a pattern transfer robot (e.g., the third and fourth pattern transfer robots 1307, 1309) remove the pattern from the universal surface 109 and place the pattern into an Eaches configuration in a case that has been formed by an Eaches case erector 1310. Eaches configurations can be desirable because, for example, on a given production run each individual Eaches configuration can comprise any number of any type of product (e.g., multiple types of chip products, or different sizes of the same type of chip products). Meanwhile, for a given multipack production run, each multipack configuration has the same number, type, and arrangement of products. In other words, when using an Eaches production run, an ultimate package can include products of variable type, number, orientation, and position. Meanwhile, when using a multipack production run, each ultimate package includes the same mix, number, orientation, and position of products, although the number of units of the product can vary.

Eaches are especially useful for smaller customers who cannot order an entire pallet of a product, but would rather buy the product on an "each bag" basis. Eaches product configurations provide, for example, flexibility with respect to the type, number, orientation, and position of products on a universal surface and in an ultimate package. For example, in some embodiments, an Eaches order includes at least one product selected from the group consisting of products in a bottle, products in a can, products in the shape of bars, products in pillow bags, or some combination thereof. In some embodiments, the at least one product in an Eaches configuration has an orientation selected from the group consisting of, lying on a side, lying on a bottom, lying on a front, lying on a back, lying flat on a face, or some combination thereof.

In some embodiments, ultimate packages (e.g. cases, cartons, sacks, boxes, etc.) are sent to a palletizing robot 1300, which places the ultimate packages in a pallet.

In some embodiments a decoupled universal surface provides operational flexibility by permitting universal surfaces that arrive on a single input device to be directed to any of a plurality of connected transfer stations. For example, in some embodiments the same universal surface conveyor can supply universal surfaces for the simultaneous creation of different types of ultimate packages, for example, sacks, cases, boxes, cartons and caddies. In some embodiments, the decoupled universal surface facilitates the automation of a system for taking, packaging, and delivering orders of product in an Eaches or multipack configuration.

Comparative Examples

One embodiment of the invention provides for measuring a thickness of a moving pillow bag and using the measurement to pick and place the pillow bag. In one embodiment, the pillow bag is a bag of chips. In one embodiment, the pillow bag has variable dimensions and exhibits various conditions and orientations. For example, the amount of air in a bag can vary, and this can in turn, change the thickness of a bag. As another example, the direction that a bag is facing can vary.

In another embodiment, a pattern creation cell comprises an apparatus for measuring a thickness of a moving pillow bag and using that measurement to pick and place the pillow bag.

In one embodiment, a robot is used to pick and place the pillow bag and the robot is positioned using the measurement of the thickness. In one embodiment, a pattern creation cell is used to measure a thickness, position, and orientation of the moving pillow bag and pick and place the pillow bag in an array of pillow bags according to a desired pattern. In one embodiment, the pattern creation cell transmits information regarding the thickness, position, and orientation of the pillow bags in an array of pillow bags to another pattern creation cell. In one embodiment, pattern creation cells are used in conjunction to form patterns. In some embodiments, these patterns are complicated. For example, in some embodiments, the patterns comprise pillow bags 101 that are angled towards a wall of the universal surface 140. In one embodiment, a pattern comprises an array or grid of pillow bags. In another embodiment, a pattern comprises pillow bags stacked on top of each other along two or more planes. In further embodiments, the patterns comprise unique combinations of bag types and bag quantities in each pattern. In one embodiment, a pattern is described by a list of bag types and quantities associated with each type of bag.

In one embodiment a robot 108 places pillow bags 101 into a pattern 137 that will fit into a box of known size (not shown). In creating the pattern 137, the thickness 128 of every bag 101 and any gaps between the bags are measured and added together until a first column height 144 equal to the box size is obtained, at which point a second column is started. In the embodiment of FIG. 1, the second column would be placed in front of the first column which forms a part of the array 137. In other words, the second column is placed out of the page and toward the viewer in a way that would block the viewer's view of the first column. In one embodiment, this process of placing columns continues until the robot 108 has finished the array 137. In other embodiments, additional robots can place columns, including for example, individual bags, to form the array 137.

In one embodiment, the invention creates tighter patterns of pillow bags than a traditional manufacturing, handling, or transportation apparatus or method. For example, in one embodiment, the tolerance (e.g. space) between bags in a pattern is selected to be about 5 mm. However, when using a manufacturing, handling, or transportation system with assumed bag thicknesses, the actual spacing between the bags can vary substantially from the selected tolerance of about 5 mm.

In one embodiment of the invention, downtime during a production run is decreased relative to a traditional manufacturing, handling, or transportation apparatus, system or method. In one embodiment, downtime is reduced by at least about 100 minutes per day, 200 minutes per day, or 400 minutes per day. Although the actual amount of downtime prevented can vary depending on downtime per bag and the number of dropped bag events per day in a given traditional system and an embodiment of the invention. In one embodiment of the invention, substantially all down time due to dropped bags can be eliminated.

In one embodiment, the invention is a new and innovative apparatus capable of measuring the dimensions of a moving pillow bag and using that information to pick and place the pillow bag to form a high quality pattern, while simultaneously avoiding damage to the pillow bag. For example, in one embodiment, the invention is an apparatus that measures the height of a pillow bag on a running conveyor and can feed this height measurement to a pick and place system. In an additional embodiment, the pick and place system makes a dynamic pick and dynamic place using the measurement of a thickness of a pillow bag to adjust both the pick and place locations for the pillow bag. Accordingly, poor quality patterns, inefficiency, damaged product, and wasted product can be avoided while the accuracy, precision, reliability and efficiency of the pick and place system is simultaneously increased.

In another embodiment of the invention, an apparatus capable of measuring the position and dimensions of a moving pillow bag transmits information about the position and dimensions of the pillow bag to at least one other apparatus. For example, in one embodiment, a pattern creation cell with information about the position and dimensions of pillow bags transmits this information to at least one other pattern creation cell. In one embodiment, a pattern created by one pattern creation cell can be added to or modified by another pattern creation cell. For example, in one embodiment, a first pattern creation cell places at least one pillow bag in a first row on a tray, while a second pattern creation cell places at least one pillow bag in a second row that is adjacent to the first row. In one embodiment, pattern creation cells are used in combination to create more complicated patterns. This is desirable for the flexibility it provides with respect to designing patterns and the efficiency and cost-savings it provides with respect to reducing or eliminating misplaced and damaged product.

In one embodiment, the invention is a method comprising the steps of conveying a pillow bag into contact with a feed forward unit, wherein the contact causes a change in the position of the feed forward unit to accommodate a thickness of the pillow bag, using a distance sensor to measure a change in position of the feed forward unit, converting the change in position of the feed forward unit into a measurement of the thickness of the pillow back, using the measurement of the thickness to pick the pillow bag, and using the measurement of the thickness to place the pillow bag in an array of pillow bags according to a desired pattern.

In one embodiment, the method comprises the steps of using a pattern creation cell to form a first pattern by conveying a pillow bag into contact with a feed forward unit, wherein the contact causes a change in the position of the feed forward unit to accommodate a thickness of the pillow bag, using a distance sensor to detect a maximum change in position of the feed forward unit as a pillow bag passes under the feed forward unit, converting the maximum change in position of the feed forward unit into a measurement of the thickness of the pillow bag, using the measurement of the thickness to pick the pillow bag, and using the measurement of the thickness to place the pillow bag in an array of pillow bags according to a desired pattern; transmitting information about the array of pillow bags from the first pattern creation cell to a second pattern creation cell, and using the second pattern creation cell to form a second pattern that uses or incorporates the array of pillow bags from the first pattern.

In one embodiment, the method comprises the steps of conveying a pillow bag into contact with a feed forward unit, wherein the contact causes a change in the position of the feed forward unit to accommodate the thickness of the pillow bag, using a presence sensor to determine when the pillow bag begins and ceases to cause a change in the position of feed forward unit, using a distance sensor to continuously measure the change in position of the feed forward unit, capturing the maximum change in position of the feed forward unit caused by the pillow bag, converting the maximum change in position of the feed forward unit into a measurement of the thickness, using the measurement of the thickness to pick the pillow bag, and using the measurement of the thickness to place the pillow bag in an array of pillow bags according to a desired pattern.

In one embodiment, a conveyor belt propels a non-rigid pillow bag into contact with a feed forward unit so that the pillow bag pushes up the feed forward unit. The feed forward unit is lightweight and also assists the conveyor to propel the pillow bag. The feed forward unit assists by using rollers to propel the pillow bag at a speed that is nearly identical to the speed at which the conveyor propels the pillow bag. The feed forward unit is attached to fixed points and the unit is free to rotate about these fixed points. This allows the unit to be pushed by the pillow bag vertically away from the conveyor and parallel to the direction of motion of the conveyor. The feed forward unit comprises a vertical stop that maintains a gap between the unit and the conveyor, allowing the pillow bag to easily pass between the unit and conveyor. A flat surface is mounted on the feed forward unit for measurement of the vertical position of the unit using a laser distance sensor. The laser distance sensor is mounted to a fixed location not on the unit. A photo-eye sensor is used on the gap between the feed forward unit and conveyor to detect the presence of the pillow bag in order to capture the pillow bag's thickness.

Although the invention has generally been described, for example in FIG. 1, using a particular laser sensor to measure distance, and hence the thickness 128 of pillow bags 101, alternative distance sensors can also be used, for example, a camera, laser, light sensing device, ultrasonic device, or other non-contact distance sensors. For example, in one embodiment, assuming a bag is conditioned well (e.g., lack of crinkles or fold overs), the bag can be conveyed under a 3D line scanner to create a profile of the bag and provide a planar map of the bag with respect to the surface of a conveyor for the bag. The planar map can in turn be used with planar matching, vision tools, or calculations to determine the thickness of the bag.

Additionally, the invention has generally been described, for example in FIG. 1, using contact to measure the thickness 128 of pillow bags 101. For example, a first surface of a pillow bag 101 is in contact with a first input device 102 and a second surface of the pillow bag 101 is in contact with a secondary input device 124. In FIG. 1, the distance between these two contact points can be used to measure the thickness 128 of the pillow bag 101. However, in other embodiments, noncontact approaches for measuring thickness can also be used. For example, at least one distance sensor can be used to map, in whole or in part, directly or indirectly, at least one surface of a pillow bag 101. For example, in one embodiment, a three-dimensional ("3D") camera can be used to map the at least one surface of a pillow bag 101. By calculation, estimate, reasonable assumptions, or some combination thereof, information regarding the at least one surface of the pillow bag 101 can be converted into a volume of the pillow bag 101 at certain conditions. In turn, by calculation, estimate, reasonable assumptions, or some combination thereof, the volume of a pillow bag 101 at certain conditions can be converted into a thickness 128 of the pillow bag. Generally speaking, because the pillow bag 101 is non-rigid, the thickness 128 of the pillow bag at any given location along its length will depend on the shape of the pillow bag. For example, the thickness 128 of a pillow bag 101 that is relevant for placing the pillow bag in an array of pillow bags 137 is the maximum thickness that the pillow bag will have in the array. For example, this can determine how closely pillow bags can be placed to each other. Accordingly, the shape that a pillow bag will have in a pattern can be used to calculate or estimate the relevant thickness of the pillow bag in the pattern.

Further, the invention has generally been described, for example in FIG. 1, using encoders 104, 111 to track positional information that can be used, for example, to determine the location of a pillow bag 101 or an array of pillow bags 137. However, in some embodiments of the invention other devices are used to track positional information, for example, a rotational feedback device that can provide position and velocity information over time.

In addition, the invention has been described, for example in FIG. 1, using a programmable automation controller (PAC) as a control platform for communicating between various components, for example, robot controllers. However, in some embodiments other control platforms can also be used, including, but not limited to, a programmable automation controller (PAC), a programmable logic controller (PLC), a personal computer (PC), an industrial PC, a handheld computing device, a mobile computing device, a tablet computer, or a smart phone.

Furthermore, the invention has been described, for example in FIG. 1, using a first input device 102 and a second input device 103. However, in other embodiments a different number of input devices can be used, for example, a plurality of input devices or a single input device.

Additionally, in some embodiments the first support 141 which extends perpendicularly from the top surface 140 of the universal surface 109 can be a finger wall. For example, the first support 141 can comprise a series of fingers with gaps between them. In some embodiments, this allows a component with matching fingers and gaps on an end effector 145 of a robot 108 to pass through the finger wall 141 without having to be raised above the finger wall. For example, this can increase the efficiency of picking and placing pillow bags 101 in array pillow bags 137.

Example 1

In Example 1, an embodiment of the invention was tested using two columns of bags. The first column of bags comprised bags approximating thick bags. These thick bags were actually two bags taped together so that they were approximately twice the thickness of a single bag. The second column of bags approximated normal bags. These normal bags comprised single bags. When the two columns were tested using a traditional handling system, the robot popped the third thick bag to be picked and placed. However, when the two columns were tested using an embodiment of the invention, both the thick bags and the normal bags were accurately picked and placed by the embodiment without popping bags. Additionally, the embodiment, measured, picked and placed both columns of bags without being manually adjusted after the first column and before the second column. In some embodiments, a robot can accurately measure, pick and place bags with variable thicknesses such that the thickest bag is three times the thickness of the thinnest bag. For example, in one embodiment a robot can accurately measure, pick and place bags with thicknesses that vary from about 20 mm to about 60 mm. In other embodiments, the invention can accurately measure, pick and place bags with thicknesses that vary over even greater ranges. In other embodiments, there is essentially no limit on the thickness range of bags apart from that imposed by robot characteristics (e.g. reach).

Although various components have been described herein in terms of being parallel, perpendicular, right-side-up, at an angle, or otherwise oriented, in some embodiments the components are only substantially parallel, perpendicular, right-side-up, at an angle, or otherwise oriented. In other embodiments the components are only approximately parallel perpendicular, right side up, at an angle, or otherwise oriented.

While this invention has been particularly shown and described with reference to preferred embodiments, it will be understood by those skilled in the art that various changes in form and detail can be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Additional Embodiments

Various additional embodiments of the invention will now be described. The following clauses are presented, for example, as a further description of the disclosed technologies and inventions herein.

1. An apparatus for use in picking and placing a non-rigid object, said apparatus comprising:
 a first input device;
 a feed forward unit; and
 at least one line of communication;
 wherein the first input device conveys a non-rigid object into contact with the feed forward unit, which contact causes a displacement of the feed forward unit,
 wherein the displacement measures a measured dimension of the object, and
 wherein the measured dimension is transmitted via the at least one line of communication.

2. The apparatus of clause 1, further comprising:
 a distance sensor, wherein the distance sensor measures the measured dimension of the object by measuring the displacement of the feed forward unit.

3. The apparatus of clause 2, wherein the distance sensor measures a measured distance between the feed forward unit and the input device while the object is in contact with the feed forward unit, and wherein the measured dimension is substantially equal to the measured distance.

4. The apparatus of clause 1 further comprising:

a robot, wherein the robot is positioned to pick and place the object using the measured dimension, and wherein the measured dimension is transmitted to the robot via the at least one line of communication.

5. The apparatus of clause 4, wherein the robot is positioned a specified distance above an object-contacting surface of an input device to pick the object from the object-contacting surface, and wherein the specified distance is at least as large as the measured dimension.

6. The apparatus of clause 1, further comprising:
a presence sensor; wherein the presence sensor detects a presence of the object.

7. The apparatus of clause 6, wherein the presence sensor detects a position of the object.

8. The apparatus of clause 6, wherein a distance sensor measures the measured dimension of the object by measuring a measured distance between the feed forward unit and the input device while the presence sensor detects the presence of the object between the feed forward unit and the input device.

9. The apparatus of clause 1, wherein a distance sensor measures a measured distance between the feed forward unit and the input device while the object is in contact with the feed forward unit; and wherein the measured dimension is substantially equal to a maximum measured distance between the feed forward unit and the input device that occurs while the object is in contact with the feed forward unit.

10. The apparatus of clause 1, further comprising:
a vision system, wherein the vision system detects information selected from the group consisting of a more accurate position of the object, a more accurate orientation of the object, and both a more accurate position and orientation of the object.

11. The apparatus of clause 10, wherein the information, selected from the group consisting of the more accurate position of the object, the more accurate orientation of the object, and both the more accurate position of the object and the more accurate orientation of the object, is used to pick the object.

12. The apparatus of clause 11, wherein the group consisting of the more accurate position of the object, the more accurate orientation of the object, and both the more accurate position of the object and the more accurate orientation of the object is transmitted via the at least one line of communication.

13. The apparatus of clause 4, wherein the robot picks the object from the first input device and places the object on a universal surface, which universal surface is on a universal surface conveyor.

14. The apparatus of clause 1, wherein the first input device and the universal surface conveyors are moving, wherein the first input device and the universal surface conveyors are conveyor belts, and wherein the universal surface is a tray.

15. The apparatus of clause 4, wherein the robot comprises a vacuum nozzle to pick and place the object.

16. The apparatus of clause 1, wherein the object is a pillow bag.

17. The apparatus of clause 1, wherein the measured dimension is selected from the group consisting of a thickness, a height, a length, a width, and a diameter of the object.

18. The apparatus of clause 1, wherein the feed forward unit comprises a secondary input device.

19. The apparatus of clause 18, wherein the secondary input device comprises a driven overhead conveyor belt, wherein the secondary input device has a translational velocity that is substantially equal to a translational velocity of the first input device, and wherein an object in contact with both the first input device and the secondary input device will be conveyed by both input devices at approximately the same speed so that the first and secondary input device result in substantially no net torque on the object.

20. A method for measuring a dimension of a non-rigid object and using the dimension in picking and placing the object, said method comprising the steps:
measuring a dimension of a moving non-rigid object to provide a measured dimension;
using the measured dimension to pick the object; and
using the measured dimension to place the object in an array of objects;
wherein the measuring step comprises:
using a first input device to convey the object into contact with a feed forward unit, wherein the contact causes a change in position of the feed forward unit to accommodate the measured dimension of the object; and
using a distance sensor to detect the change in position of the feed forward unit.

21. The method of clause 20, wherein the measured dimension is substantially equal to a measured distance between the feed forward unit and the first input device.

22. The method of clause 20, further comprising:
using the distance sensor to detect a maximum change in position of the feed forward unit as the object passes under the feed forward unit; and
selecting the maximum change in position of the feed forward unit to be the measured dimension of the object.

23. The method of clause 20, wherein the measured dimension is substantially equal to a measured distance between the first input device and the feed forward unit when the object is between the first input device and the feed forward unit.

24. The method of clause 20, further comprising:
using a presence sensor to detect a position of the object.

25. The method of clause 20, further comprising:
using a presence sensor to detect a presence of the object between the feed forward unit and the first input device.

26. The method of clause 20, wherein the method further comprises transmitting the measured dimension of the object.

27. The method of clause 20, wherein the method further comprises transmitting information from which the measured dimension of the object can be determined.

28. The method of clause 20, wherein the method further comprises capturing information about the array.

29. The method of clause 20, wherein the method further comprises transmitting information about the array.

30. The method of clause 20, wherein the method further comprises:
using a vision system to detect information selected from the group consisting of a more accurate position of the object, a more accurate orientation of the object, and both a more accurate position of the object and a more accurate orientation of the object.

31. The method of clause 30, wherein the method further comprises:
forming a first queue with the measured dimension and a position of the object;
forming a second queue with information selected from the group consisting of the more accurate position of the object, and both the more accurate position of the object and the more accurate orientation of the object; and
combining information from the first queue and the second queue to form a more accurate queue comprising the measured dimension of the object and information selected from the group consisting of the more accurate position of the object, the more accurate orientation of the object, and both the more accurate position of the object and the more accurate orientation of the object.

32. The method of clause 31, wherein the combining information step only occurs if the position in the first queue and the more accurate position in the second queue match to a specified degree.

33. The method of clause 32, wherein the specified degree is about 10 cm in a direction of conveyance of the object.

34. The method of clause 20, wherein the method further comprises:
generating a queue comprising information regarding the measured dimension and a position of each object;
generating a second queue comprising more accurate information selected from the group consisting of information regarding a more accurate position of each object, and both information regarding a more accurate position of each object and information regarding a more accurate orientation of each object;
comparing the information regarding the position of each object in the first and second queues, and, if the position of an object in the first queue matches the more accurate position of an object in the second queue to a specified degree, combining the information regarding the measured dimension of the object in the first queue with the more accurate information in the second queue to form a more accurate queue comprising the information regarding the measured dimension of the object and information selected from the group consisting of the information regarding the more accurate position of the object, the information regarding the more accurate orientation of the object, and both the information regarding the more accurate position of the object and the information regarding the more accurate orientation of the object.

35. The method of clause 20, wherein the object is a pillow bag.

36. The method of clause 20, wherein the measured dimension is selected from the group consisting of a thickness, a height, a length, a width, and a diameter of the object.

37. The method of clause 20, further comprising using the measured dimension to pick the object from an input device.

38. The method of clause 20, wherein the object is placed on a universal surface.

39. The method of clause 38, wherein the universal surface is moving on a universal conveyor.

We claim:

1. An apparatus for use in picking and placing a non-rigid object, said apparatus comprising:
a first input device;
a feed forward unit; and
at least one line of communication;
wherein the first input device conveys a non-rigid object into contact with the feed forward unit, which contact causes a displacement of the feed forward unit,
wherein the displacement measures a measured dimension of the object, and
wherein the measured dimension is transmitted via the at least one line of communication.

2. The apparatus of claim 1, further comprising:
a distance sensor, wherein the distance sensor measures the measured dimension of the object by measuring the displacement of the feed forward unit.

3. The apparatus of claim 2, wherein the distance sensor measures a measured distance between the feed forward unit and the input device while the object is in contact with the feed forward unit, and wherein the measured dimension is substantially equal to the measured distance.

4. The apparatus of claim 1 further comprising:
a robot, wherein the robot is positioned to pick and place the object using the measured dimension, and wherein the measured dimension is transmitted to the robot via the at least one line of communication.

5. The apparatus of claim 4, wherein the robot is positioned a specified distance above an object-contacting surface of an input device to pick the object from the object-contacting surface, and wherein the specified distance is at least as large as the measured dimension.

6. The apparatus of claim 1, further comprising:
a presence sensor; wherein the presence sensor detects a presence of the object.

7. The apparatus of claim 6, wherein the presence sensor detects a position of the object.

8. The apparatus of claim 6, wherein a distance sensor measures the measured dimension of the object by measuring a measured distance between the feed forward unit and the input device while the presence sensor detects the presence of the object between the feed forward unit and the input device.

9. The apparatus of claim 1, wherein a distance sensor measures a measured distance between the feed forward unit and the input device while the object is in contact with the feed forward unit; and wherein the measured dimension is substantially equal to a maximum measured distance between the feed forward unit and the input device that occurs while the object is in contact with the feed forward unit.

10. The apparatus of claim 1, further comprising:
a vision system, wherein the vision system detects information selected from the group consisting of a more accurate position of the object, a more accurate orientation of the object, and both a more accurate position and orientation of the object.

11. The apparatus of claim 10, wherein the information, selected from the group consisting of the more accurate position of the object, the more accurate orientation of the object, and both the more accurate position of the object and the more accurate orientation of the object, is used to pick the object.

12. The apparatus of claim 11, wherein the information, selected from the group consisting of the more accurate position of the object, the more accurate orientation of the object, and both the more accurate position of the object and the more accurate orientation of the object is transmitted via the at least one line of communication.

13. The apparatus of claim 4, wherein the robot picks the object from the first input device and places the object on a universal surface, which universal surface is on a universal surface conveyor.

14. The apparatus of claim 13, wherein the first input device and the universal surface conveyor are moving, wherein the first input device and the universal surface conveyor are conveyor belts, and wherein the universal surface is a tray.

15. The apparatus of claim 4, wherein the robot comprises a vacuum nozzle to pick and place the object.

16. The apparatus of claim 1, wherein the object is a pillow bag.

17. The apparatus of claim 1, wherein the measured dimension is selected from the group consisting of a thickness, a height, a length, a width, and a diameter of the object.

18. The apparatus of claim 1, wherein the feed forward unit comprises a secondary input device.

19. The apparatus of claim 18, wherein the secondary input device comprises a driven overhead conveyor belt, wherein the secondary input device has a translational velocity that is substantially equal to a translational velocity of the first input device, and wherein an object in contact with both the first input device and the secondary input device is conveyed by both input devices at approximately the same speed so that the first input device and the secondary input device result in substantially no net torque on the object.

20. A method for measuring a dimension of a non-rigid object and using the dimension in picking and placing the object, said method comprising the steps:
   measuring a dimension of a moving non-rigid object to provide a measured dimension;
   using the measured dimension to pick the object; and
   using the measured dimension to place the object in an array of objects;
   wherein the measuring step comprises:
      using a first input device to convey the object into contact with a feed forward unit, wherein the contact causes a change in position of the feed forward unit to accommodate the measured dimension of the object; and
      using a distance sensor to measure the measured dimension by detecting the change in position of the feed forward unit.

21. The method of claim 20, wherein the measured dimension is substantially equal to a measured distance between the feed forward unit and the first input device.

22. The method of claim 20, further comprising:
   using the distance sensor to detect a maximum change in position of the feed forward unit as the object passes under the feed forward unit; and
   selecting the maximum change in position of the feed forward unit to be the measured dimension of the object.

23. The method of claim 20, wherein the measured dimension is substantially equal to a measured distance between the first input device and the feed forward unit when the object is between the first input device and the feed forward unit.

24. The method of claim 20, further comprising:
   using a presence sensor to detect a position of the object.

25. The method of claim 20, further comprising:
   using a presence sensor to detect a presence of the object between the feed forward unit and the first input device.

26. The method of claim 20, wherein the method further comprises transmitting the measured dimension of the object.

27. The method of claim 20, wherein the method further comprises transmitting information from which the measured dimension of the object can be determined.

28. The method of claim 20, wherein the method further comprises capturing information about the array.

29. The method of claim 20, wherein the method further comprises transmitting information about the array.

30. The method of claim 20, wherein the method further comprises:
   using a vision system to detect information selected from the group consisting of a more accurate position of the object, a more accurate orientation of the object, and both a more accurate position of the object and a more accurate orientation of the object.

31. The method of claim 30, wherein the method further comprises:
   forming a first queue comprising the measured dimension and a position of the object;
   forming a second queue comprising information selected from the group consisting of the more accurate position of the object, and both the more accurate position of the object and the more accurate orientation of the object; and
   combining information from the first queue and the second queue to form a more accurate queue comprising the measured dimension of the object and information selected from the group consisting of the more accurate position of the object, the more accurate orientation of the object, and both the more accurate position of the object and the more accurate orientation of the object.

32. The method of claim 31, wherein the combining information step only occurs if the position in the first queue and the more accurate position in the second queue match to a specified degree.

33. The method of claim 32, wherein the specified degree is about 10 cm in a direction of conveyance of the object.

34. The method of claim 20, wherein the method further comprises:
   performing the steps of the method of claim 20 for each object in the array of objects;
   generating a queue comprising information regarding the measured dimension and a position of each object;
   generating a second queue comprising more accurate information selected from the group consisting of information regarding a more accurate position of each object, and both information regarding a more accurate position of each object and information regarding a more accurate orientation of each object;
   comparing the information regarding the position of each object in the first and second queues, and, if the position of an object in the first queue matches the more accurate position of an object in the second queue to a specified degree, combining the information regarding the measured dimension of the object in the first queue with at least a portion of the more accurate information in the second queue to form a more accurate queue comprising the information regarding the measured dimension of the object and information selected from the group consisting of the information regarding the more accurate position of the object, the information regarding the more accurate orientation of the object, and both the information regarding the more accurate position of the object and the information regarding the more accurate orientation of the object.

35. The method of claim 20, wherein the object is a pillow bag.

36. The method of claim 20, wherein the measured dimension is selected from the group consisting of a thickness, a height, a length, a width, and a diameter of the object.

37. The method of claim 20, further comprising using the measured dimension to pick the object from an input device.

38. The method of claim 20, wherein the object is placed on a universal surface.

39. The method of claim 38, wherein the universal surface is moving on a universal surface conveyor.

* * * * *